US011792036B2

(12) United States Patent
Decenzo et al.

(10) Patent No.: US 11,792,036 B2
(45) Date of Patent: Oct. 17, 2023

(54) MOBILE PREMISES AUTOMATION PLATFORM

(71) Applicant: iControl Networks, Inc., Philadelphia, PA (US)

(72) Inventors: Chris Decenzo, Menlo Park, CA (US); Paul Dawes, Furlong, PA (US); Wayne Fenton, Redwood City, CA (US); Jim Kitchen, Austin, TX (US)

(73) Assignee: iControl Networks, Inc., Philadelphia, PA (US)

( * ) Notice: Subject to any disclaimer, the term of this patent is extended or adjusted under 35 U.S.C. 154(b) by 0 days.

(21) Appl. No.: 17/576,336

(22) Filed: Jan. 14, 2022

(65) Prior Publication Data

US 2022/0173934 A1   Jun. 2, 2022

Related U.S. Application Data

(63) Continuation of application No. 15/354,380, filed on Nov. 17, 2016, now Pat. No. 11,258,625, which is a
(Continued)

(51) Int. Cl.
*H04L 12/28* (2006.01)
*B64C 39/02* (2023.01)
(Continued)

(52) U.S. Cl.
CPC ......... *H04L 12/2809* (2013.01); *B63H 25/02* (2013.01); *B64C 39/024* (2013.01);
(Continued)

(58) Field of Classification Search
CPC ........................... H04L 12/2809; H04L 67/10
See application file for complete search history.

(56) References Cited

U.S. PATENT DOCUMENTS 686,838 A    11/1901 Richard
1,738,540 A  12/1929 Replogle et al.
(Continued)

FOREIGN PATENT DOCUMENTS

AU    2005223267 B2   12/2010
AU    2010297957 A1    5/2012
(Continued)

OTHER PUBLICATIONS

U.S. Patent Application filed on Mar. 17, 2021, entitled "Communication Protocols Over Internet Protocol (IP) Networks", U.S. Appl. No. 17/204,068.
(Continued)

*Primary Examiner* — Jimmy H Tran
(74) *Attorney, Agent, or Firm* — BakerHostetler

(57) ABSTRACT

A system including a drone or unmanned vehicle configured to perform surveillance of a premises. The drone surveillance includes autonomous navigation and/or remote or optional piloting around the premises. The drone includes a controller coupled to a plurality of sensors configured to collect drone data and security data at the premises, wherein the controller is configured to generate control data for the drone and the premises using the drone data and the security data. A remote device coupled to the drone includes a user interface configured to present the drone data, the security data, and/or the control data.

32 Claims, 18 Drawing Sheets

Related U.S. Application Data continuation-in-part of application No. 15/292,866, filed on Oct. 13, 2016, now abandoned, and a continuation-in-part of application No. 15/204,662, filed on Jul. 7, 2016, now Pat. No. 10,522,026, and a continuation-in-part of application No. 15/198,531, filed on Jun. 30, 2016, now Pat. No. 11,190,578, and a continuation-in-part of application No. 15/196,281, filed on Jun. 29, 2016, now Pat. No. 11,368,327, and a continuation-in-part of application No. 15/177,915, filed on Jun. 9, 2016, now Pat. No. 11,316,958, and a continuation-in-part of application No. 14/943,162, filed on Nov. 17, 2015, now Pat. No. 10,062,245, and a continuation-in-part of application No. 14/704,045, filed on May 5, 2015, now Pat. No. 10,365,810, and a continuation-in-part of application No. 14/704,098, filed on May 5, 2015, now Pat. No. 10,348,575, and a continuation-in-part of application No. 14/704,127, filed on May 5, 2015, now abandoned, and a continuation-in-part of application No. 14/645,808, filed on Mar. 12, 2015, now Pat. No. 10,127,801, and a continuation-in-part of application No. 14/628,651, filed on Feb. 23, 2015, now Pat. No. 10,091,014, and a continuation-in-part of application No. 13/954,553, filed on Jul. 30, 2013, now Pat. No. 11,582,065, and a continuation-in-part of application No. 13/929,568, filed on Jun. 27, 2013, now Pat. No. 10,444,964, and a continuation-in-part of application No. 13/718,851, filed on Dec. 18, 2012, now Pat. No. 10,156,831, and a continuation-in-part of application No. 13/531,757, filed on Jun. 25, 2012, now abandoned, and a continuation-in-part of application No. 13/334,998, filed on Dec. 22, 2011, now Pat. No. 9,531,593, and a continuation-in-part of application No. 13/104,936, filed on May 10, 2011, now Pat. No. 10,380,871, said application No. 14/645,808 is a continuation-in-part of application No. 13/104,932, filed on May 10, 2011, now abandoned, said application No. 15/354,380 is a continuation-in-part of application No. 12/972,740, filed on Dec. 20, 2010, now Pat. No. 9,729,342, and a continuation-in-part of application No. 12/539,537, filed on Aug. 11, 2009, now Pat. No. 10,156,959, and a continuation-in-part of application No. 12/189,780, filed on Aug. 11, 2008, now abandoned.

(60) Provisional application No. 62/256,232, filed on Nov. 17, 2015.

(51) Int. Cl.

| | |
|---|---|
| *G01C 21/16* | (2006.01) |
| *G01C 21/20* | (2006.01) |
| *G01S 19/42* | (2010.01) |
| *G05D 1/00* | (2006.01) |
| *G05D 1/02* | (2020.01) |
| *G05D 1/10* | (2006.01) |
| *G07C 5/00* | (2006.01) |
| *H04L 67/025* | (2022.01) |
| *H04L 67/125* | (2022.01) |
| *H04W 4/38* | (2018.01) |
| *H04W 4/44* | (2018.01) |
| *H04W 12/02* | (2009.01) |
| *H04W 12/033* | (2021.01) |
| *B63H 25/02* | (2006.01) |
| *H04L 9/40* | (2022.01) |
| *H04L 67/10* | (2022.01) |
| *H04L 67/01* | (2022.01) |

(52) U.S. Cl.
CPC ............ *G01C 21/16* (2013.01); *G01C 21/20* (2013.01); *G01S 19/42* (2013.01); *G05D 1/0038* (2013.01); *G05D 1/0055* (2013.01); *G05D 1/0088* (2013.01); *G05D 1/0094* (2013.01); *G05D 1/0206* (2013.01); *G05D 1/0276* (2013.01); *G05D 1/106* (2019.05); *G07C 5/008* (2013.01); *H04L 12/2818* (2013.01); *H04L 67/025* (2013.01); *H04L 67/125* (2013.01); *H04W 4/38* (2018.02); *H04W 4/44* (2018.02); *H04W 12/02* (2013.01); *H04W 12/033* (2021.01); *B60L 2200/10* (2013.01); *B60L 2200/32* (2013.01); *B63H 2025/028* (2013.01); *H04L 63/029* (2013.01); *H04L 63/0428* (2013.01); *H04L 63/166* (2013.01); *H04L 67/01* (2022.05); *H04L 67/10* (2013.01); *H04L 2012/2841* (2013.01); *H04L 2012/2843* (2013.01); *Y02D 30/70* (2020.08)

(56) References Cited

U.S. PATENT DOCUMENTS

| | | | |
|---|---|---|---|
| 3,803,576 | A | 4/1974 | Dobrzanski et al. |
| 3,852,541 | A | 12/1974 | Altenberger |
| 4,006,460 | A | 2/1977 | Hewitt et al. |
| 4,141,006 | A | 2/1979 | Braxton |
| 4,206,449 | A | 6/1980 | Apsell et al. |
| 4,257,038 | A | 3/1981 | Rounds et al. |
| 4,286,331 | A | 8/1981 | Anderson et al. |
| 4,304,970 | A | 12/1981 | Fahey et al. |
| 4,351,023 | A | 9/1982 | Richer |
| 4,363,031 | A | 12/1982 | Reinowitz |
| 4,459,582 | A | 7/1984 | Sheahan et al. |
| 4,520,503 | A | 5/1985 | Kirst et al. |
| 4,559,526 | A | 12/1985 | Tani et al. |
| 4,559,527 | A | 12/1985 | Kirby |
| 4,567,557 | A | 1/1986 | Burns |
| 4,574,305 | A | 3/1986 | Campbell et al. |
| 4,581,606 | A | 4/1986 | Mallory |
| 4,591,834 | A | 5/1986 | Kyle |
| D284,084 | S | 6/1986 | Ferrara, Jr. |
| 4,641,127 | A | 2/1987 | Hogan et al. |
| 4,652,859 | A | 3/1987 | Van Wienen |
| 4,670,739 | A | 6/1987 | Kelly, Jr. |
| 4,683,460 | A | 7/1987 | Nakatsugawa |
| 4,694,282 | A | 9/1987 | Tamura et al. |
| 4,716,973 | A | 1/1988 | Cobern |
| 4,730,184 | A | 3/1988 | Bach |
| 4,754,261 | A | 6/1988 | Marino |
| 4,755,792 | A | 7/1988 | Pezzolo et al. |
| 4,779,007 | A | 10/1988 | Schlanger et al. |
| 4,785,289 | A | 11/1988 | Chen |
| 4,801,924 | A | 1/1989 | Burgmann et al. |
| 4,812,820 | A | 3/1989 | Chatwin |
| 4,818,970 | A | 4/1989 | Natale et al. |
| 4,833,339 | A | 5/1989 | Luchaco et al. |
| 4,833,449 | A | 5/1989 | Gaffigan |
| 4,855,713 | A | 8/1989 | Brunius |
| 4,860,185 | A | 8/1989 | Brewer et al. |
| 4,887,064 | A | 12/1989 | Drori et al. |
| 4,897,630 | A | 1/1990 | Nykerk |
| 4,918,623 | A | 4/1990 | Lockitt et al. |
| 4,918,717 | A | 4/1990 | Bissonne, I et al. |
| 4,951,029 | A | 8/1990 | Severson |
| 4,959,713 | A | 9/1990 | Morotomi et al. |
| 4,962,473 | A | 10/1990 | Crain |
| 4,980,666 | A | 12/1990 | Hwang |
| 4,993,059 | A | 2/1991 | Smith et al. |
| 4,994,787 | A | 2/1991 | Kratt et al. |
| 4,996,646 | A | 2/1991 | Farrington |
| 5,023,901 | A | 6/1991 | Sloan et al. |
| 5,083,106 | A | 1/1992 | Kostusiak et al. |
| 5,086,385 | A | 2/1992 | Launey et al. |

(56) References Cited

U.S. PATENT DOCUMENTS

| | | |
|---|---|---|
| 5,091,780 A | 2/1992 | Pomerleau |
| 5,109,278 A | 4/1992 | Erickson et al. |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| 5,164,703 A | 11/1992 | Rickman |
| 5,164,979 A | 11/1992 | Choi |
| D337,569 S | 7/1993 | Kando |
| 5,227,776 A | 7/1993 | Starefoss |
| 5,237,305 A | 8/1993 | Ishikuro et al. |
| 5,245,694 A | 9/1993 | Zwern |
| 5,247,232 A | 9/1993 | Lin |
| 5,280,527 A | 1/1994 | Gullman et al. |
| 5,283,816 A | 2/1994 | Gomez Diaz |
| 5,299,971 A | 4/1994 | Hart |
| 5,319,394 A | 6/1994 | Dukek |
| 5,319,698 A | 6/1994 | Glidewell et al. |
| 5,334,974 A | 8/1994 | Simms et al. |
| 5,400,011 A | 3/1995 | Sutton |
| 5,400,246 A | 3/1995 | Wilson et al. |
| 5,406,260 A | 4/1995 | Cummings et al. |
| 5,410,343 A | 4/1995 | Coddington et al. |
| 5,412,708 A | 5/1995 | Katz |
| 5,414,409 A | 5/1995 | Voosen et al. |
| 5,414,833 A | 5/1995 | Hershey et al. |
| 5,428,293 A | 6/1995 | Sinclair et al. |
| 5,438,607 A | 8/1995 | Przygoda et al. |
| 5,446,445 A | 8/1995 | Bloomfield et al. |
| 5,448,290 A | 9/1995 | Vanzeeland |
| 5,452,344 A | 9/1995 | Larson |
| 5,465,081 A | 11/1995 | Todd |
| 5,471,194 A | 11/1995 | Guscott |
| 5,481,312 A | 1/1996 | Cash et al. |
| 5,483,224 A | 1/1996 | Rankin et al. |
| 5,486,812 A | 1/1996 | Todd |
| 5,499,014 A | 3/1996 | Greenwaldt |
| 5,499,196 A | 3/1996 | Pacheco |
| 5,510,975 A | 4/1996 | Ziegler, Jr. |
| 5,519,878 A | 5/1996 | Dolin, Jr. |
| RE35,268 E | 6/1996 | Frolov et al. |
| 5,525,966 A | 6/1996 | Parish |
| 5,526,428 A | 6/1996 | Arnold |
| 5,534,845 A | 7/1996 | Issa et al. |
| 5,541,585 A | 7/1996 | Duhame et al. |
| 5,543,778 A | 8/1996 | Stouffer |
| 5,546,072 A | 8/1996 | Creuseremee et al. |
| 5,546,074 A | 8/1996 | Bernal et al. |
| 5,546,447 A | 8/1996 | Skarbo et al. |
| 5,548,646 A | 8/1996 | Aziz et al. |
| 5,550,984 A | 8/1996 | Gelb |
| 5,557,254 A | 9/1996 | Johnson et al. |
| 5,565,843 A | 10/1996 | Meyvis |
| 5,570,079 A | 10/1996 | Dockery |
| 5,572,438 A | 11/1996 | Ehlers et al. |
| 5,578,989 A | 11/1996 | Pedtke |
| 5,579,197 A | 11/1996 | Mengelt et al. |
| 5,579,221 A | 11/1996 | Mun |
| D377,034 S | 12/1996 | Matsushita |
| 5,586,254 A | 12/1996 | Kondo et al. |
| 5,587,705 A | 12/1996 | Morris |
| 5,598,086 A | 1/1997 | Somerville |
| 5,602,918 A | 2/1997 | Chen et al. |
| 5,604,493 A | 2/1997 | Behlke |
| 5,606,615 A | 2/1997 | Lapointe et al. |
| 5,621,662 A | 4/1997 | Humphries et al. |
| 5,623,601 A | 4/1997 | Vu |
| 5,625,338 A | 4/1997 | Pildner et al. |
| 5,625,410 A | 4/1997 | Washino et al. |
| 5,629,687 A | 5/1997 | Sutton et al. |
| 5,630,216 A | 5/1997 | McEwan |
| 5,631,630 A | 5/1997 | McSweeney |
| 5,638,046 A | 6/1997 | Malinowski |
| 5,650,773 A | 7/1997 | Chiarello |
| 5,651,070 A | 7/1997 | Blunt |
| 5,652,567 A | 7/1997 | Traxler |
| 5,654,694 A | 8/1997 | Newham |
| 5,675,321 A | 10/1997 | McBride |
| 5,680,131 A | 10/1997 | Utz |
| 5,682,133 A | 10/1997 | Johnson et al. |
| 5,686,885 A | 11/1997 | Bergman |
| 5,686,896 A | 11/1997 | Bergman |
| 5,689,235 A | 11/1997 | Sugimoto et al. |
| 5,689,708 A | 11/1997 | Regnier et al. |
| 5,691,697 A | 11/1997 | Carvalho et al. |
| 5,694,335 A | 12/1997 | Hollenberg |
| 5,694,595 A | 12/1997 | Jacobs et al. |
| 5,696,486 A | 12/1997 | Poliquin et al. |
| 5,696,898 A | 12/1997 | Baker et al. |
| D389,501 S | 1/1998 | Mascarenas et al. |
| 5,706,191 A | 1/1998 | Bassett et al. |
| 5,712,679 A | 1/1998 | Coles |
| 5,714,933 A | 2/1998 | Le Van Suu |
| 5,715,394 A | 2/1998 | Jabs |
| 5,717,378 A | 2/1998 | Malvaso et al. |
| 5,717,379 A | 2/1998 | Peters |
| 5,717,578 A | 2/1998 | Afzal |
| 5,719,551 A | 2/1998 | Flick |
| 5,726,912 A | 3/1998 | Krall et al. |
| 5,731,756 A | 3/1998 | Roddy |
| 5,736,927 A | 4/1998 | Stebbins et al. |
| 5,737,391 A | 4/1998 | Dame et al. |
| 5,748,084 A | 5/1998 | Isikoff |
| 5,748,089 A | 5/1998 | Sizemore |
| 5,757,616 A | 5/1998 | May et al. |
| 5,761,206 A | 6/1998 | Kackman |
| 5,774,051 A | 6/1998 | Kostusiak |
| 5,777,551 A | 7/1998 | Hess |
| 5,777,837 A | 7/1998 | Eckel et al. |
| 5,784,461 A | 7/1998 | Shaffer et al. |
| 5,784,463 A | 7/1998 | Chen et al. |
| 5,790,531 A | 8/1998 | Ellebracht et al. |
| 5,793,028 A | 8/1998 | Wagener et al. |
| 5,793,763 A | 8/1998 | Mayes et al. |
| 5,794,128 A | 8/1998 | Brockel et al. |
| 5,796,401 A | 8/1998 | Winer |
| 5,798,701 A | 8/1998 | Bernal et al. |
| 5,801,618 A | 9/1998 | Jenkins |
| 5,805,056 A | 9/1998 | Mueller et al. |
| 5,805,064 A | 9/1998 | Yorkey |
| 5,809,013 A | 9/1998 | Kackman |
| 5,809,265 A | 9/1998 | Blair et al. |
| 5,812,054 A | 9/1998 | Cohen |
| 5,819,124 A | 10/1998 | Somner et al. |
| 5,821,937 A | 10/1998 | Tonelli |
| 5,825,865 A | 10/1998 | Oberlander et al. |
| 5,838,226 A | 11/1998 | Houggy et al. |
| 5,844,599 A | 12/1998 | Hildin |
| 5,845,070 A | 12/1998 | Ikudome |
| 5,845,081 A | 12/1998 | Rangarajan et al. |
| 5,854,588 A | 12/1998 | Dockery |
| 5,859,966 A | 1/1999 | Hayman et al. |
| 5,861,804 A | 1/1999 | Fansa et al. |
| 5,864,614 A * | 1/1999 | Farris ............... H04Q 3/0029 379/221.09 |
| 5,867,484 A | 2/1999 | Shaunfield |
| 5,867,495 A | 2/1999 | Elliott et al. |
| 5,874,952 A | 2/1999 | Morgan |
| 5,875,395 A | 2/1999 | Holmes |
| 5,877,696 A | 3/1999 | Powell |
| 5,877,957 A | 3/1999 | Bennett |
| 5,880,775 A | 3/1999 | Ross |
| 5,881,226 A | 3/1999 | Veneklase |
| 5,886,697 A | 3/1999 | Naughton et al. |
| 5,886,894 A | 3/1999 | Rakoff |
| 5,892,442 A | 4/1999 | Ozery |
| 5,898,831 A | 4/1999 | Hall et al. |
| 5,905,438 A | 5/1999 | Weiss et al. |
| 5,907,279 A | 5/1999 | Bruins et al. |
| 5,909,183 A | 6/1999 | Borgstahl et al. |
| 5,914,655 A | 6/1999 | Clifton et al. |
| 5,924,069 A | 7/1999 | Kowalkowski et al. |
| 5,926,209 A | 7/1999 | Glatt |
| 5,933,098 A | 8/1999 | Haxton |

(56) References Cited

U.S. PATENT DOCUMENTS

| | | |
|---|---|---|
| 5,940,387 A | 8/1999 | Humpleman |
| 5,943,394 A | 8/1999 | Ader et al. |
| 5,952,815 A | 9/1999 | Rouillard et al. |
| 5,955,946 A | 9/1999 | Beheshti et al. |
| 5,958,053 A | 9/1999 | Denker |
| 5,959,528 A | 9/1999 | Right et al. |
| 5,959,529 A | 9/1999 | Kail, IV |
| 5,963,916 A | 10/1999 | Kaplan |
| 5,967,975 A | 10/1999 | Ridgeway |
| 5,974,547 A | 10/1999 | Klimenko |
| D416,910 S | 11/1999 | Vasquez |
| 5,982,418 A | 11/1999 | Ely |
| 5,991,795 A | 11/1999 | Howard et al. |
| 5,995,838 A | 11/1999 | Oda et al. |
| 5,999,525 A | 12/1999 | Krishnaswamy et al. |
| 6,002,430 A | 12/1999 | McCall et al. |
| 6,009,320 A | 12/1999 | Dudley |
| 6,011,321 A | 1/2000 | Stancu et al. |
| 6,011,921 A | 1/2000 | Takahashi et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Hess |
| 6,049,598 A | 4/2000 | Peters et al. |
| 6,052,052 A | 4/2000 | Delmonaco |
| 6,058,115 A | 5/2000 | Sawyer et al. |
| 6,060,994 A | 5/2000 | Chen |
| 6,067,346 A | 5/2000 | Akhteruzzaman |
| 6,067,440 A | 5/2000 | Diefes |
| 6,069,655 A | 5/2000 | Seeley et al. |
| 6,078,253 A | 6/2000 | Fowler |
| 6,078,257 A | 6/2000 | Ferraro |
| 6,078,649 A | 6/2000 | Small et al. |
| 6,085,030 A | 7/2000 | Whitehead et al. |
| 6,085,238 A | 7/2000 | Yuasa et al. |
| 6,091,771 A | 7/2000 | Seeley et al. |
| 6,094,134 A | 7/2000 | Cohen |
| 6,097,429 A | 8/2000 | Seeley et al. |
| 6,104,785 A | 8/2000 | Chen |
| 6,107,918 A | 8/2000 | Klein et al. |
| 6,107,930 A | 8/2000 | Behlke et al. |
| 6,108,034 A | 8/2000 | Kim |
| 6,112,015 A | 8/2000 | Planas et al. |
| 6,112,237 A | 8/2000 | Donaldson et al. |
| 6,117,182 A | 9/2000 | Alpert et al. |
| 6,124,882 A | 9/2000 | Voois et al. |
| 6,128,653 A | 10/2000 | Del et al. |
| 6,134,303 A | 10/2000 | Chen |
| 6,134,591 A * | 10/2000 | Nickles ............... H04L 63/067 |
| | | 709/225 |
| 6,138,249 A | 10/2000 | Nolet |
| 6,139,177 A | 10/2000 | Venkatraman et al. |
| 6,140,987 A | 10/2000 | Stein et al. |
| 6,144,993 A | 11/2000 | Fukunaga et al. |
| 6,154,133 A | 11/2000 | Ross et al. |
| 6,157,649 A | 12/2000 | Peirce et al. |
| 6,157,943 A | 12/2000 | Meyer |
| 6,161,182 A | 12/2000 | Nadooshan |
| 6,167,186 A | 12/2000 | Kawasaki et al. |
| 6,167,253 A * | 12/2000 | Farris .................. H04M 11/08 |
| | | 455/412.2 |
| 6,181,341 B1 | 1/2001 | Shinagawa |
| 6,192,282 B1 | 2/2001 | Smith et al. |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,208,952 B1 | 3/2001 | Goertzel et al. |
| 6,209,011 B1 | 3/2001 | Vong et al. |
| 6,211,783 B1 | 4/2001 | Wang |
| 6,215,404 B1 | 4/2001 | Morales |
| 6,218,938 B1 | 4/2001 | Lin |
| 6,219,677 B1 | 4/2001 | Howard |
| 6,226,031 B1 | 5/2001 | Barraclough et al. |
| 6,229,429 B1 | 5/2001 | Horon |
| 6,230,271 B1 | 5/2001 | Wadlow et al. |
| 6,239,892 B1 | 5/2001 | Davidson |
| 6,243,683 B1 | 6/2001 | Peters |
| 6,246,320 B1 | 6/2001 | Monroe |
| 6,252,883 B1 | 6/2001 | Schweickart et al. |
| 6,259,440 B1 | 7/2001 | Vaughan et al. |
| 6,268,789 B1 | 7/2001 | Diamant et al. |
| 6,271,752 B1 | 8/2001 | Vaios |
| 6,275,227 B1 | 8/2001 | DeStefano |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,292,766 B1 | 9/2001 | Mattos et al. |
| 6,292,827 B1 | 9/2001 | Raz |
| 6,295,346 B1 | 9/2001 | Markowitz et al. |
| 6,314,425 B1 | 11/2001 | Serbinis et al. |
| 6,320,506 B1 | 11/2001 | Ferraro |
| 6,323,897 B1 | 11/2001 | Kogane et al. |
| D451,529 S | 12/2001 | Vasquez |
| 6,327,044 B1 | 12/2001 | Shima |
| 6,331,122 B1 | 12/2001 | Wu |
| 6,332,193 B1 | 12/2001 | Glass et al. |
| 6,341,274 B1 | 1/2002 | Leon |
| 6,347,393 B1 | 2/2002 | Alpert et al. |
| 6,351,213 B1 | 2/2002 | Hirsch et al. |
| 6,351,271 B1 | 2/2002 | Mainwaring et al. |
| 6,351,595 B1 | 2/2002 | Kim |
| 6,351,829 B1 | 2/2002 | Dupont et al. |
| 6,353,853 B1 | 3/2002 | Gravlin |
| 6,353,891 B1 | 3/2002 | Borella et al. |
| 6,359,560 B1 | 3/2002 | Budge et al. |
| 6,363,417 B1 | 3/2002 | Howard et al. |
| 6,363,422 B1 | 3/2002 | Hunter et al. |
| 6,366,211 B1 | 4/2002 | Parker |
| 6,369,695 B2 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,378,109 B1 | 4/2002 | Young et al. |
| 6,385,772 B1 | 5/2002 | Courtney |
| 6,392,538 B1 | 5/2002 | Shere |
| 6,396,531 B1 | 5/2002 | Gerszberg et al. |
| 6,400,265 B1 | 6/2002 | Saylor et al. |
| 6,405,348 B1 | 6/2002 | Fallah-Tehrani et al. |
| 6,411,802 B1 | 6/2002 | Cardina et al. |
| D460,472 S | 7/2002 | Wang |
| 6,418,037 B1 | 7/2002 | Zhang |
| 6,421,080 B1 | 7/2002 | Lambert |
| 6,430,629 B1 | 8/2002 | Smyers |
| 6,433,683 B1 | 8/2002 | Robinson |
| 6,434,604 B1 | 8/2002 | Harada et al. |
| 6,434,700 B1 | 8/2002 | Alonso et al. |
| 6,437,692 B1 | 8/2002 | Petite et al. |
| 6,441,723 B1 | 8/2002 | Mansfield et al. |
| 6,441,731 B1 * | 8/2002 | Hess ..................... G08B 25/10 |
| | | 340/331 |
| 6,442,241 B1 | 8/2002 | Tsumpes |
| 6,445,291 B2 | 9/2002 | Addy et al. |
| 6,446,111 B1 | 9/2002 | Lowery |
| 6,446,192 B1 | 9/2002 | Narasimhan et al. |
| 6,452,490 B1 | 9/2002 | Garland et al. |
| 6,452,923 B1 | 9/2002 | Gerszberg et al. |
| 6,452,924 B1 | 9/2002 | Golden et al. |
| 6,453,687 B2 | 9/2002 | Sharood et al. |
| D464,328 S | 10/2002 | Vasquez et al. |
| D464,948 S | 10/2002 | Vasquez et al. |
| 6,462,507 B2 | 10/2002 | Fisher, Jr. |
| 6,462,663 B1 | 10/2002 | Wilson et al. |
| 6,467,084 B1 | 10/2002 | Howard et al. |
| 6,473,407 B1 | 10/2002 | Ditmer et al. |
| 6,476,858 B1 | 11/2002 | Ramirez et al. |
| 6,480,901 B1 | 11/2002 | Weber et al. |
| 6,486,896 B1 | 11/2002 | Ubillos |
| 6,493,020 B1 | 12/2002 | Stevenson et al. |

(56) References Cited

U.S. PATENT DOCUMENTS

| | | | |
|---|---|---|---|
| 6,496,927 B1 | 12/2002 | McGrane et al. | |
| 6,499,131 B1 | 12/2002 | Savithri et al. | |
| 6,504,479 B1 | 1/2003 | Lemons et al. | |
| 6,507,589 B1 | 1/2003 | Ramasubramani et al. | |
| 6,508,709 B1 | 1/2003 | Karmarkar | |
| 6,515,968 B1* | 2/2003 | Combar | G06F 21/41 |
| | | | 707/E17.107 |
| 6,526,581 B1 | 2/2003 | Edson | |
| 6,529,230 B1 | 3/2003 | Chong | |
| 6,529,589 B1 | 3/2003 | Nelson et al. | |
| 6,529,723 B1 | 3/2003 | Bentley | |
| 6,535,110 B1 | 3/2003 | Arora et al. | |
| 6,542,075 B2 | 4/2003 | Barker et al. | |
| 6,542,992 B1 | 4/2003 | Peirce et al. | |
| 6,549,130 B1* | 4/2003 | Joao | B60R 25/33 |
| | | | 340/425.5 |
| 6,552,647 B1 | 4/2003 | Thiessen et al. | |
| 6,553,336 B1 | 4/2003 | Johnson et al. | |
| 6,559,769 B2 | 5/2003 | Anthony et al. | |
| 6,563,800 B1 | 5/2003 | Salo et al. | |
| 6,563,910 B2 | 5/2003 | Menard et al. | |
| 6,567,122 B1 | 5/2003 | Anderson et al. | |
| 6,567,502 B2 | 5/2003 | Zellner et al. | |
| 6,574,234 B1 | 6/2003 | Myer et al. | |
| 6,580,424 B1 | 6/2003 | Krumm | |
| 6,580,950 B1 | 6/2003 | Johnson et al. | |
| 6,587,046 B2 | 7/2003 | Joao | |
| 6,587,235 B1 | 7/2003 | Chaudhuri et al. | |
| 6,587,455 B1 | 7/2003 | Ray et al. | |
| 6,587,736 B2 | 7/2003 | Howard et al. | |
| 6,587,739 B1 | 7/2003 | Abrams et al. | |
| 6,591,094 B1 | 7/2003 | Bentley | |
| 6,593,856 B1 | 7/2003 | Madau | |
| 6,597,703 B1 | 7/2003 | Li et al. | |
| 6,601,086 B1 | 7/2003 | Howard et al. | |
| 6,603,488 B2 | 8/2003 | Humpleman et al. | |
| 6,609,127 B1 | 8/2003 | Lee et al. | |
| 6,611,206 B2 | 8/2003 | Eshelman et al. | |
| 6,615,088 B1 | 9/2003 | Myer et al. | |
| 6,621,827 B1 | 9/2003 | Rezvani et al. | |
| 6,624,750 B1 | 9/2003 | Marman et al. | |
| 6,631,416 B2 | 10/2003 | Bendinelli et al. | |
| 6,636,893 B1 | 10/2003 | Fong | |
| 6,643,355 B1 | 11/2003 | Tsumpes | |
| 6,643,652 B2 | 11/2003 | Helgeson et al. | |
| 6,643,669 B1 | 11/2003 | Novak et al. | |
| 6,643,795 B1 | 11/2003 | Sicola et al. | |
| 6,648,682 B1 | 11/2003 | Wu | |
| 6,658,091 B1* | 12/2003 | Naidoo | H04M 11/04 |
| | | | 379/37 |
| 6,661,340 B1* | 12/2003 | Saylor | G08B 25/016 |
| | | | 340/7.52 |
| 6,662,340 B2 | 12/2003 | Rawat et al. | |
| 6,665,004 B1 | 12/2003 | Paff | |
| 6,667,688 B1 | 12/2003 | Menard et al. | |
| 6,674,767 B1 | 1/2004 | Kadyk et al. | |
| 6,675,365 B2 | 1/2004 | Elzinga | |
| 6,680,730 B1 | 1/2004 | Shields et al. | |
| 6,680,935 B1 | 1/2004 | Kung et al. | |
| 6,686,838 B1* | 2/2004 | Rezvani | H04M 1/72415 |
| | | | 709/224 |
| 6,690,411 B2* | 2/2004 | Naidoo | G08B 5/004 |
| | | | 348/E7.086 |
| 6,690,719 B1 | 2/2004 | Raphaeli et al. | |
| 6,693,530 B1 | 2/2004 | Dowens et al. | |
| 6,693,545 B2 | 2/2004 | Brown et al. | |
| 6,697,103 B1 | 2/2004 | Fernandez et al. | |
| 6,704,786 B1 | 3/2004 | Gupta et al. | |
| 6,716,101 B1 | 4/2004 | Meadows et al. | |
| 6,720,990 B1 | 4/2004 | Walker et al. | |
| 6,721,689 B2 | 4/2004 | Markle et al. | |
| 6,721,740 B1 | 4/2004 | Skinner et al. | |
| 6,721,747 B2 | 4/2004 | Lipkin | |
| 6,721,802 B1 | 4/2004 | Wright et al. | |
| 6,727,811 B1 | 4/2004 | Fendis | |
| 6,728,233 B1 | 4/2004 | Park et al. | |
| 6,728,688 B1 | 4/2004 | Hirsch et al. | |
| 6,738,824 B1 | 5/2004 | Blair | |
| 6,741,171 B2 | 5/2004 | Palka et al. | |
| 6,741,977 B1 | 5/2004 | Nagaya et al. | |
| 6,754,181 B1 | 6/2004 | Elliott et al. | |
| 6,754,717 B1 | 6/2004 | Day et al. | |
| 6,756,896 B2 | 6/2004 | Ford | |
| 6,756,988 B1 | 6/2004 | Wang et al. | |
| 6,756,998 B1* | 6/2004 | Bilger | H04L 12/2803 |
| | | | 715/767 |
| 6,759,956 B2 | 7/2004 | Menard et al. | |
| 6,762,686 B1 | 7/2004 | Tabe | |
| 6,763,377 B1 | 7/2004 | Belknap et al. | |
| 6,766,353 B1 | 7/2004 | Lin et al. | |
| 6,771,181 B1 | 8/2004 | Hughen, Jr. | |
| 6,778,085 B2 | 8/2004 | Faulkner et al. | |
| 6,779,019 B1 | 8/2004 | Mousseau et al. | |
| 6,781,509 B1 | 8/2004 | Oppedahl et al. | |
| 6,785,542 B1 | 8/2004 | Blight et al. | |
| 6,789,147 B1 | 9/2004 | Kessler et al. | |
| 6,795,322 B2 | 9/2004 | Aihara et al. | |
| 6,795,863 B1 | 9/2004 | Doty, Jr. | |
| 6,798,344 B2 | 9/2004 | Faulkner et al. | |
| 6,804,638 B2 | 10/2004 | Fiedler | |
| 6,810,409 B1 | 10/2004 | Fry et al. | |
| 6,810,420 B1 | 10/2004 | Buse et al. | |
| 6,823,223 B2 | 11/2004 | Gonzales et al. | |
| 6,826,173 B1 | 11/2004 | Kung et al. | |
| 6,826,233 B1 | 11/2004 | Oosawa | |
| 6,829,478 B1 | 12/2004 | Layton et al. | |
| 6,834,208 B2 | 12/2004 | Gonzales et al. | |
| 6,836,214 B2 | 12/2004 | Choi | |
| 6,850,252 B1 | 2/2005 | Hoffberg | |
| 6,856,236 B2 | 2/2005 | Christensen et al. | |
| 6,857,026 B1 | 2/2005 | Cain | |
| 6,859,831 B1 | 2/2005 | Gelvin et al. | |
| 6,865,690 B2 | 3/2005 | Kocin | |
| 6,871,193 B1 | 3/2005 | Campbell et al. | |
| 6,873,256 B2 | 3/2005 | Lemelson et al. | |
| 6,885,362 B2 | 4/2005 | Suomela | |
| D504,889 S | 5/2005 | Andre et al. | |
| 6,891,838 B1 | 5/2005 | Petite et al. | |
| 6,912,429 B1 | 6/2005 | Bilger | |
| 6,914,533 B2 | 7/2005 | Petite | |
| 6,918,112 B2 | 7/2005 | Bourke-Dunphy et al. | |
| 6,920,502 B2 | 7/2005 | Araujo et al. | |
| 6,920,615 B1 | 7/2005 | Campbell et al. | |
| 6,922,701 B1 | 7/2005 | Ananian et al. | |
| 6,928,148 B2 | 8/2005 | Simon et al. | |
| 6,930,598 B2 | 8/2005 | Weiss | |
| 6,930,599 B2 | 8/2005 | Naidoo et al. | |
| 6,930,730 B2 | 8/2005 | Maxson et al. | |
| 6,931,445 B2 | 8/2005 | Davis | |
| 6,941,258 B2 | 9/2005 | Van et al. | |
| 6,943,681 B2 | 9/2005 | Rezvani et al. | |
| 6,956,477 B2 | 10/2005 | Chun | |
| 6,957,075 B1 | 10/2005 | Iverson | |
| 6,957,186 B1 | 10/2005 | Guheen et al. | |
| 6,957,275 B1 | 10/2005 | Sekiguchi | |
| 6,959,341 B1 | 10/2005 | Leung | |
| 6,959,393 B2 | 10/2005 | Hollis et al. | |
| 6,963,908 B1 | 11/2005 | Lynch et al. | |
| 6,963,981 B1 | 11/2005 | Bailey et al. | |
| 6,965,294 B1 | 11/2005 | Elliott et al. | |
| 6,965,313 B1 | 11/2005 | Saylor et al. | |
| 6,970,183 B1 | 11/2005 | Monroe | |
| 6,971,063 B1 | 11/2005 | Rappaport et al. | |
| 6,971,076 B2 | 11/2005 | Chen | |
| 6,972,676 B1 | 12/2005 | Kimmel et al. | |
| 6,975,220 B1 | 12/2005 | Foodman et al. | |
| 6,977,485 B1 | 12/2005 | Wei | |
| 6,983,432 B2 | 1/2006 | Hayes | |
| 6,990,591 B1* | 1/2006 | Pearson | H04L 41/046 |
| | | | 726/22 |
| 6,993,658 B1 | 1/2006 | Engberg et al. | |
| 6,999,562 B2 | 2/2006 | Winick | |
| 6,999,992 B1 | 2/2006 | Deen et al. | |

(56) References Cited

U.S. PATENT DOCUMENTS

| | | |
|---|---|---|
| 7,015,806 B2 | 3/2006 | Naidoo et al. |
| 7,016,970 B2 | 3/2006 | Harumoto et al. |
| 7,019,639 B2 | 3/2006 | Stilp |
| 7,020,697 B1 | 3/2006 | Goodman et al. |
| 7,020,701 B1 | 3/2006 | Gelvin et al. |
| 7,023,913 B1 | 4/2006 | Monroe |
| 7,023,914 B2 | 4/2006 | Furukawa et al. |
| 7,023,975 B2 | 4/2006 | Mansfield et al. |
| 7,024,676 B1 | 4/2006 | Klopfenstein |
| 7,028,328 B2 | 4/2006 | Kogane et al. |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,042,880 B1 | 5/2006 | Voit et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,047,180 B1 | 5/2006 | Mathews et al. |
| 7,050,388 B2 | 5/2006 | Kim et al. |
| 7,053,764 B2 | 5/2006 | Stilp |
| 7,053,765 B1 | 5/2006 | Clark |
| 7,068,164 B1 | 6/2006 | Duncan et al. |
| 7,072,934 B2 | 7/2006 | Helgeson et al. |
| 7,073,140 B1 | 7/2006 | Li et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,084,756 B2 | 8/2006 | Stilp |
| 7,085,814 B1 | 8/2006 | Gandhi et al. |
| 7,085,937 B1 | 8/2006 | Rezvani et al. |
| 7,086,018 B2 | 8/2006 | Ito |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,111,072 B1 | 9/2006 | Matthews et al. |
| 7,113,090 B1 * | 9/2006 | Saylor ............... G08B 25/005 340/539.18 |
| 7,113,099 B2 | 9/2006 | Tyroler et al. |
| 7,114,554 B2 | 10/2006 | Bergman et al. |
| 7,119,609 B2 | 10/2006 | Naidoo et al. |
| 7,119,674 B2 | 10/2006 | Sefton |
| 7,120,139 B1 | 10/2006 | Kung et al. |
| 7,120,232 B2 | 10/2006 | Naidoo et al. |
| 7,120,233 B2 | 10/2006 | Naidoo et al. |
| 7,126,473 B1 | 10/2006 | Powell |
| 7,130,383 B2 * | 10/2006 | Naidoo ................ G07C 9/20 379/37 |
| 7,130,585 B1 | 10/2006 | Ollis et al. |
| 7,134,138 B2 | 11/2006 | Scherr |
| 7,136,711 B1 | 11/2006 | Duncan et al. |
| 7,142,503 B1 | 11/2006 | Grant et al. |
| 7,145,898 B1 | 12/2006 | Elliott |
| 7,147,147 B1 | 12/2006 | Enright et al. |
| 7,148,810 B2 * | 12/2006 | Bhat ................... G08B 25/08 340/286.11 |
| 7,149,798 B2 | 12/2006 | Rezvani et al. |
| 7,149,814 B2 | 12/2006 | Neufeld et al. |
| 7,158,026 B2 | 1/2007 | Feldkamp et al. |
| 7,158,776 B1 | 1/2007 | Estes et al. |
| 7,158,920 B2 | 1/2007 | Ishikawa |
| 7,164,883 B2 | 1/2007 | Rappaport et al. |
| 7,164,907 B2 | 1/2007 | Cochran et al. |
| 7,166,987 B2 | 1/2007 | Lee et al. |
| 7,171,466 B2 | 1/2007 | Van Der Meulen |
| 7,171,686 B1 | 1/2007 | Jansen et al. |
| 7,174,018 B1 | 2/2007 | Patil et al. |
| 7,174,564 B1 | 2/2007 | Weatherspoon et al. |
| 7,180,889 B1 | 2/2007 | Kung et al. |
| 7,181,207 B1 | 2/2007 | Chow et al. |
| 7,181,517 B1 | 2/2007 | Iavergne et al. |
| 7,181,571 B2 | 2/2007 | Jiang et al. |
| 7,181,716 B1 | 2/2007 | Dahroug |
| 7,183,907 B2 | 2/2007 | Simon et al. |
| 7,184,428 B1 | 2/2007 | Gerszberg et al. |
| 7,184,848 B2 | 2/2007 | Krzyzanowski et al. |
| 7,187,279 B2 | 3/2007 | Chung |
| 7,187,986 B2 | 3/2007 | Johnson et al. |
| 7,194,003 B2 | 3/2007 | Danner et al. |
| 7,194,446 B1 | 3/2007 | Bromley et al. |
| 7,197,125 B1 | 3/2007 | Prasad et al. |
| 7,203,486 B2 | 4/2007 | Patel |
| 7,209,945 B2 | 4/2007 | Hicks et al. |
| 7,212,570 B2 | 5/2007 | Akiyama et al. |
| 7,213,061 B1 | 5/2007 | Hite et al. |
| 7,218,217 B2 | 5/2007 | Adonailo et al. |
| 7,222,359 B2 | 5/2007 | Freund et al. |
| 7,229,012 B1 | 6/2007 | Enright et al. |
| 7,237,267 B2 | 6/2007 | Rayes et al. |
| 7,240,327 B2 | 7/2007 | Singh et al. |
| 7,246,044 B2 | 7/2007 | Imamura et al. |
| 7,248,150 B2 | 7/2007 | Mackjust et al. |
| 7,248,161 B2 | 7/2007 | Spoltore et al. |
| 7,249,177 B1 | 7/2007 | Miller |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,254,833 B1 | 8/2007 | Cornelius et al. |
| 7,262,690 B2 | 8/2007 | Heaton et al. |
| 7,277,010 B2 | 10/2007 | Joao |
| 7,292,142 B2 | 11/2007 | Simon et al. |
| 7,293,083 B1 | 11/2007 | Ranous et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| 7,313,231 B2 | 12/2007 | Reid |
| D558,460 S | 1/2008 | Yu et al. |
| D558,756 S | 1/2008 | Andre et al. |
| 7,315,886 B1 | 1/2008 | Meenan et al. |
| 7,337,217 B2 | 2/2008 | Wang |
| 7,337,473 B2 | 2/2008 | Chang et al. |
| 7,339,895 B2 | 3/2008 | Ozaki et al. |
| 7,340,314 B1 | 3/2008 | Duncan et al. |
| 7,343,619 B2 | 3/2008 | Ofek et al. |
| 7,345,580 B2 | 3/2008 | Akamatsu et al. |
| 7,346,338 B1 | 3/2008 | Calhoun et al. |
| 7,349,682 B1 | 3/2008 | Bennett et al. |
| 7,349,761 B1 | 3/2008 | Cruse |
| 7,349,967 B2 | 3/2008 | Wang |
| 7,356,372 B1 | 4/2008 | Duncan et al. |
| 7,359,843 B1 | 4/2008 | Keller et al. |
| 7,362,221 B2 | 4/2008 | Katz |
| 7,367,045 B2 | 4/2008 | Ofek et al. |
| 7,370,115 B2 | 5/2008 | Bae et al. |
| 7,383,339 B1 | 6/2008 | Meenan et al. |
| 7,383,522 B2 | 6/2008 | Murgai et al. |
| 7,391,298 B1 | 6/2008 | Campbell et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,440,767 B2 | 10/2008 | Ballay et al. |
| 7,447,775 B1 | 11/2008 | Zhu et al. |
| 7,454,731 B2 | 11/2008 | Oh et al. |
| 7,457,869 B2 | 11/2008 | Kernan |
| 7,466,223 B2 | 12/2008 | Sefton |
| 7,469,139 B2 | 12/2008 | van de Groenendaal |
| 7,469,294 B1 | 12/2008 | Luo et al. |
| 7,469,381 B2 | 12/2008 | Bas |
| 7,469,391 B2 | 12/2008 | Carrere et al. |
| D584,738 S | 1/2009 | Kim et al. |

(56) References Cited

U.S. PATENT DOCUMENTS

| | | |
|---|---|---|
| D585,399 S | 1/2009 | Hwang |
| 7,477,629 B2 | 1/2009 | Tsirtsis et al. |
| 7,479,949 B2 | 1/2009 | Jobs et al. |
| 7,480,713 B2 | 1/2009 | Ullman |
| 7,480,724 B2 | 1/2009 | Zimler et al. |
| 7,483,958 B1 | 1/2009 | Elabbady et al. |
| 7,490,350 B1 | 2/2009 | Murotake et al. |
| 7,493,651 B2 | 2/2009 | Vaenskae et al. |
| 7,498,695 B2 | 3/2009 | Gaudreau et al. |
| 7,502,672 B1 | 3/2009 | Kolls |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,535,880 B1 | 5/2009 | Hinman et al. |
| 7,542,721 B1 | 6/2009 | Bonner et al. |
| 7,549,134 B1 | 6/2009 | Li et al. |
| 7,551,071 B2 * | 6/2009 | Bennett, III ......... H04M 11/007 340/517 |
| 7,554,934 B2 | 6/2009 | Abraham et al. |
| 7,558,379 B2 | 7/2009 | Winick |
| 7,558,862 B1 | 7/2009 | Tyukasz et al. |
| 7,558,903 B2 | 7/2009 | Kinstler |
| 7,562,323 B1 | 7/2009 | Bai et al. |
| 7,564,855 B1 | 7/2009 | Georgiou |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,583,191 B2 | 9/2009 | Zinser |
| 7,584,263 B1 | 9/2009 | Hicks et al. |
| 7,587,464 B2 | 9/2009 | Moorer et al. |
| 7,590,953 B2 | 9/2009 | Chang |
| 7,595,816 B1 | 9/2009 | Enright et al. |
| 7,596,622 B2 | 9/2009 | Owen et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,606,767 B1 | 10/2009 | Couper et al. |
| 7,610,555 B2 | 10/2009 | Klein et al. |
| 7,610,559 B1 | 10/2009 | Humpleman et al. |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,639,157 B1 | 12/2009 | Whitley et al. |
| 7,651,530 B2 | 1/2010 | Winick |
| 7,653,911 B2 | 1/2010 | Doshi et al. |
| 7,671,729 B2 | 3/2010 | Hershkovitz et al. |
| 7,679,503 B2 | 3/2010 | Mason et al. |
| 7,681,201 B2 | 3/2010 | Dale et al. |
| 7,684,418 B2 | 3/2010 | Scott et al. |
| 7,696,873 B2 | 4/2010 | Sharma et al. |
| 7,697,028 B1 | 4/2010 | Johnson |
| 7,701,970 B2 | 4/2010 | Krits et al. |
| 7,702,421 B2 | 4/2010 | Sullivan et al. |
| 7,702,782 B1 | 4/2010 | Pai |
| D615,083 S | 5/2010 | Andre et al. |
| 7,711,796 B2 | 5/2010 | Gutt et al. |
| 7,720,654 B2 | 5/2010 | Hollis |
| 7,730,223 B1 | 6/2010 | Bavor et al. |
| 7,733,371 B1 | 6/2010 | Monroe |
| 7,734,020 B2 | 6/2010 | Elliot et al. |
| 7,734,286 B2 | 6/2010 | Almeda |
| 7,734,906 B2 | 6/2010 | Orlando et al. |
| 7,739,596 B2 | 6/2010 | Clarke-Martin et al. |
| 7,739,658 B2 | 6/2010 | Watson et al. |
| 7,747,975 B2 | 6/2010 | Dinter et al. |
| 7,751,409 B1 | 7/2010 | Carolan |
| 7,755,472 B2 | 7/2010 | Grossman |
| 7,755,506 B1 | 7/2010 | Clegg et al. |
| 7,756,928 B1 | 7/2010 | Meenan et al. |
| 7,761,275 B2 | 7/2010 | Chopra et al. |
| 7,787,863 B2 | 8/2010 | van de Groenendaal |
| 7,804,760 B2 | 9/2010 | Schmukler et al. |
| D624,896 S | 10/2010 | Park et al. |
| D626,437 S | 11/2010 | Lee et al. |
| 7,825,793 B1 | 11/2010 | Spillman et al. |
| 7,827,252 B2 | 11/2010 | Hopmann et al. |
| 7,844,699 B1 | 11/2010 | Horrocks et al. |
| 7,847,675 B1 | 12/2010 | Thyen et al. |
| 7,855,635 B2 | 12/2010 | Cohn et al. |
| 7,859,404 B2 | 12/2010 | Chul et al. |
| 7,882,466 B2 | 2/2011 | Ishikawa |
| 7,882,537 B2 | 2/2011 | Okajo et al. |
| 7,884,855 B2 | 2/2011 | Ortiz |
| 7,890,612 B2 | 2/2011 | Todd et al. |
| 7,890,915 B2 | 2/2011 | Celik et al. |
| 7,899,732 B2 | 3/2011 | Van et al. |
| 7,904,074 B2 | 3/2011 | Karaoguz et al. |
| 7,904,187 B2 | 3/2011 | Hoffberg et al. |
| 7,911,341 B2 | 3/2011 | Raji et al. |
| 7,912,447 B2 | 3/2011 | Bennett et al. |
| 7,917,624 B2 | 3/2011 | Gidwani |
| D636,769 S | 4/2011 | Wood et al. |
| 7,921,686 B2 | 4/2011 | Bagepalli et al. |
| 7,928,840 B2 | 4/2011 | Kim et al. |
| 7,930,365 B2 | 4/2011 | Dixit et al. |
| D637,596 S | 5/2011 | Akana et al. |
| 7,949,960 B2 | 5/2011 | Roessler et al. |
| D639,805 S | 6/2011 | Song et al. |
| D640,663 S | 6/2011 | Holt et al. |
| 7,956,736 B2 | 6/2011 | Cohn et al. |
| 7,957,326 B1 | 6/2011 | Christie, IV |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,032,881 B2 | 10/2011 | Holmberg et al. |
| 8,042,049 B2 | 10/2011 | Killian et al. |
| 8,046,411 B2 | 10/2011 | Hayashi et al. |
| 8,046,721 B2 | 10/2011 | Chaudhri et al. |
| 8,069,194 B1 | 11/2011 | Manber et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,144,836 B2 | 3/2012 | Naidoo et al. |
| 8,149,849 B2 | 4/2012 | Osborn et al. |
| 8,159,519 B2 | 4/2012 | Kurtz et al. |
| 8,159,945 B2 | 4/2012 | Muro et al. |
| 8,160,425 B2 | 4/2012 | Kisliakov |
| 8,196,064 B2 | 6/2012 | Krzyzanowski et al. |
| 8,200,827 B1 | 6/2012 | Hunyady et al. |
| 8,205,181 B1 | 6/2012 | Singla et al. |
| 8,209,400 B2 | 6/2012 | Baum et al. |
| D663,298 S | 7/2012 | Song et al. |
| D664,540 S | 7/2012 | Kim et al. |
| 8,214,494 B1 | 7/2012 | Slavin |
| 8,214,496 B2 | 7/2012 | Gutt et al. |
| 8,219,254 B2 | 7/2012 | O'Connor |
| 8,229,812 B2 | 7/2012 | Raleigh |
| D664,954 S | 8/2012 | Kim et al. |
| D666,198 S | 8/2012 | Van et al. |
| 8,239,477 B2 | 8/2012 | Sharma et al. |
| 8,244,550 B2 | 8/2012 | Sim et al. |
| D667,395 S | 9/2012 | Lee |

(56) References Cited

U.S. PATENT DOCUMENTS

| | | |
|---|---|---|
| D667,396 S | 9/2012 | Koh |
| D667,397 S | 9/2012 | Koh |
| D667,398 S | 9/2012 | Koh |
| D667,399 S | 9/2012 | Koh |
| 8,269,376 B1 | 9/2012 | Elberbaum |
| 8,269,623 B2 | 9/2012 | Addy |
| 8,271,629 B1 | 9/2012 | Winters et al. |
| 8,271,881 B2 | 9/2012 | Moorer et al. |
| 8,272,053 B2 | 9/2012 | Markham et al. |
| 8,275,830 B2 | 9/2012 | Raleigh |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| 8,336,010 B1 | 12/2012 | Chang et al. |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| 8,350,694 B1 | 1/2013 | Trundle et al. |
| 8,363,791 B2 | 1/2013 | Gupta et al. |
| D675,588 S | 2/2013 | Park |
| D675,612 S | 2/2013 | Andre et al. |
| D676,443 S | 2/2013 | Canizares et al. |
| D676,819 S | 2/2013 | Choi |
| 8,373,313 B2 | 2/2013 | Garcia et al. |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| 8,396,766 B1 | 3/2013 | Enright et al. |
| 8,400,767 B2 | 3/2013 | Yeom et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| 8,413,204 B2 | 4/2013 | White et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,456,293 B1 | 6/2013 | Trundle et al. |
| 8,473,619 B2 | 6/2013 | Baum et al. |
| D685,778 S | 7/2013 | Fahrendorff et al. |
| D685,783 S | 7/2013 | Bryan et al. |
| 8,478,450 B2 | 7/2013 | Lu et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,493,202 B1 | 7/2013 | Trundle et al. |
| 8,499,038 B2 | 7/2013 | Vucurevich |
| 8,520,068 B2 | 8/2013 | Naidoo et al. |
| 8,520,072 B1 | 8/2013 | Slavin et al. |
| 8,525,664 B2 | 9/2013 | Hadizad et al. |
| 8,543,665 B2 | 9/2013 | Ansari et al. |
| D692,042 S | 10/2013 | Dawes et al. |
| 8,554,478 B2 * | 10/2013 | Hartman ............... G01S 17/87 |
| | | 701/472 |
| 8,560,041 B2 | 10/2013 | Flaherty et al. |
| 8,570,993 B2 | 10/2013 | Austin et al. |
| 8,584,199 B1 | 11/2013 | Chen et al. |
| 8,595,377 B1 | 11/2013 | Apgar et al. |
| D695,735 S | 12/2013 | Kitchen et al. |
| 8,599,018 B2 | 12/2013 | Kellen et al. |
| 8,612,591 B2 | 12/2013 | Dawes et al. |
| 8,634,533 B2 | 1/2014 | Strasters |
| 8,635,350 B2 | 1/2014 | Gutt et al. |
| 8,635,499 B2 | 1/2014 | Cohn et al. |
| 8,638,211 B2 | 1/2014 | Cohn et al. |
| 8,649,386 B2 | 2/2014 | Ansari et al. |
| 8,650,320 B1 | 2/2014 | Merrick et al. |
| 8,666,560 B2 | 3/2014 | Lu et al. |
| 8,675,071 B1 | 3/2014 | Slavin et al. |
| 8,700,769 B2 | 4/2014 | Alexander et al. |
| 8,704,821 B2 | 4/2014 | Kulkarni et al. |
| 8,713,132 B2 | 4/2014 | Baum et al. |
| 8,723,671 B2 | 5/2014 | Foisy et al. |
| 8,730,834 B2 | 5/2014 | Marusca et al. |
| 8,738,765 B2 | 5/2014 | Wyatt et al. |
| 8,812,654 B2 | 8/2014 | Gelvin et al. |
| 8,817,809 B2 | 8/2014 | Gage |
| 8,819,178 B2 | 8/2014 | Baum et al. |
| 8,825,871 B2 | 9/2014 | Baum et al. |
| 8,832,244 B2 | 9/2014 | Gelvin et al. |
| 8,836,467 B1 | 9/2014 | Cohn et al. |
| 8,868,678 B2 | 10/2014 | Hildreth et al. |
| 8,885,552 B2 | 11/2014 | Bedingfield et al. |
| 8,902,740 B2 | 12/2014 | Hicks, III |
| 8,914,526 B1 | 12/2014 | Lindquist et al. |
| 8,914,837 B2 | 12/2014 | Ahmed et al. |
| 8,935,236 B2 | 1/2015 | Morita et al. |
| 8,937,539 B2 | 1/2015 | Sharma et al. |
| 8,937,658 B2 | 1/2015 | Hicks et al. |
| 8,953,479 B2 | 2/2015 | Hall et al. |
| 8,953,749 B2 | 2/2015 | Naidoo et al. |
| 8,963,713 B2 | 2/2015 | Dawes et al. |
| 8,976,763 B2 | 3/2015 | Shrestha et al. |
| 8,983,534 B2 | 3/2015 | Patel |
| 8,988,217 B2 | 3/2015 | Piccolo, III |
| 8,988,221 B2 | 3/2015 | Raji et al. |
| 8,989,922 B2 * | 3/2015 | Jones ............... G06Q 30/0261 |
| | | 701/3 |
| 8,996,665 B2 | 3/2015 | Baum et al. |
| 9,047,753 B2 | 6/2015 | Dawes et al. |
| 9,059,863 B2 | 6/2015 | Baum et al. |
| 9,064,394 B1 | 6/2015 | Trundle |
| 9,094,407 B1 | 7/2015 | Matthieu et al. |
| 9,100,446 B2 * | 8/2015 | Cohn ................... G08B 13/00 |
| 9,141,276 B2 | 9/2015 | Dawes et al. |
| 9,144,143 B2 | 9/2015 | Raji et al. |
| 9,146,548 B2 | 9/2015 | Chambers et al. |
| 9,147,337 B2 | 9/2015 | Cohn et al. |
| 9,160,784 B2 | 10/2015 | Jeong et al. |
| 9,164,669 B1 | 10/2015 | Yaksick et al. |
| 9,170,707 B1 | 10/2015 | Laska et al. |
| 9,172,532 B2 | 10/2015 | Fuller et al. |
| 9,172,533 B2 | 10/2015 | Fielder |
| 9,172,553 B2 | 10/2015 | Dawes et al. |
| 9,172,605 B2 | 10/2015 | Hardy et al. |
| 9,189,934 B2 | 11/2015 | Jentoft et al. |
| 9,191,228 B2 | 11/2015 | Fulker et al. |
| 9,202,362 B2 | 12/2015 | Hyland et al. |
| 9,246,921 B1 | 1/2016 | Vlaminck et al. |
| 9,286,772 B2 | 3/2016 | Shapiro et al. |
| 9,287,727 B1 | 3/2016 | Egan et al. |
| 9,300,921 B2 | 3/2016 | Naidoo et al. |
| 9,306,809 B2 | 4/2016 | Dawes et al. |
| 9,310,864 B1 | 4/2016 | Klein et al. |
| 9,373,014 B1 * | 6/2016 | Mehranfar ......... G06K 7/10366 |
| 9,412,248 B1 | 8/2016 | Cohn et al. |
| 9,426,720 B2 | 8/2016 | Cohn et al. |
| 9,450,776 B2 | 9/2016 | Baum et al. |
| 9,462,041 B1 | 10/2016 | Hagins et al. |
| 9,510,065 B2 | 11/2016 | Cohn et al. |
| 9,529,344 B1 | 12/2016 | Hagins et al. |
| 9,531,593 B2 | 12/2016 | Baum et al. |
| 9,553,738 B2 | 1/2017 | Meenan et al. |

(56) References Cited

U.S. PATENT DOCUMENTS

| | | |
|---|---|---|
| 9,600,945 B2 | 3/2017 | Naidoo et al. |
| 9,609,003 B1 | 3/2017 | Chmielewski et al. |
| 9,613,524 B1 | 4/2017 | Lamb et al. |
| 9,621,408 B2 | 4/2017 | Gutt et al. |
| 9,721,461 B2 | 8/2017 | Zeng et al. |
| 9,729,342 B2 | 8/2017 | Cohn et al. |
| 9,761,123 B2 | 9/2017 | Ramasubbu et al. |
| 9,779,595 B2 | 10/2017 | Thibault |
| 9,805,587 B2 | 10/2017 | Lamb |
| 9,819,911 B2 * | 11/2017 | K V ............... G08B 13/19697 |
| 9,824,234 B2 | 11/2017 | Cho et al. |
| 9,843,458 B2 | 12/2017 | Cronin |
| 9,876,651 B2 | 1/2018 | Cho et al. |
| 9,882,985 B1 | 1/2018 | Esam et al. |
| 9,978,238 B2 | 5/2018 | Fadell et al. |
| 9,979,625 B2 | 5/2018 | McLaughlin et al. |
| 10,002,507 B2 | 6/2018 | Wilson et al. |
| 10,025,473 B2 | 7/2018 | Sarao et al. |
| 10,051,078 B2 | 8/2018 | Burd et al. |
| 10,062,245 B2 | 8/2018 | Fulker et al. |
| 10,062,273 B2 | 8/2018 | Raji et al. |
| 10,078,958 B2 | 9/2018 | Cohn et al. |
| 10,079,839 B1 | 9/2018 | Bryan et al. |
| 10,108,272 B1 | 10/2018 | Debates et al. |
| 10,120,354 B1 | 11/2018 | Rolston et al. |
| 10,237,757 B2 | 3/2019 | Raleigh et al. |
| 10,257,474 B2 | 4/2019 | Nadathur et al. |
| 10,264,138 B2 | 4/2019 | Raleigh et al. |
| 10,354,517 B1 | 7/2019 | King |
| 10,380,873 B1 | 8/2019 | Halverson |
| 10,430,887 B1 | 10/2019 | Parker et al. |
| 10,687,270 B2 | 6/2020 | Ishii |
| 10,782,681 B1 * | 9/2020 | Slavin .................... G06Q 10/04 |
| 10,868,712 B1 | 12/2020 | Hutz |
| 11,417,159 B2 | 8/2022 | Li et al. |
| 2001/0012775 A1 | 8/2001 | Modzelesky et al. |
| 2001/0016501 A1 | 8/2001 | King |
| 2001/0022836 A1 | 9/2001 | Bremer et al. |
| 2001/0025349 A1 | 9/2001 | Sharood et al. |
| 2001/0029585 A1 | 10/2001 | Simon et al. |
| 2001/0030597 A1 | 10/2001 | Inoue et al. |
| 2001/0034209 A1 | 10/2001 | Tong et al. |
| 2001/0034754 A1 | 10/2001 | Elwahab et al. |
| 2001/0034759 A1 | 10/2001 | Chiles et al. |
| 2001/0036192 A1 | 11/2001 | Chiles et al. |
| 2001/0042137 A1 | 11/2001 | Ota et al. |
| 2001/0044835 A1 | 11/2001 | Schober et al. |
| 2001/0046366 A1 | 11/2001 | Susskind |
| 2001/0047474 A1 | 11/2001 | Takagi et al. |
| 2001/0048030 A1 | 12/2001 | Sharood et al. |
| 2001/0053207 A1 | 12/2001 | Jeon et al. |
| 2001/0054115 A1 | 12/2001 | Ferguson et al. |
| 2002/0000092 A1 | 1/2002 | Sharood et al. |
| 2002/0000913 A1 | 1/2002 | Hamamoto et al. |
| 2002/0003575 A1 | 1/2002 | Marchese |
| 2002/0004828 A1 * | 1/2002 | Davis ................. H04L 41/0226 709/246 |
| 2002/0005894 A1 | 1/2002 | Foodman et al. |
| 2002/0016639 A1 | 2/2002 | Smith et al. |
| 2002/0018057 A1 | 2/2002 | Sano |
| 2002/0018478 A1 | 2/2002 | Takeyama et al. |
| 2002/0019751 A1 | 2/2002 | Rothschild et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0028696 A1 | 3/2002 | Hirayama et al. |
| 2002/0029276 A1 | 3/2002 | Bendinelli et al. |
| 2002/0031120 A1 | 3/2002 | Rakib |
| 2002/0032853 A1 | 3/2002 | Preston et al. |
| 2002/0035633 A1 | 3/2002 | Bose et al. |
| 2002/0037004 A1 | 3/2002 | Bossemeyer et al. |
| 2002/0038380 A1 | 3/2002 | Brawn et al. |
| 2002/0046280 A1 | 4/2002 | Fujita |
| 2002/0046301 A1 | 4/2002 | Shannon et al. |
| 2002/0052719 A1 | 5/2002 | Alexander et al. |
| 2002/0052913 A1 | 5/2002 | Yamada et al. |
| 2002/0055977 A1 | 5/2002 | Nishi |
| 2002/0059078 A1 | 5/2002 | Valdes et al. |
| 2002/0059148 A1 | 5/2002 | Rosenhaft et al. |
| 2002/0059637 A1 | 5/2002 | Rakib |
| 2002/0068558 A1 | 6/2002 | Janik |
| 2002/0068984 A1 | 6/2002 | Alexander et al. |
| 2002/0072868 A1 | 6/2002 | Bartone et al. |
| 2002/0073236 A1 | 6/2002 | Helgeson et al. |
| 2002/0075153 A1 | 6/2002 | Dahl |
| 2002/0077077 A1 | 6/2002 | Rezvani et al. |
| 2002/0080771 A1 | 6/2002 | Krumel |
| 2002/0083342 A1 | 6/2002 | Webb et al. |
| 2002/0085488 A1 | 7/2002 | Kobayashi |
| 2002/0091815 A1 | 7/2002 | Anderson et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0099854 A1 | 7/2002 | Jorgensen |
| 2002/0101858 A1 | 8/2002 | Stuart et al. |
| 2002/0103898 A1 * | 8/2002 | Moyer ................ H04L 65/1104 709/224 |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0118796 A1 | 8/2002 | Menard et al. |
| 2002/0119800 A1 | 8/2002 | Jaggers et al. |
| 2002/0120696 A1 | 8/2002 | Mousseau et al. |
| 2002/0120698 A1 | 8/2002 | Tamargo |
| 2002/0120790 A1 | 8/2002 | Schwalb |
| 2002/0126009 A1 | 9/2002 | Oyagi et al. |
| 2002/0128728 A1 | 9/2002 | Murakami et al. |
| 2002/0131404 A1 | 9/2002 | Mehta et al. |
| 2002/0133539 A1 | 9/2002 | Monday |
| 2002/0133578 A1 | 9/2002 | Wu |
| 2002/0136167 A1 | 9/2002 | Steele et al. |
| 2002/0143805 A1 | 10/2002 | Hayes et al. |
| 2002/0143923 A1 | 10/2002 | Alexander |
| 2002/0147982 A1 | 10/2002 | Naidoo et al. |
| 2002/0150086 A1 | 10/2002 | Bailey et al. |
| 2002/0152298 A1 | 10/2002 | Kikta et al. |
| 2002/0152432 A1 | 10/2002 | Fleming |
| 2002/0156564 A1 | 10/2002 | Preston et al. |
| 2002/0156899 A1 | 10/2002 | Sekiguchi |
| 2002/0161885 A1 | 10/2002 | Childers et al. |
| 2002/0163534 A1 | 11/2002 | Choi et al. |
| 2002/0163997 A1 | 11/2002 | Bergman et al. |
| 2002/0164953 A1 | 11/2002 | Curtis |
| 2002/0164997 A1 | 11/2002 | Parry |
| 2002/0165006 A1 | 11/2002 | Haller et al. |
| 2002/0166125 A1 | 11/2002 | Fulmer |
| 2002/0174367 A1 | 11/2002 | Kimmel et al. |
| 2002/0174434 A1 | 11/2002 | Lee et al. |
| 2002/0177428 A1 | 11/2002 | Menard et al. |
| 2002/0177482 A1 | 11/2002 | Cheong et al. |
| 2002/0178100 A1 | 11/2002 | Koveos |
| 2002/0178211 A1 | 11/2002 | Singhal et al. |
| 2002/0180579 A1 | 12/2002 | Nagaoka et al. |
| 2002/0184301 A1 | 12/2002 | Parent |
| 2002/0184527 A1 | 12/2002 | Chun et al. |
| 2002/0186683 A1 | 12/2002 | Buck |
| 2002/0188723 A1 | 12/2002 | Choi et al. |
| 2002/0191636 A1 | 12/2002 | Hallenbeck |
| 2003/0001883 A1 | 1/2003 | Wang |
| 2003/0004088 A1 | 1/2003 | Ushio et al. |
| 2003/0005030 A1 | 1/2003 | Sutton et al. |
| 2003/0006879 A1 | 1/2003 | Kang et al. |
| 2003/0009552 A1 | 1/2003 | Benfield et al. |
| 2003/0009553 A1 | 1/2003 | Benfield et al. |
| 2003/0010243 A1 | 1/2003 | Roller |
| 2003/0023839 A1 | 1/2003 | Burkhardt et al. |
| 2003/0025599 A1 | 2/2003 | Monroe |
| 2003/0028294 A1 | 2/2003 | Yanagi |

(56) References Cited

U.S. PATENT DOCUMENTS

| | | |
|---|---|---|
| 2003/0028398 A1 | 2/2003 | Yamashita et al. |
| 2003/0030548 A1 | 2/2003 | Kovacs et al. |
| 2003/0031165 A1 | 2/2003 | O'Brien |
| 2003/0038730 A1 | 2/2003 | Imafuku et al. |
| 2003/0038849 A1 | 2/2003 | Craven et al. |
| 2003/0039242 A1 | 2/2003 | Richard |
| 2003/0040813 A1 | 2/2003 | Gonzales et al. |
| 2003/0041137 A1 | 2/2003 | Horie et al. |
| 2003/0041167 A1 | 2/2003 | French et al. |
| 2003/0046557 A1 | 3/2003 | Miller et al. |
| 2003/0050731 A1 | 3/2003 | Rosenblum |
| 2003/0050737 A1 | 3/2003 | Osann |
| 2003/0051009 A1 | 3/2003 | Shah et al. |
| 2003/0051026 A1 | 3/2003 | Carter et al. |
| 2003/0052905 A1 | 3/2003 | Gordon et al. |
| 2003/0052923 A1 | 3/2003 | Porter |
| 2003/0056012 A1 | 3/2003 | Modeste et al. |
| 2003/0056014 A1 | 3/2003 | Verberkt et al. |
| 2003/0060900 A1 | 3/2003 | Lo et al. |
| 2003/0061344 A1 | 3/2003 | Monroe |
| 2003/0061615 A1 | 3/2003 | Van Der Meulen |
| 2003/0061621 A1 | 3/2003 | Petty et al. |
| 2003/0062997 A1* | 4/2003 | Naidoo ............ G08B 13/19691 348/E7.086 |
| 2003/0065407 A1 | 4/2003 | Johnson et al. |
| 2003/0065757 A1 | 4/2003 | Mentze et al. |
| 2003/0065784 A1 | 4/2003 | Herrod |
| 2003/0065791 A1 | 4/2003 | Garg et al. |
| 2003/0067923 A1 | 4/2003 | Ju et al. |
| 2003/0069854 A1 | 4/2003 | Hsu et al. |
| 2003/0069948 A1 | 4/2003 | Ma et al. |
| 2003/0071724 A1 | 4/2003 | D'Amico |
| 2003/0071840 A1 | 4/2003 | Huang et al. |
| 2003/0073406 A1 | 4/2003 | Benjamin et al. |
| 2003/0074088 A1 | 4/2003 | Gonzales et al. |
| 2003/0074090 A1 | 4/2003 | Becka et al. |
| 2003/0081768 A1 | 5/2003 | Caminschi |
| 2003/0084165 A1 | 5/2003 | Nellberg et al. |
| 2003/0090473 A1 | 5/2003 | Joshi |
| 2003/0096590 A1 | 5/2003 | Satoh |
| 2003/0101243 A1 | 5/2003 | Donahue et al. |
| 2003/0101459 A1 | 5/2003 | Edson |
| 2003/0103088 A1 | 6/2003 | Dresti et al. |
| 2003/0105850 A1 | 6/2003 | Lean et al. |
| 2003/0110262 A1 | 6/2003 | Hasan et al. |
| 2003/0110302 A1 | 6/2003 | Hodges et al. |
| 2003/0112866 A1 | 6/2003 | Yu et al. |
| 2003/0113100 A1 | 6/2003 | Hecht et al. |
| 2003/0115345 A1 | 6/2003 | Chien et al. |
| 2003/0120593 A1 | 6/2003 | Bansal et al. |
| 2003/0123419 A1 | 7/2003 | Rangnekar et al. |
| 2003/0123634 A1 | 7/2003 | Chee |
| 2003/0126236 A1 | 7/2003 | Marl et al. |
| 2003/0128114 A1 | 7/2003 | Quigley |
| 2003/0128115 A1 | 7/2003 | Giacopelli et al. |
| 2003/0132018 A1 | 7/2003 | Okita et al. |
| 2003/0134590 A1 | 7/2003 | Suda et al. |
| 2003/0137426 A1 | 7/2003 | Anthony et al. |
| 2003/0137991 A1 | 7/2003 | Doshi et al. |
| 2003/0147534 A1 | 8/2003 | Ablay et al. |
| 2003/0149671 A1 | 8/2003 | Yamamoto et al. |
| 2003/0153325 A1 | 8/2003 | Veerepalli et al. |
| 2003/0155757 A1 | 8/2003 | Larsen et al. |
| 2003/0158609 A1 | 8/2003 | Chiu |
| 2003/0158635 A1 | 8/2003 | Pillar et al. |
| 2003/0159135 A1 | 8/2003 | Hiller et al. |
| 2003/0163514 A1 | 8/2003 | Waldschmidt |
| 2003/0169728 A1 | 9/2003 | Choi |
| 2003/0172145 A1 | 9/2003 | Nguyen |
| 2003/0174154 A1 | 9/2003 | Yukie et al. |
| 2003/0174648 A1 | 9/2003 | Wang et al. |
| 2003/0174717 A1 | 9/2003 | Zabarski et al. |
| 2003/0177236 A1 | 9/2003 | Goto et al. |
| 2003/0182396 A1 | 9/2003 | Reich et al. |
| 2003/0182640 A1 | 9/2003 | Alani et al. |
| 2003/0184436 A1 | 10/2003 | Seales et al. |
| 2003/0187920 A1 | 10/2003 | Redkar |
| 2003/0187938 A1 | 10/2003 | Mousseau et al. |
| 2003/0189509 A1 | 10/2003 | Hayes et al. |
| 2003/0193991 A1 | 10/2003 | Lansford |
| 2003/0196115 A1 | 10/2003 | Karp |
| 2003/0197847 A1 | 10/2003 | Shinoda |
| 2003/0198938 A1 | 10/2003 | Murray et al. |
| 2003/0200285 A1 | 10/2003 | Hansen et al. |
| 2003/0200325 A1* | 10/2003 | Krishnaswamy ..... H04L 69/329 709/230 |
| 2003/0201889 A1 | 10/2003 | Zulkowski |
| 2003/0208610 A1 | 11/2003 | Rochetti et al. |
| 2003/0210126 A1 | 11/2003 | Kanazawa |
| 2003/0214775 A1 | 11/2003 | Fukuta et al. |
| 2003/0216143 A1 | 11/2003 | Roese et al. |
| 2003/0217110 A1 | 11/2003 | Weiss |
| 2003/0217136 A1 | 11/2003 | Cho et al. |
| 2003/0225883 A1 | 12/2003 | Greaves et al. |
| 2003/0227382 A1 | 12/2003 | Breed |
| 2003/0227439 A1 | 12/2003 | Lee et al. |
| 2003/0229779 A1 | 12/2003 | Morais et al. |
| 2003/0230934 A1 | 12/2003 | Cordelli et al. |
| 2003/0233155 A1 | 12/2003 | Slemmer et al. |
| 2003/0233332 A1 | 12/2003 | Keeler et al. |
| 2003/0233429 A1 | 12/2003 | Matte et al. |
| 2003/0233549 A1 | 12/2003 | Hatakeyama et al. |
| 2003/0233583 A1 | 12/2003 | Carley |
| 2003/0233594 A1 | 12/2003 | Earl |
| 2003/0234725 A1 | 12/2003 | Lemelson et al. |
| 2003/0236841 A1 | 12/2003 | Epshteyn |
| 2004/0003051 A1 | 1/2004 | Krzyzanowski et al. |
| 2004/0003241 A1 | 1/2004 | Sengodan et al. |
| 2004/0005039 A1 | 1/2004 | White et al. |
| 2004/0008724 A1 | 1/2004 | Devine et al. |
| 2004/0015572 A1 | 1/2004 | Kang |
| 2004/0024851 A1 | 2/2004 | Naidoo et al. |
| 2004/0034697 A1 | 2/2004 | Fairhurst et al. |
| 2004/0034798 A1 | 2/2004 | Yamada et al. |
| 2004/0036615 A1 | 2/2004 | Candela |
| 2004/0037295 A1* | 2/2004 | Tanaka ................. H04L 12/4691 370/395.2 |
| 2004/0039459 A1 | 2/2004 | Daugherty et al. |
| 2004/0041910 A1 | 3/2004 | Naidoo et al. |
| 2004/0049321 A1 | 3/2004 | Lehr et al. |
| 2004/0054718 A1 | 3/2004 | Hicks et al. |
| 2004/0054789 A1 | 3/2004 | Breh et al. |
| 2004/0056665 A1 | 3/2004 | Iwanaga et al. |
| 2004/0064351 A1 | 4/2004 | Mikurak |
| 2004/0068583 A1 | 4/2004 | Monroe et al. |
| 2004/0068657 A1 | 4/2004 | Alexander et al. |
| 2004/0068668 A1 | 4/2004 | Lor et al. |
| 2004/0075738 A1 | 4/2004 | Burke et al. |
| 2004/0078825 A1 | 4/2004 | Murphy |
| 2004/0083015 A1 | 4/2004 | Patwari |
| 2004/0086088 A1* | 5/2004 | Naidoo ................. G08C 17/02 379/38 |
| 2004/0086090 A1 | 5/2004 | Naidoo et al. |
| 2004/0086093 A1 | 5/2004 | Schranz |
| 2004/0093492 A1 | 5/2004 | Daude et al. |
| 2004/0095943 A1 | 5/2004 | Korotin |
| 2004/0102859 A1 | 5/2004 | Bennett |
| 2004/0103308 A1 | 5/2004 | Paller |
| 2004/0107027 A1 | 6/2004 | Boudrieau |
| 2004/0107299 A1 | 6/2004 | Lee et al. |
| 2004/0111294 A1 | 6/2004 | McNally et al. |
| 2004/0113770 A1 | 6/2004 | Falk et al. |
| 2004/0113778 A1 | 6/2004 | Script et al. |
| 2004/0113937 A1 | 6/2004 | Sawdey et al. |
| 2004/0117068 A1 | 6/2004 | Lee |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0123149 A1 | 6/2004 | Tyroler |
| 2004/0125146 A1 | 7/2004 | Gerlach et al. |
| 2004/0125782 A1 | 7/2004 | Chang |
| 2004/0125931 A1 | 7/2004 | Archer |
| 2004/0133689 A1 | 7/2004 | Vasisht |
| 2004/0136386 A1 | 7/2004 | Miller et al. |

(56) References Cited

U.S. PATENT DOCUMENTS

| | | |
|---|---|---|
| 2004/0137915 A1 | 7/2004 | Diener et al. |
| 2004/0139227 A1 | 7/2004 | Takeda |
| 2004/0143428 A1 | 7/2004 | Rappaport et al. |
| 2004/0143602 A1* | 7/2004 | Ruiz .................. G08B 13/122 348/E7.086 |
| 2004/0143749 A1 | 7/2004 | Tajalli et al. |
| 2004/0153171 A1 | 8/2004 | Brandt et al. |
| 2004/0155757 A1 | 8/2004 | Litwin et al. |
| 2004/0160309 A1 | 8/2004 | Stilp |
| 2004/0162902 A1 | 8/2004 | Davis |
| 2004/0163073 A1 | 8/2004 | Krzyzanowski et al. |
| 2004/0163118 A1 | 8/2004 | Mottur |
| 2004/0163705 A1 | 8/2004 | Uhler |
| 2004/0169288 A1 | 9/2004 | Hsieh et al. |
| 2004/0170120 A1 | 9/2004 | Reunamaki et al. |
| 2004/0170155 A1 | 9/2004 | Omar et al. |
| 2004/0172396 A1 | 9/2004 | Vanska et al. |
| 2004/0172657 A1 | 9/2004 | Phillips et al. |
| 2004/0177163 A1 | 9/2004 | Casey et al. |
| 2004/0181693 A1 | 9/2004 | Milliot et al. |
| 2004/0183756 A1 | 9/2004 | Freitas et al. |
| 2004/0189460 A1 | 9/2004 | Heaton et al. |
| 2004/0189471 A1 | 9/2004 | Ciarcia et al. |
| 2004/0189871 A1 | 9/2004 | Kurosawa et al. |
| 2004/0196844 A1 | 10/2004 | Hagino |
| 2004/0198386 A1 | 10/2004 | Dupray |
| 2004/0199645 A1 | 10/2004 | Rouhi |
| 2004/0201472 A1 | 10/2004 | McGunn et al. |
| 2004/0202351 A1 | 10/2004 | Park et al. |
| 2004/0212494 A1 | 10/2004 | Stilp |
| 2004/0212497 A1 | 10/2004 | Stilp |
| 2004/0212500 A1 | 10/2004 | Stilp |
| 2004/0212503 A1 | 10/2004 | Stilp |
| 2004/0212687 A1 | 10/2004 | Patwari |
| 2004/0213150 A1 | 10/2004 | Krause et al. |
| 2004/0215694 A1 | 10/2004 | Podolsky |
| 2004/0215700 A1 | 10/2004 | Shenfield et al. |
| 2004/0215750 A1 | 10/2004 | Stilp |
| 2004/0215955 A1 | 10/2004 | Tamai et al. |
| 2004/0218591 A1 | 11/2004 | Ogawa et al. |
| 2004/0220830 A1 | 11/2004 | Moreton et al. |
| 2004/0223605 A1 | 11/2004 | Donnelly |
| 2004/0225516 A1 | 11/2004 | Bruskotter et al. |
| 2004/0225719 A1 | 11/2004 | Kisley et al. |
| 2004/0225878 A1 | 11/2004 | Costa-Requena et al. |
| 2004/0229569 A1 | 11/2004 | Franz |
| 2004/0243714 A1 | 12/2004 | Wynn et al. |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249613 A1 | 12/2004 | Sprogis et al. |
| 2004/0249922 A1 | 12/2004 | Hackman et al. |
| 2004/0253926 A1 | 12/2004 | Gross |
| 2004/0257433 A1 | 12/2004 | Lia et al. |
| 2004/0258032 A1 | 12/2004 | Kawamura |
| 2004/0260407 A1 | 12/2004 | Wimsatt |
| 2004/0260427 A1 | 12/2004 | Wimsatt |
| 2004/0260527 A1 | 12/2004 | Stanculescu |
| 2004/0263314 A1 | 12/2004 | Dorai et al. |
| 2004/0263625 A1 | 12/2004 | Ishigami et al. |
| 2004/0263626 A1 | 12/2004 | Piccionelli |
| 2004/0266493 A1 | 12/2004 | Bahl et al. |
| 2004/0267385 A1 | 12/2004 | Lingemann |
| 2004/0267937 A1 | 12/2004 | Klemets |
| 2004/0268298 A1 | 12/2004 | Miller et al. |
| 2005/0002335 A1 | 1/2005 | Adamczyk et al. |
| 2005/0002408 A1 | 1/2005 | Lee |
| 2005/0002417 A1 | 1/2005 | Kelly et al. |
| 2005/0007967 A1 | 1/2005 | Keskar et al. |
| 2005/0010866 A1 | 1/2005 | Humpleman et al. |
| 2005/0015458 A1 | 1/2005 | La |
| 2005/0015805 A1 | 1/2005 | Iwamura |
| 2005/0021309 A1 | 1/2005 | Alexander et al. |
| 2005/0021626 A1 | 1/2005 | Prajapat et al. |
| 2005/0021826 A1 | 1/2005 | Kumar |
| 2005/0022210 A1 | 1/2005 | Zintel et al. |
| 2005/0023858 A1 | 2/2005 | Bingle et al. |
| 2005/0024203 A1 | 2/2005 | Wolfe |
| 2005/0030928 A1 | 2/2005 | Mrtanen et al. |
| 2005/0031108 A1 | 2/2005 | Eshun et al. |
| 2005/0033513 A1 | 2/2005 | Gasbarro |
| 2005/0038325 A1 | 2/2005 | Moll |
| 2005/0038326 A1 | 2/2005 | Mathur |
| 2005/0044061 A1 | 2/2005 | Klemow |
| 2005/0048957 A1 | 3/2005 | Casey et al. |
| 2005/0049746 A1 | 3/2005 | Rosenblum |
| 2005/0050214 A1 | 3/2005 | Nishiyama et al. |
| 2005/0052831 A1 | 3/2005 | Chen |
| 2005/0055575 A1 | 3/2005 | Evans et al. |
| 2005/0055716 A1 | 3/2005 | Louie et al. |
| 2005/0057361 A1 | 3/2005 | Giraldo et al. |
| 2005/0060163 A1 | 3/2005 | Barsness et al. |
| 2005/0060411 A1 | 3/2005 | Coulombe et al. |
| 2005/0066045 A1 | 3/2005 | Johnson et al. |
| 2005/0066912 A1 | 3/2005 | Korbitz et al. |
| 2005/0069098 A1 | 3/2005 | Kalervo et al. |
| 2005/0071483 A1 | 3/2005 | Motoyama |
| 2005/0075764 A1 | 4/2005 | Horst et al. |
| 2005/0079855 A1 | 4/2005 | Jethi |
| 2005/0079863 A1 | 4/2005 | Macaluso |
| 2005/0081161 A1 | 4/2005 | Macinnes et al. |
| 2005/0086093 A1 | 4/2005 | Hammad et al. |
| 2005/0086126 A1* | 4/2005 | Patterson ................ A63F 13/12 705/26.1 |
| 2005/0086211 A1 | 4/2005 | Mayer |
| 2005/0086366 A1 | 4/2005 | Luebke et al. |
| 2005/0088983 A1 | 4/2005 | Wesslen et al. |
| 2005/0089023 A1 | 4/2005 | Barkley et al. |
| 2005/0090915 A1 | 4/2005 | Geiwitz |
| 2005/0091435 A1 | 4/2005 | Han et al. |
| 2005/0091696 A1 | 4/2005 | Wolfe et al. |
| 2005/0096753 A1 | 5/2005 | Arling et al. |
| 2005/0097478 A1 | 5/2005 | Killian et al. |
| 2005/0101314 A1 | 5/2005 | Levi |
| 2005/0102152 A1 | 5/2005 | Hodges |
| 2005/0102497 A1 | 5/2005 | Buer |
| 2005/0105530 A1 | 5/2005 | Kono |
| 2005/0108091 A1 | 5/2005 | Sotak et al. |
| 2005/0108369 A1 | 5/2005 | Sather et al. |
| 2005/0111660 A1 | 5/2005 | Hosoda |
| 2005/0114432 A1 | 5/2005 | Hodges et al. |
| 2005/0114528 A1 | 5/2005 | Suito |
| 2005/0114900 A1 | 5/2005 | Ladd et al. |
| 2005/0117602 A1 | 6/2005 | Carrigan et al. |
| 2005/0117732 A1 | 6/2005 | Arpin |
| 2005/0119767 A1 | 6/2005 | Kiwimagi et al. |
| 2005/0119913 A1 | 6/2005 | Hornreich et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0128093 A1 | 6/2005 | Genova et al. |
| 2005/0128314 A1 | 6/2005 | Ishino |
| 2005/0144044 A1 | 6/2005 | Godschall et al. |
| 2005/0144312 A1 | 6/2005 | Kadyk et al. |
| 2005/0144645 A1 | 6/2005 | Casey et al. |
| 2005/0148356 A1 | 7/2005 | Ferguson et al. |
| 2005/0149639 A1 | 7/2005 | Vrielink et al. |
| 2005/0149746 A1 | 7/2005 | Lu et al. |
| 2005/0154494 A1 | 7/2005 | Ahmed |
| 2005/0154774 A1 | 7/2005 | Giaffreda et al. |
| 2005/0155757 A1 | 7/2005 | Paton |
| 2005/0156568 A1 | 7/2005 | Yueh |
| 2005/0156737 A1 | 7/2005 | Al-Khateeb |
| 2005/0159823 A1 | 7/2005 | Hayes et al. |
| 2005/0159911 A1 | 7/2005 | Funk et al. |
| 2005/0169288 A1 | 8/2005 | Kamiwada et al. |
| 2005/0174229 A1 | 8/2005 | Feldkamp et al. |
| 2005/0177515 A1 | 8/2005 | Kalavade et al. |
| 2005/0179531 A1 | 8/2005 | Tabe |
| 2005/0181196 A1 | 8/2005 | Aylward et al. |
| 2005/0182681 A1 | 8/2005 | Bruskotter et al. |
| 2005/0184865 A1 | 8/2005 | Han |
| 2005/0185618 A1 | 8/2005 | Friday et al. |

(56) References Cited

U.S. PATENT DOCUMENTS

| | | | |
|---|---|---|---|
| 2005/0187677 A1* | 8/2005 | Walker | B64C 13/20 |
| | | | 701/16 |
| 2005/0188315 A1 | 8/2005 | Campbell et al. | |
| 2005/0197847 A1 | 9/2005 | Smith | |
| 2005/0198216 A1 | 9/2005 | Behera et al. | |
| 2005/0200474 A1 | 9/2005 | Behnke | |
| 2005/0204076 A1 | 9/2005 | Cumpson et al. | |
| 2005/0207429 A1 | 9/2005 | Akita et al. | |
| 2005/0210532 A1 | 9/2005 | Winick | |
| 2005/0216580 A1 | 9/2005 | Raji et al. | |
| 2005/0220123 A1 | 10/2005 | Wybenga et al. | |
| 2005/0222820 A1 | 10/2005 | Chung | |
| 2005/0222933 A1 | 10/2005 | Wesby | |
| 2005/0229016 A1 | 10/2005 | Addy | |
| 2005/0231349 A1 | 10/2005 | Bhat | |
| 2005/0232242 A1 | 10/2005 | Karaoguz et al. | |
| 2005/0232284 A1 | 10/2005 | Karaoguz et al. | |
| 2005/0234568 A1 | 10/2005 | Chung et al. | |
| 2005/0237182 A1 | 10/2005 | Wang | |
| 2005/0246119 A1 | 11/2005 | Koodali | |
| 2005/0246408 A1 | 11/2005 | Chung | |
| 2005/0249199 A1 | 11/2005 | Albert et al. | |
| 2005/0253706 A1 | 11/2005 | Spoltore et al. | |
| 2005/0253709 A1 | 11/2005 | Baker | |
| 2005/0256608 A1 | 11/2005 | King et al. | |
| 2005/0257013 A1 | 11/2005 | Ma | |
| 2005/0257260 A1 | 11/2005 | Lenoir et al. | |
| 2005/0259673 A1 | 11/2005 | Lu et al. | |
| 2005/0260973 A1 | 11/2005 | van de Groenendaal | |
| 2005/0262241 A1 | 11/2005 | Gubbi et al. | |
| 2005/0266826 A1 | 12/2005 | Vlad | |
| 2005/0267605 A1 | 12/2005 | Lee et al. | |
| 2005/0270151 A1 | 12/2005 | Winick | |
| 2005/0273831 A1 | 12/2005 | Slomovich et al. | |
| 2005/0276389 A1 | 12/2005 | Hinkson et al. | |
| 2005/0277434 A1 | 12/2005 | Tuomi et al. | |
| 2005/0280964 A1 | 12/2005 | Richmond et al. | |
| 2005/0281196 A1 | 12/2005 | Tornetta et al. | |
| 2005/0282557 A1 | 12/2005 | Mikko et al. | |
| 2005/0283823 A1 | 12/2005 | Okajo et al. | |
| 2005/0285934 A1 | 12/2005 | Carter | |
| 2005/0285941 A1* | 12/2005 | Haigh | G08B 13/19671 |
| | | | 348/E7.086 |
| 2005/0286518 A1 | 12/2005 | Park et al. | |
| 2006/0007005 A1 | 1/2006 | Yui et al. | |
| 2006/0009863 A1* | 1/2006 | Lingemann | G05B 15/02 |
| | | | 700/20 |
| 2006/0010078 A1 | 1/2006 | Rezvani et al. | |
| 2006/0015943 A1 | 1/2006 | Mahieu | |
| 2006/0018328 A1 | 1/2006 | Mody et al. | |
| 2006/0018479 A1 | 1/2006 | Chen | |
| 2006/0022816 A1 | 2/2006 | Yukawa | |
| 2006/0023847 A1 | 2/2006 | Tyroler et al. | |
| 2006/0025132 A1 | 2/2006 | Karaoguz et al. | |
| 2006/0026017 A1* | 2/2006 | Walker | H04L 63/302 |
| | | | 701/31.4 |
| 2006/0026301 A1 | 2/2006 | Maeda et al. | |
| 2006/0028997 A1 | 2/2006 | McFarland | |
| 2006/0031426 A1 | 2/2006 | Mesarina et al. | |
| 2006/0031436 A1 | 2/2006 | Sakata et al. | |
| 2006/0031852 A1 | 2/2006 | Chu et al. | |
| 2006/0036750 A1 | 2/2006 | Ladd et al. | |
| 2006/0041655 A1 | 2/2006 | Holloway et al. | |
| 2006/0045074 A1 | 3/2006 | Lee | |
| 2006/0050692 A1 | 3/2006 | Petrescu et al. | |
| 2006/0050862 A1 | 3/2006 | Shen et al. | |
| 2006/0051122 A1 | 3/2006 | Kawazu et al. | |
| 2006/0052884 A1 | 3/2006 | Staples et al. | |
| 2006/0053447 A1 | 3/2006 | Krzyzanowski et al. | |
| 2006/0053459 A1 | 3/2006 | Simerly et al. | |
| 2006/0053491 A1 | 3/2006 | Khuti et al. | |
| 2006/0058923 A1 | 3/2006 | Kruk et al. | |
| 2006/0063534 A1 | 3/2006 | Kokkonen et al. | |
| 2006/0064305 A1 | 3/2006 | Alonso | |
| 2006/0064478 A1 | 3/2006 | Sirkin | |
| 2006/0067344 A1 | 3/2006 | Sakurai | |
| 2006/0067356 A1 | 3/2006 | Kim et al. | |
| 2006/0067484 A1 | 3/2006 | Elliot et al. | |
| 2006/0071773 A1 | 4/2006 | Ahmed et al. | |
| 2006/0072470 A1 | 4/2006 | Moore et al. | |
| 2006/0075235 A1 | 4/2006 | Renkis | |
| 2006/0077254 A1 | 4/2006 | Shu et al. | |
| 2006/0078344 A1 | 4/2006 | Kawazu et al. | |
| 2006/0080380 A1 | 4/2006 | Aizu et al. | |
| 2006/0080465 A1 | 4/2006 | Conzola et al. | |
| 2006/0088092 A1 | 4/2006 | Chen et al. | |
| 2006/0092010 A1 | 5/2006 | Simon et al. | |
| 2006/0092011 A1 | 5/2006 | Simon et al. | |
| 2006/0093365 A1 | 5/2006 | Dybsetter et al. | |
| 2006/0094400 A1 | 5/2006 | Beachem et al. | |
| 2006/0101062 A1 | 5/2006 | Godman et al. | |
| 2006/0103510 A1 | 5/2006 | Chen et al. | |
| 2006/0103520 A1 | 5/2006 | Clark | |
| 2006/0104312 A1 | 5/2006 | Friar | |
| 2006/0105713 A1 | 5/2006 | Zheng et al. | |
| 2006/0106933 A1 | 5/2006 | Huang et al. | |
| 2006/0109113 A1 | 5/2006 | Reyes et al. | |
| 2006/0109860 A1 | 5/2006 | Matsunaga et al. | |
| 2006/0109966 A1 | 5/2006 | Sasakura et al. | |
| 2006/0111095 A1 | 5/2006 | Weigand | |
| 2006/0114842 A1 | 6/2006 | Miyamoto et al. | |
| 2006/0121924 A1 | 6/2006 | Rengaraj et al. | |
| 2006/0123212 A1 | 6/2006 | Yagawa | |
| 2006/0129837 A1 | 6/2006 | Im et al. | |
| 2006/0130004 A1 | 6/2006 | Hughes et al. | |
| 2006/0132302 A1 | 6/2006 | Stilp | |
| 2006/0133412 A1 | 6/2006 | Callaghan | |
| 2006/0136558 A1 | 6/2006 | Sheehan et al. | |
| 2006/0142880 A1 | 6/2006 | Deen et al. | |
| 2006/0142968 A1 | 6/2006 | Han et al. | |
| 2006/0142978 A1 | 6/2006 | Suenbuel et al. | |
| 2006/0143268 A1 | 6/2006 | Chatani | |
| 2006/0145842 A1 | 7/2006 | Stilp | |
| 2006/0153122 A1 | 7/2006 | Hinman et al. | |
| 2006/0154642 A1 | 7/2006 | Scannell, Jr. | |
| 2006/0155851 A1 | 7/2006 | Ma et al. | |
| 2006/0159032 A1 | 7/2006 | Iz et al. | |
| 2006/0161270 A1 | 7/2006 | Luskin et al. | |
| 2006/0161662 A1 | 7/2006 | Ng et al. | |
| 2006/0161960 A1 | 7/2006 | Benoit | |
| 2006/0167784 A1 | 7/2006 | Hoffberg | |
| 2006/0167919 A1 | 7/2006 | Hsieh | |
| 2006/0168013 A1 | 7/2006 | Wilson et al. | |
| 2006/0168095 A1 | 7/2006 | Sharma et al. | |
| 2006/0168178 A1 | 7/2006 | Hwang et al. | |
| 2006/0168190 A1 | 7/2006 | Johan et al. | |
| 2006/0171307 A1 | 8/2006 | Gopalakrishnan et al. | |
| 2006/0176146 A1 | 8/2006 | Krishan et al. | |
| 2006/0176167 A1 | 8/2006 | Dohrmann | |
| 2006/0181406 A1 | 8/2006 | Petite et al. | |
| 2006/0182100 A1 | 8/2006 | Li et al. | |
| 2006/0183460 A1 | 8/2006 | Srinivasan et al. | |
| 2006/0187900 A1 | 8/2006 | Akbar | |
| 2006/0189311 A1 | 8/2006 | Cromer et al. | |
| 2006/0190458 A1 | 8/2006 | Mishina et al. | |
| 2006/0190529 A1 | 8/2006 | Morozumi et al. | |
| 2006/0197660 A1 | 9/2006 | Luebke et al. | |
| 2006/0200845 A1 | 9/2006 | Foster et al. | |
| 2006/0206220 A1 | 9/2006 | Amundson | |
| 2006/0206246 A1* | 9/2006 | Walker | H04L 63/302 |
| | | | 701/16 |
| 2006/0208872 A1 | 9/2006 | Yu et al. | |
| 2006/0208880 A1 | 9/2006 | Funk et al. | |
| 2006/0209857 A1 | 9/2006 | Hicks, III | |
| 2006/0215650 A1 | 9/2006 | Wollmershauser et al. | |
| 2006/0217115 A1 | 9/2006 | Cassett et al. | |
| 2006/0218244 A1 | 9/2006 | Rasmussen et al. | |
| 2006/0218593 A1 | 9/2006 | Afshary et al. | |
| 2006/0220830 A1* | 10/2006 | Bennett, III | H04L 12/2818 |
| | | | 340/506 |
| 2006/0221184 A1 | 10/2006 | Vallone et al. | |
| 2006/0222153 A1 | 10/2006 | Tarkoff et al. | |
| 2006/0226972 A1 | 10/2006 | Smith | |
| 2006/0229746 A1 | 10/2006 | Ollis et al. | |

(56) References Cited

U.S. PATENT DOCUMENTS

| | | |
|---|---|---|
| 2006/0230270 A1 | 10/2006 | Goffin |
| 2006/0233372 A1 | 10/2006 | Shaheen et al. |
| 2006/0235963 A1 | 10/2006 | Wetherly et al. |
| 2006/0236050 A1 | 10/2006 | Sugimoto et al. |
| 2006/0238372 A1 | 10/2006 | Jung et al. |
| 2006/0238617 A1 | 10/2006 | Tamir |
| 2006/0242395 A1 | 10/2006 | Fausak |
| 2006/0244589 A1 | 11/2006 | Schranz |
| 2006/0245369 A1 | 11/2006 | Schimmelpfeng et al. |
| 2006/0246886 A1 | 11/2006 | Benco et al. |
| 2006/0246919 A1 | 11/2006 | Park et al. |
| 2006/0250235 A1 | 11/2006 | Astrin |
| 2006/0250578 A1 | 11/2006 | Pohl et al. |
| 2006/0251255 A1 | 11/2006 | Batta |
| 2006/0258342 A1 | 11/2006 | Fok et al. |
| 2006/0259951 A1 | 11/2006 | Forssell et al. |
| 2006/0265489 A1 | 11/2006 | Moore |
| 2006/0271695 A1 | 11/2006 | Lavian |
| 2006/0274764 A1 | 12/2006 | Mah et al. |
| 2006/0281435 A1 | 12/2006 | Shearer et al. |
| 2006/0282886 A1 | 12/2006 | Gaug |
| 2006/0288288 A1 | 12/2006 | Girgensohn et al. |
| 2006/0291507 A1 | 12/2006 | Sarosi et al. |
| 2006/0293100 A1 | 12/2006 | Walter |
| 2006/0294565 A1 | 12/2006 | Walter |
| 2007/0001818 A1 | 1/2007 | Small et al. |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0008099 A1 | 1/2007 | Kimmel et al. |
| 2007/0014248 A1 | 1/2007 | Fowlow |
| 2007/0027987 A1 | 2/2007 | Tripp et al. |
| 2007/0043478 A1 | 2/2007 | Ehlers et al. |
| 2007/0043954 A1 | 2/2007 | Fox |
| 2007/0046462 A1 | 3/2007 | Fancella |
| 2007/0047585 A1 | 3/2007 | Gillespie et al. |
| 2007/0052675 A1 | 3/2007 | Chang |
| 2007/0055770 A1 | 3/2007 | Karmakar et al. |
| 2007/0058627 A1 | 3/2007 | Smith et al. |
| 2007/0061018 A1 | 3/2007 | Callaghan et al. |
| 2007/0061020 A1 | 3/2007 | Bovee et al. |
| 2007/0061266 A1 | 3/2007 | Moore et al. |
| 2007/0061430 A1 | 3/2007 | Kim |
| 2007/0061878 A1 | 3/2007 | Hagiu et al. |
| 2007/0063836 A1 | 3/2007 | Hayden et al. |
| 2007/0063866 A1 | 3/2007 | Webb |
| 2007/0064714 A1 | 3/2007 | Bi et al. |
| 2007/0067780 A1 | 3/2007 | Kumar et al. |
| 2007/0079012 A1 | 4/2007 | Walker |
| 2007/0079151 A1 | 4/2007 | Connor et al. |
| 2007/0079385 A1 | 4/2007 | Williams et al. |
| 2007/0083668 A1 | 4/2007 | Kelsey et al. |
| 2007/0090944 A1 | 4/2007 | Du Breuil |
| 2007/0094716 A1 | 4/2007 | Farino et al. |
| 2007/0096981 A1 | 5/2007 | Abraham |
| 2007/0101345 A1 | 5/2007 | Takagi |
| 2007/0103433 A1 | 5/2007 | Katz |
| 2007/0105072 A1 | 5/2007 | Koljonen |
| 2007/0106124 A1 | 5/2007 | Kuriyama et al. |
| 2007/0106536 A1 | 5/2007 | Moore |
| 2007/0106547 A1 | 5/2007 | Agrawal |
| 2007/0109975 A1 | 5/2007 | Reckamp et al. |
| 2007/0116020 A1 | 5/2007 | Cheever et al. |
| 2007/0117464 A1 | 5/2007 | Freeman |
| 2007/0118609 A1 | 5/2007 | Mullan et al. |
| 2007/0126875 A1 | 6/2007 | Miyamaki |
| 2007/0127510 A1 | 6/2007 | Bossemeyer et al. |
| 2007/0130286 A1 | 6/2007 | Hopmann et al. |
| 2007/0132576 A1 | 6/2007 | Kolavennu et al. |
| 2007/0136759 A1 | 6/2007 | Zhang et al. |
| 2007/0140267 A1 | 6/2007 | Yang |
| 2007/0142022 A1 | 6/2007 | Madonna et al. |
| 2007/0142044 A1 | 6/2007 | Fitzgerald et al. |
| 2007/0143400 A1 | 6/2007 | Kelley et al. |
| 2007/0143440 A1 | 6/2007 | Reckamp et al. |
| 2007/0146127 A1 | 6/2007 | Stilp et al. |
| 2007/0146484 A1 | 6/2007 | Horton et al. |
| 2007/0147419 A1 | 6/2007 | Tsujimoto et al. |
| 2007/0150616 A1 | 6/2007 | Baek et al. |
| 2007/0154010 A1 | 7/2007 | Wong |
| 2007/0155325 A1 | 7/2007 | Bambic et al. |
| 2007/0155423 A1 | 7/2007 | Carmody et al. |
| 2007/0156689 A1 | 7/2007 | Meek et al. |
| 2007/0160017 A1 | 7/2007 | Meier et al. |
| 2007/0161372 A1 | 7/2007 | Rogalski et al. |
| 2007/0162228 A1 | 7/2007 | Mitchell |
| 2007/0162680 A1 | 7/2007 | Mitchell |
| 2007/0164779 A1 | 7/2007 | Weston et al. |
| 2007/0168860 A1 | 7/2007 | Takayama et al. |
| 2007/0176766 A1 | 8/2007 | Cheng |
| 2007/0182543 A1 | 8/2007 | Luo |
| 2007/0182819 A1 | 8/2007 | Monroe |
| 2007/0183345 A1 | 8/2007 | Fahim et al. |
| 2007/0185989 A1 | 8/2007 | Corbett et al. |
| 2007/0192486 A1 | 8/2007 | Wilson et al. |
| 2007/0192863 A1 | 8/2007 | Kapoor et al. |
| 2007/0197236 A1 | 8/2007 | Ahn et al. |
| 2007/0198698 A1 | 8/2007 | Boyd et al. |
| 2007/0200658 A1 | 8/2007 | Yang |
| 2007/0208521 A1 | 9/2007 | Petite et al. |
| 2007/0214262 A1 | 9/2007 | Buchbinder et al. |
| 2007/0214264 A1 | 9/2007 | Koister |
| 2007/0216764 A1 | 9/2007 | Kwak |
| 2007/0216783 A1 | 9/2007 | Drtiz et al. |
| 2007/0218895 A1 | 9/2007 | Saito et al. |
| 2007/0223465 A1 | 9/2007 | Wang et al. |
| 2007/0223500 A1 | 9/2007 | Lee et al. |
| 2007/0226182 A1 | 9/2007 | Sobotka et al. |
| 2007/0230415 A1 | 10/2007 | Malik |
| 2007/0230744 A1 | 10/2007 | Dronge |
| 2007/0245223 A1 | 10/2007 | Siedzik et al. |
| 2007/0249323 A1 | 10/2007 | Lee et al. |
| 2007/0253361 A1 | 11/2007 | Pristas et al. |
| 2007/0255856 A1 | 11/2007 | Reckamp et al. |
| 2007/0256105 A1 | 11/2007 | Tabe |
| 2007/0257986 A1 | 11/2007 | Ivanov et al. |
| 2007/0260713 A1 | 11/2007 | Moorer et al. |
| 2007/0262857 A1 | 11/2007 | Jackson |
| 2007/0263782 A1 | 11/2007 | Stock et al. |
| 2007/0265866 A1 | 11/2007 | Fehling et al. |
| 2007/0271398 A1 | 11/2007 | Manchester et al. |
| 2007/0275703 A1 | 11/2007 | Lim et al. |
| 2007/0277111 A1 | 11/2007 | Bennett et al. |
| 2007/0282665 A1 | 12/2007 | Buehler et al. |
| 2007/0283001 A1 | 12/2007 | Spiess et al. |
| 2007/0283004 A1 | 12/2007 | Buehler |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0288858 A1 | 12/2007 | Pereira |
| 2007/0290830 A1 | 12/2007 | Gurley |
| 2007/0291118 A1 | 12/2007 | Shu et al. |
| 2007/0296814 A1 | 12/2007 | Cooper et al. |
| 2007/0298772 A1 | 12/2007 | Owens et al. |
| 2008/0001734 A1 | 1/2008 | Stilp et al. |
| 2008/0013531 A1 | 1/2008 | Elliott et al. |
| 2008/0013957 A1 | 1/2008 | Akers et al. |
| 2008/0025487 A1 | 1/2008 | Johan et al. |
| 2008/0027587 A1 | 1/2008 | Nickerson et al. |
| 2008/0040272 A1 | 2/2008 | Eskin |
| 2008/0042826 A1 | 2/2008 | Hevia et al. |
| 2008/0043107 A1 | 2/2008 | Coogan et al. |
| 2008/0046593 A1 | 2/2008 | Ando et al. |
| 2008/0048861 A1 | 2/2008 | Naidoo et al. |
| 2008/0048975 A1 | 2/2008 | Leibow |
| 2008/0052348 A1 | 2/2008 | Adler et al. |
| 2008/0056212 A1 | 3/2008 | Karaoguz et al. |
| 2008/0056261 A1 | 3/2008 | Osborn et al. |
| 2008/0059533 A1 | 3/2008 | Krikorian |
| 2008/0059622 A1 | 3/2008 | Hite et al. |
| 2008/0065681 A1 | 3/2008 | Fontijn et al. |
| 2008/0065685 A1 | 3/2008 | Frank |

(56) References Cited

U.S. PATENT DOCUMENTS

| | | |
|---|---|---|
| 2008/0069121 A1 | 3/2008 | Adamson et al. |
| 2008/0072244 A1 | 3/2008 | Eker et al. |
| 2008/0074258 A1 | 3/2008 | Bennett et al. |
| 2008/0074993 A1 | 3/2008 | Vainola |
| 2008/0082186 A1 | 4/2008 | Hood et al. |
| 2008/0084294 A1 | 4/2008 | Zhiying et al. |
| 2008/0084296 A1 | 4/2008 | Kutzik et al. |
| 2008/0086564 A1 | 4/2008 | Putman et al. |
| 2008/0091793 A1 | 4/2008 | Diroo et al. |
| 2008/0094204 A1 | 4/2008 | Kogan et al. |
| 2008/0095339 A1 | 4/2008 | Elliott et al. |
| 2008/0100705 A1 | 5/2008 | Kister et al. |
| 2008/0102845 A1 | 5/2008 | Zhao |
| 2008/0103608 A1 | 5/2008 | Gough et al. |
| 2008/0104215 A1 | 5/2008 | Excoffier et al. |
| 2008/0104516 A1 | 5/2008 | Lee |
| 2008/0109302 A1 | 5/2008 | Salokannel et al. |
| 2008/0109650 A1 | 5/2008 | Shim et al. |
| 2008/0112340 A1 | 5/2008 | Luebke |
| 2008/0112405 A1* | 5/2008 | Cholas ............... H04L 63/062 370/389 |
| 2008/0117029 A1 | 5/2008 | Dohrmann et al. |
| 2008/0117201 A1 | 5/2008 | Martinez et al. |
| 2008/0117922 A1 | 5/2008 | Cockrell et al. |
| 2008/0120405 A1 | 5/2008 | Son et al. |
| 2008/0122575 A1 | 5/2008 | Lavian et al. |
| 2008/0126535 A1 | 5/2008 | Zhu et al. |
| 2008/0128444 A1 | 6/2008 | Schininger et al. |
| 2008/0129484 A1 | 6/2008 | Dahl et al. |
| 2008/0129821 A1 | 6/2008 | Howarter et al. |
| 2008/0130949 A1 | 6/2008 | Ivanov et al. |
| 2008/0133725 A1 | 6/2008 | Shaouy |
| 2008/0134165 A1 | 6/2008 | Anderson et al. |
| 2008/0134343 A1 | 6/2008 | Pennington et al. |
| 2008/0137572 A1 | 6/2008 | Park et al. |
| 2008/0140868 A1 | 6/2008 | Kalayjian et al. |
| 2008/0141303 A1 | 6/2008 | Walker et al. |
| 2008/0141341 A1 | 6/2008 | Vinogradov et al. |
| 2008/0144884 A1* | 6/2008 | Habibi ............... G05D 1/0094 382/103 |
| 2008/0147834 A1 | 6/2008 | Quinn et al. |
| 2008/0151037 A1 | 6/2008 | Kumarasamy et al. |
| 2008/0155080 A1 | 6/2008 | Marlow et al. |
| 2008/0155470 A1 | 6/2008 | Khedouri et al. |
| 2008/0162637 A1 | 7/2008 | Adamczyk et al. |
| 2008/0163355 A1 | 7/2008 | Chu |
| 2008/0165787 A1 | 7/2008 | Xu et al. |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0181239 A1 | 7/2008 | Wood et al. |
| 2008/0183483 A1 | 7/2008 | Hart |
| 2008/0183842 A1 | 7/2008 | Raji et al. |
| 2008/0189609 A1 | 8/2008 | Larson et al. |
| 2008/0201468 A1 | 8/2008 | Titus |
| 2008/0201723 A1 | 8/2008 | Bottaro et al. |
| 2008/0204190 A1 | 8/2008 | Cohn et al. |
| 2008/0204219 A1 | 8/2008 | Cohn et al. |
| 2008/0208399 A1 | 8/2008 | Pham |
| 2008/0209505 A1 | 8/2008 | Ghai et al. |
| 2008/0209506 A1 | 8/2008 | Ghai et al. |
| 2008/0215450 A1 | 9/2008 | Gates et al. |
| 2008/0215613 A1 | 9/2008 | Grasso |
| 2008/0219239 A1 | 9/2008 | Bell et al. |
| 2008/0221715 A1 | 9/2008 | Krzyzanowski et al. |
| 2008/0227460 A1 | 9/2008 | David et al. |
| 2008/0229415 A1 | 9/2008 | Kapoor et al. |
| 2008/0235326 A1 | 9/2008 | Parsi et al. |
| 2008/0235600 A1 | 9/2008 | Harper et al. |
| 2008/0239075 A1 | 10/2008 | Mehrotra et al. |
| 2008/0240372 A1 | 10/2008 | Frenette |
| 2008/0240696 A1 | 10/2008 | Kucharyson |
| 2008/0253391 A1 | 10/2008 | Krits et al. |
| 2008/0259818 A1 | 10/2008 | Balassanian |
| 2008/0261540 A1 | 10/2008 | Rohani et al. |
| 2008/0262990 A1 | 10/2008 | Kapoor et al. |
| 2008/0262991 A1 | 10/2008 | Kapoor et al. |
| 2008/0263150 A1 | 10/2008 | Childers et al. |
| 2008/0266080 A1 | 10/2008 | Leung et al. |
| 2008/0266257 A1 | 10/2008 | Chiang |
| 2008/0271150 A1 | 10/2008 | Boerger et al. |
| 2008/0284580 A1 | 11/2008 | Babich et al. |
| 2008/0284587 A1 | 11/2008 | Saigh et al. |
| 2008/0284592 A1 | 11/2008 | Collins et al. |
| 2008/0288639 A1 | 11/2008 | Ruppert et al. |
| 2008/0294588 A1 | 11/2008 | Morris et al. |
| 2008/0295172 A1 | 11/2008 | Bohacek |
| 2008/0297599 A1 | 12/2008 | Donovan et al. |
| 2008/0303903 A1 | 12/2008 | Bentley et al. |
| 2008/0313316 A1 | 12/2008 | Hite et al. |
| 2008/0316024 A1 | 12/2008 | Chantelou et al. |
| 2009/0003172 A1 | 1/2009 | Yahata et al. |
| 2009/0003252 A1 | 1/2009 | Salomone et al. |
| 2009/0003820 A1 | 1/2009 | Law et al. |
| 2009/0007596 A1 | 1/2009 | Goldstein et al. |
| 2009/0013210 A1 | 1/2009 | McIntosh et al. |
| 2009/0018850 A1 | 1/2009 | Abhyanker |
| 2009/0019141 A1 | 1/2009 | Bush et al. |
| 2009/0022362 A1 | 1/2009 | Gagvani et al. |
| 2009/0036142 A1 | 2/2009 | Yan |
| 2009/0036159 A1 | 2/2009 | Chen |
| 2009/0041467 A1 | 2/2009 | Carleton et al. |
| 2009/0042649 A1 | 2/2009 | Hsieh et al. |
| 2009/0046664 A1 | 2/2009 | Aso |
| 2009/0049094 A1 | 2/2009 | Howell et al. |
| 2009/0049488 A1 | 2/2009 | Stransky |
| 2009/0051769 A1 | 2/2009 | Kuo et al. |
| 2009/0055760 A1 | 2/2009 | Whatcott et al. |
| 2009/0057427 A1 | 3/2009 | Geadelmann et al. |
| 2009/0063582 A1 | 3/2009 | Anna et al. |
| 2009/0066534 A1 | 3/2009 | Sivakkolundhu |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0067441 A1 | 3/2009 | Ansari et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0072988 A1 | 3/2009 | Haywood |
| 2009/0074184 A1 | 3/2009 | Baum et al. |
| 2009/0076211 A1 | 3/2009 | Yang et al. |
| 2009/0076879 A1 | 3/2009 | Sparks et al. |
| 2009/0077167 A1 | 3/2009 | Baum et al. |
| 2009/0077622 A1 | 3/2009 | Baum et al. |
| 2009/0077624 A1 | 3/2009 | Baum et al. |
| 2009/0079547 A1 | 3/2009 | Oksanen et al. |
| 2009/0083167 A1 | 3/2009 | Subbloie |
| 2009/0086660 A1 | 4/2009 | Sood et al. |
| 2009/0086740 A1 | 4/2009 | Al-Bakri et al. |
| 2009/0089822 A1 | 4/2009 | Wada |
| 2009/0092283 A1 | 4/2009 | Whillock et al. |
| 2009/0094671 A1 | 4/2009 | Kurapati et al. |
| 2009/0100176 A1 | 4/2009 | Hicks, III et al. |
| 2009/0100329 A1 | 4/2009 | Espinoza |
| 2009/0100460 A1 | 4/2009 | Hicks et al. |
| 2009/0100492 A1 | 4/2009 | Hicks et al. |
| 2009/0109959 A1 | 4/2009 | Elliott et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |
| 2009/0144237 A1 | 6/2009 | Branam et al. |
| 2009/0146846 A1 | 6/2009 | Grossman |
| 2009/0158189 A1 | 6/2009 | Itani |
| 2009/0158292 A1 | 6/2009 | Rattner et al. |
| 2009/0161609 A1 | 6/2009 | Bergstrom |
| 2009/0165114 A1 | 6/2009 | Baum et al. |
| 2009/0172443 A1 | 7/2009 | Rothman et al. |

(56) References Cited

U.S. PATENT DOCUMENTS

| | | |
|---|---|---|
| 2009/0177298 A1 | 7/2009 | McFarland et al. |
| 2009/0177906 A1 | 7/2009 | Paniagua et al. |
| 2009/0180430 A1 | 7/2009 | Fadell |
| 2009/0182868 A1 | 7/2009 | McFate et al. |
| 2009/0187297 A1 | 7/2009 | Kish et al. |
| 2009/0189981 A1 | 7/2009 | Siann et al. |
| 2009/0193373 A1 | 7/2009 | Abbaspour et al. |
| 2009/0197539 A1 | 8/2009 | Shiba |
| 2009/0202250 A1 | 8/2009 | Dizechi et al. |
| 2009/0204693 A1 | 8/2009 | Andreev et al. |
| 2009/0221368 A1 | 9/2009 | Yen et al. |
| 2009/0224875 A1 | 9/2009 | Rabinowitz et al. |
| 2009/0228445 A1 | 9/2009 | Gangal |
| 2009/0240353 A1 | 9/2009 | Songkakul et al. |
| 2009/0240730 A1 | 9/2009 | Wood |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0254960 A1 | 10/2009 | Yarom et al. |
| 2009/0256708 A1 | 10/2009 | Hsiao et al. |
| 2009/0259515 A1 | 10/2009 | Belimpasakis et al. |
| 2009/0260052 A1 | 10/2009 | Bathula et al. |
| 2009/0260083 A1 | 10/2009 | Szeto et al. |
| 2009/0260430 A1 | 10/2009 | Zamfes |
| 2009/0265042 A1 | 10/2009 | Mollenkopf et al. |
| 2009/0265193 A1* | 10/2009 | Collins .............. G06Q 30/0185 901/46 |
| 2009/0270090 A1 | 10/2009 | Kawamura |
| 2009/0271042 A1 | 10/2009 | Voysey |
| 2009/0289787 A1 | 11/2009 | Dawson et al. |
| 2009/0289788 A1 | 11/2009 | Leblond |
| 2009/0292909 A1 | 11/2009 | Feder et al. |
| 2009/0303100 A1 | 12/2009 | Zemany |
| 2009/0307255 A1 | 12/2009 | Park |
| 2009/0307307 A1 | 12/2009 | Igarashi |
| 2009/0313693 A1 | 12/2009 | Rogers |
| 2009/0316671 A1 | 12/2009 | Rolf et al. |
| 2009/0319361 A1 | 12/2009 | Paul |
| 2009/0322510 A1 | 12/2009 | Berger et al. |
| 2009/0324010 A1 | 12/2009 | Hou |
| 2009/0327483 A1 | 12/2009 | Thompson et al. |
| 2009/0327510 A1 | 12/2009 | Edelman et al. |
| 2010/0000791 A1 | 1/2010 | Alberty |
| 2010/0001812 A1 | 1/2010 | Kausch |
| 2010/0004949 A1 | 1/2010 | O'Brien |
| 2010/0008274 A1 | 1/2010 | Kneckt et al. |
| 2010/0009758 A1 | 1/2010 | Twitchell, Jr. |
| 2010/0011298 A1 | 1/2010 | Campbell et al. |
| 2010/0013917 A1 | 1/2010 | Hanna et al. |
| 2010/0023865 A1 | 1/2010 | Fulker et al. |
| 2010/0026481 A1 | 2/2010 | Oh et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0039958 A1 | 2/2010 | Ge et al. |
| 2010/0041380 A1 | 2/2010 | Hewes et al. |
| 2010/0042954 A1 | 2/2010 | Rosenblatt et al. |
| 2010/0052612 A1 | 3/2010 | Raji et al. |
| 2010/0066530 A1 | 3/2010 | Cohn et al. |
| 2010/0067371 A1 | 3/2010 | Gogic et al. |
| 2010/0070618 A1 | 3/2010 | Kim et al. |
| 2010/0071053 A1 | 3/2010 | Ansari et al. |
| 2010/0074112 A1 | 3/2010 | Derr et al. |
| 2010/0077111 A1 | 3/2010 | Holmes et al. |
| 2010/0077347 A1 | 3/2010 | Kirtane et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0100269 A1* | 4/2010 | Ekhaguere ........... G08G 5/0086 701/26 |
| 2010/0102951 A1 | 4/2010 | Rutledge |
| 2010/0121521 A1 | 5/2010 | Kiribayashi |
| 2010/0122091 A1 | 5/2010 | Huang et al. |
| 2010/0138758 A1 | 6/2010 | Mizumori et al. |
| 2010/0138764 A1 | 6/2010 | Hatambeiki et al. |
| 2010/0141762 A1 | 6/2010 | Siann et al. |
| 2010/0145485 A1 | 6/2010 | Duchene et al. |
| 2010/0150170 A1 | 6/2010 | Lee et al. |
| 2010/0153853 A1 | 6/2010 | Dawes et al. |
| 2010/0159898 A1 | 6/2010 | Krzyzanowski et al. |
| 2010/0159967 A1 | 6/2010 | Pounds et al. |
| 2010/0164736 A1 | 7/2010 | Byers et al. |
| 2010/0165897 A1 | 7/2010 | Sood |
| 2010/0174643 A1 | 7/2010 | Schaefer et al. |
| 2010/0177749 A1 | 7/2010 | Essinger et al. |
| 2010/0177750 A1 | 7/2010 | Essinger et al. |
| 2010/0185857 A1 | 7/2010 | Neitzel et al. |
| 2010/0191352 A1 | 7/2010 | Quail |
| 2010/0197219 A1 | 8/2010 | Issa et al. |
| 2010/0204839 A1 | 8/2010 | Behm et al. |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0222069 A1 | 9/2010 | Abraham et al. |
| 2010/0238286 A1 | 9/2010 | Boghossian et al. |
| 2010/0241711 A1 | 9/2010 | Ansari et al. |
| 2010/0241748 A1 | 9/2010 | Ansari et al. |
| 2010/0245107 A1 | 9/2010 | Fulker et al. |
| 2010/0248681 A1 | 9/2010 | Phills |
| 2010/0267390 A1 | 10/2010 | Lin et al. |
| 2010/0274366 A1 | 10/2010 | Fata et al. |
| 2010/0275018 A1 | 10/2010 | Pedersen |
| 2010/0277300 A1 | 11/2010 | Cohn et al. |
| 2010/0277315 A1 | 11/2010 | Cohn et al. |
| 2010/0279649 A1* | 11/2010 | Thomas ................. G06Q 10/10 455/404.2 |
| 2010/0280635 A1* | 11/2010 | Cohn ................. H04L 12/2834 700/90 |
| 2010/0280637 A1 | 11/2010 | Cohn et al. |
| 2010/0281135 A1 | 11/2010 | Cohn et al. |
| 2010/0281312 A1 | 11/2010 | Cohn et al. |
| 2010/0298024 A1 | 11/2010 | Choi |
| 2010/0299556 A1 | 11/2010 | Taylor et al. |
| 2010/0308990 A1 | 12/2010 | Simon et al. |
| 2010/0321151 A1 | 12/2010 | Matsuura et al. |
| 2010/0325107 A1 | 12/2010 | Kenton et al. |
| 2010/0332164 A1 | 12/2010 | Aisa et al. |
| 2011/0000521 A1 | 1/2011 | Tachibana |
| 2011/0018998 A1 | 1/2011 | Guzik |
| 2011/0026568 A1 | 2/2011 | Hadizad et al. |
| 2011/0029875 A1 | 2/2011 | Milch |
| 2011/0030056 A1 | 2/2011 | Tokunaga |
| 2011/0037593 A1 | 2/2011 | Foisy et al. |
| 2011/0040415 A1 | 2/2011 | Nickerson et al. |
| 2011/0040877 A1 | 2/2011 | Foisy |
| 2011/0046792 A1 | 2/2011 | Imes et al. |
| 2011/0051638 A1 | 3/2011 | Jeon et al. |
| 2011/0058034 A1 | 3/2011 | Grass |
| 2011/0061011 A1 | 3/2011 | Hoguet |
| 2011/0068921 A1 | 3/2011 | Shafer |
| 2011/0080267 A1 | 4/2011 | Clare et al. |
| 2011/0087988 A1 | 4/2011 | Ray et al. |
| 2011/0093799 A1 | 4/2011 | Hatambeiki et al. |
| 2011/0096678 A1 | 4/2011 | Ketonen |
| 2011/0102588 A1 | 5/2011 | Trundle et al. |
| 2011/0107436 A1 | 5/2011 | Cholas |
| 2011/0125333 A1 | 5/2011 | Gray |
| 2011/0125846 A1 | 5/2011 | Ham et al. |
| 2011/0130112 A1 | 6/2011 | Saigh et al. |
| 2011/0131226 A1 | 6/2011 | Chandra et al. |
| 2011/0148572 A1 | 6/2011 | Ku |
| 2011/0156914 A1 | 6/2011 | Sheharri et al. |
| 2011/0169637 A1 | 7/2011 | Siegler et al. |
| 2011/0187497 A1 | 8/2011 | Chin |
| 2011/0197327 A1 | 8/2011 | McElroy et al. |
| 2011/0200052 A1 | 8/2011 | Mungo et al. |
| 2011/0208359 A1 | 8/2011 | Duchene et al. |
| 2011/0212706 A1 | 9/2011 | Uusilehto |
| 2011/0213869 A1 | 9/2011 | Korsunsky et al. |
| 2011/0214157 A1 | 9/2011 | Korsunsky et al. |
| 2011/0218777 A1 | 9/2011 | Chen et al. |
| 2011/0219035 A1 | 9/2011 | Korsunsky et al. |
| 2011/0230139 A1 | 9/2011 | Nakahara |
| 2011/0230160 A1 | 9/2011 | Felgate |

(56) References Cited

U.S. PATENT DOCUMENTS

| | | |
|---|---|---|
| 2011/0231510 A1 | 9/2011 | Korsunsky et al. |
| 2011/0231564 A1 | 9/2011 | Korsunsky et al. |
| 2011/0234392 A1 | 9/2011 | Cohn et al. |
| 2011/0238660 A1 | 9/2011 | Riggs |
| 2011/0238855 A1 | 9/2011 | Korsunsky et al. |
| 2011/0246762 A1 | 10/2011 | Adams et al. |
| 2011/0257953 A1 | 10/2011 | Li et al. |
| 2011/0261195 A1 | 10/2011 | Martin et al. |
| 2011/0276699 A1 | 11/2011 | Pedersen |
| 2011/0283006 A1 | 11/2011 | Ramamurthy |
| 2011/0286437 A1 | 11/2011 | Austin et al. |
| 2011/0289517 A1 | 11/2011 | Sather et al. |
| 2011/0299546 A1 | 12/2011 | Prodan et al. |
| 2011/0302497 A1 | 12/2011 | Garrett et al. |
| 2011/0309929 A1 | 12/2011 | Myers |
| 2011/0314515 A1 | 12/2011 | Hernoud et al. |
| 2012/0001436 A1 | 1/2012 | Sami et al. |
| 2012/0005276 A1 | 1/2012 | Guo et al. |
| 2012/0014363 A1 | 1/2012 | Hassan et al. |
| 2012/0016607 A1 | 1/2012 | Cottrell et al. |
| 2012/0017268 A9 | 1/2012 | Dispensa |
| 2012/0020060 A1 | 1/2012 | Myer et al. |
| 2012/0023151 A1 | 1/2012 | Bennett et al. |
| 2012/0030130 A1 | 2/2012 | Smith et al. |
| 2012/0062026 A1 | 3/2012 | Raji et al. |
| 2012/0062370 A1 | 3/2012 | Feldstein et al. |
| 2012/0066632 A1 | 3/2012 | Sundermeyer et al. |
| 2012/0075469 A1 | 3/2012 | Oskin et al. |
| 2012/0081842 A1 | 4/2012 | Ewing et al. |
| 2012/0084184 A1 | 4/2012 | Raleigh et al. |
| 2012/0086552 A1 | 4/2012 | Fast et al. |
| 2012/0143383 A1 | 6/2012 | Cooperrider et al. |
| 2012/0150966 A1 | 6/2012 | Fan et al. |
| 2012/0154138 A1 | 6/2012 | Cohn et al. |
| 2012/0158161 A1 | 6/2012 | Cohn et al. |
| 2012/0172027 A1 | 7/2012 | Partheesh et al. |
| 2012/0182245 A1 | 7/2012 | Hutton |
| 2012/0188072 A1 | 7/2012 | Dawes et al. |
| 2012/0209951 A1 | 8/2012 | Enns et al. |
| 2012/0214502 A1 | 8/2012 | Qiang |
| 2012/0232788 A1 | 9/2012 | Diao |
| 2012/0240185 A1 | 9/2012 | Kapoor et al. |
| 2012/0242788 A1 | 9/2012 | Chuang et al. |
| 2012/0257061 A1 | 10/2012 | Edwards et al. |
| 2012/0259722 A1 | 10/2012 | Mikurak |
| 2012/0260184 A1 | 10/2012 | Dawes et al. |
| 2012/0265892 A1 | 10/2012 | Ma et al. |
| 2012/0269199 A1 | 10/2012 | Chan et al. |
| 2012/0278877 A1 | 11/2012 | Baum et al. |
| 2012/0280790 A1 | 11/2012 | Gerhardt et al. |
| 2012/0290740 A1 | 11/2012 | Tewari et al. |
| 2012/0296486 A1 | 11/2012 | Marriam et al. |
| 2012/0307646 A1 | 12/2012 | Xia et al. |
| 2012/0309354 A1 | 12/2012 | Du |
| 2012/0313781 A1 | 12/2012 | Barker et al. |
| 2012/0314901 A1 | 12/2012 | Hanson et al. |
| 2012/0315848 A1 | 12/2012 | Smith et al. |
| 2012/0327242 A1 | 12/2012 | Barley et al. |
| 2013/0002880 A1 | 1/2013 | Levinson et al. |
| 2013/0007871 A1 | 1/2013 | Meenan et al. |
| 2013/0038730 A1 | 2/2013 | Peterson et al. |
| 2013/0038800 A1 | 2/2013 | Yoo |
| 2013/0047123 A1 | 2/2013 | May et al. |
| 2013/0057695 A1 | 3/2013 | Huisking |
| 2013/0073746 A1 | 3/2013 | Singh et al. |
| 2013/0082835 A1 | 4/2013 | Shapiro et al. |
| 2013/0082836 A1 | 4/2013 | Watts |
| 2013/0085615 A1 | 4/2013 | Barker |
| 2013/0085620 A1 | 4/2013 | Lu et al. |
| 2013/0086618 A1 | 4/2013 | Klein et al. |
| 2013/0091213 A1 | 4/2013 | Diab et al. |
| 2013/0094538 A1 | 4/2013 | Wang |
| 2013/0103207 A1 | 4/2013 | Ruff et al. |
| 2013/0111576 A1 | 5/2013 | Devine et al. |
| 2013/0115972 A1 | 5/2013 | Ziskind et al. |
| 2013/0120131 A1 | 5/2013 | Hicks, III |
| 2013/0120134 A1 | 5/2013 | Hicks, III |
| 2013/0125157 A1 | 5/2013 | Sharif-Ahmadi et al. |
| 2013/0136102 A1 | 5/2013 | Macwan et al. |
| 2013/0147799 A1 | 6/2013 | Hoguet |
| 2013/0154822 A1 | 6/2013 | Kumar et al. |
| 2013/0155229 A1 | 6/2013 | Thornton et al. |
| 2013/0162571 A1 | 6/2013 | Tamegai |
| 2013/0163491 A1 | 6/2013 | Singh et al. |
| 2013/0163757 A1 | 6/2013 | Bellovin et al. |
| 2013/0173797 A1 | 7/2013 | Poirer et al. |
| 2013/0174239 A1 | 7/2013 | Kim et al. |
| 2013/0183924 A1 | 7/2013 | Saigh et al. |
| 2013/0184874 A1 | 7/2013 | Frader-Thompson et al. |
| 2013/0185026 A1 | 7/2013 | Banker et al. |
| 2013/0191755 A1 | 7/2013 | Balog et al. |
| 2013/0205016 A1 | 8/2013 | Dupre et al. |
| 2013/0218959 A1 | 8/2013 | Sa et al. |
| 2013/0222133 A1 | 8/2013 | Schultz et al. |
| 2013/0223279 A1 | 8/2013 | Tinnakornsrisuphap et al. |
| 2013/0245837 A1 | 9/2013 | Grohman |
| 2013/0257611 A1 | 10/2013 | Lamb et al. |
| 2013/0258119 A1 | 10/2013 | Kim et al. |
| 2013/0261821 A1 | 10/2013 | Lu et al. |
| 2013/0266193 A1 | 10/2013 | Tiwari et al. |
| 2013/0271270 A1 | 10/2013 | Jamadagni et al. |
| 2013/0286942 A1 | 10/2013 | Bonar et al. |
| 2013/0311146 A1 | 11/2013 | Miller et al. |
| 2013/0314542 A1 | 11/2013 | Jackson |
| 2013/0318231 A1 | 11/2013 | Raji et al. |
| 2013/0318443 A1 | 11/2013 | Bachman et al. |
| 2013/0325935 A1 | 12/2013 | Kiley et al. |
| 2013/0331109 A1 | 12/2013 | Dhillon et al. |
| 2013/0344875 A1 | 12/2013 | Chowdhury |
| 2013/0346921 A1 | 12/2013 | Shiplacoff et al. |
| 2014/0006660 A1 | 1/2014 | Frei et al. |
| 2014/0024361 A1 | 1/2014 | Poon et al. |
| 2014/0032034 A1* | 1/2014 | Raptopoulos ...... H04B 7/18506 |
| | | 701/25 |
| 2014/0033136 A1 | 1/2014 | St. Clair |
| 2014/0035726 A1 | 2/2014 | Schoner et al. |
| 2014/0053246 A1 | 2/2014 | Huang et al. |
| 2014/0068486 A1 | 3/2014 | Sellers et al. |
| 2014/0075464 A1 | 3/2014 | McCrea |
| 2014/0095630 A1 | 4/2014 | Wohlert et al. |
| 2014/0098247 A1 | 4/2014 | Rao et al. |
| 2014/0108151 A1 | 4/2014 | Bookstaff |
| 2014/0109130 A1 | 4/2014 | Sugimoto et al. |
| 2014/0112405 A1 | 4/2014 | Jafarian et al. |
| 2014/0126425 A1 | 5/2014 | Burd et al. |
| 2014/0136242 A1 | 5/2014 | Weekes et al. |
| 2014/0136847 A1 | 5/2014 | Huang |
| 2014/0136936 A1 | 5/2014 | Patel et al. |
| 2014/0140575 A1 | 5/2014 | Wolf |
| 2014/0143695 A1 | 5/2014 | Sundermeyer et al. |
| 2014/0143851 A1 | 5/2014 | Baum et al. |
| 2014/0143854 A1 | 5/2014 | Lopez et al. |
| 2014/0146171 A1 | 5/2014 | Brady et al. |
| 2014/0153695 A1 | 6/2014 | Yanagisawa et al. |
| 2014/0167928 A1 | 6/2014 | Burd et al. |
| 2014/0172957 A1 | 6/2014 | Baum et al. |
| 2014/0176797 A1 | 6/2014 | Silva et al. |
| 2014/0180968 A1 | 6/2014 | Song et al. |
| 2014/0188290 A1 | 7/2014 | Steinberg et al. |
| 2014/0188729 A1 | 7/2014 | Hong |
| 2014/0201291 A1 | 7/2014 | Russell |
| 2014/0208214 A1 | 7/2014 | Stern |
| 2014/0218517 A1 | 8/2014 | Kim et al. |
| 2014/0232861 A1 | 8/2014 | Naidoo et al. |
| 2014/0233951 A1 | 8/2014 | Cook |
| 2014/0236325 A1 | 8/2014 | Sasaki et al. |
| 2014/0245014 A1 | 8/2014 | Tuck et al. |
| 2014/0245160 A1 | 8/2014 | Bauer et al. |
| 2014/0254896 A1* | 9/2014 | Zhou ................ G06Q 20/40145 |
| | | 705/16 |
| 2014/0265359 A1 | 9/2014 | Cheng et al. |
| 2014/0266678 A1 | 9/2014 | Shapiro et al. |
| 2014/0266736 A1 | 9/2014 | Cretu-Petra |

(56) References Cited

U.S. PATENT DOCUMENTS

| | | |
|---|---|---|
| 2014/0277854 A1* | 9/2014 | Jones .................. G05D 1/0088 701/1 |
| 2014/0278281 A1 | 9/2014 | Vaynriber et al. |
| 2014/0282048 A1 | 9/2014 | Shapiro et al. |
| 2014/0282934 A1 | 9/2014 | Miasnik et al. |
| 2014/0289384 A1 | 9/2014 | Kao et al. |
| 2014/0289388 A1 | 9/2014 | Ghosh et al. |
| 2014/0293046 A1 | 10/2014 | Ni |
| 2014/0298467 A1 | 10/2014 | Bhagwat et al. |
| 2014/0316616 A1* | 10/2014 | Kugelmass .......... G08G 5/0039 701/8 |
| 2014/0317660 A1 | 10/2014 | Cheung et al. |
| 2014/0319232 A1 | 10/2014 | Gourlay et al. |
| 2014/0328161 A1 | 11/2014 | Haddad et al. |
| 2014/0340216 A1 | 11/2014 | Puskarich |
| 2014/0355588 A1 | 12/2014 | Cho et al. |
| 2014/0359101 A1 | 12/2014 | Dawes et al. |
| 2014/0359524 A1 | 12/2014 | Sasaki et al. |
| 2014/0369584 A1 | 12/2014 | Fan et al. |
| 2014/0372599 A1 | 12/2014 | Gutt et al. |
| 2014/0372811 A1 | 12/2014 | Cohn et al. |
| 2014/0378110 A1 | 12/2014 | Chingon et al. |
| 2015/0009325 A1 | 1/2015 | Kardashov |
| 2015/0019714 A1 | 1/2015 | Shaashua et al. |
| 2015/0022666 A1 | 1/2015 | Kay et al. |
| 2015/0026796 A1 | 1/2015 | Alan et al. |
| 2015/0058250 A1 | 2/2015 | Stanzione et al. |
| 2015/0074206 A1 | 3/2015 | Baldwin |
| 2015/0074259 A1 | 3/2015 | Ansari et al. |
| 2015/0077553 A1 | 3/2015 | Dawes |
| 2015/0082414 A1 | 3/2015 | Dawes |
| 2015/0088982 A1 | 3/2015 | Johnson et al. |
| 2015/0097680 A1 | 4/2015 | Fadell et al. |
| 2015/0097949 A1 | 4/2015 | Ure et al. |
| 2015/0097961 A1 | 4/2015 | Ure et al. |
| 2015/0100167 A1 | 4/2015 | Sloo et al. |
| 2015/0106721 A1 | 4/2015 | Cha et al. |
| 2015/0116108 A1 | 4/2015 | Fadell et al. |
| 2015/0140954 A1* | 5/2015 | Maier .................. H04W 4/025 455/404.2 |
| 2015/0142991 A1 | 5/2015 | Zaloom |
| 2015/0143395 A1 | 5/2015 | Reisman |
| 2015/0161875 A1 | 6/2015 | Cohn et al. |
| 2015/0170447 A1 | 6/2015 | Buzhardt |
| 2015/0192940 A1 | 7/2015 | Silva et al. |
| 2015/0193127 A1 | 7/2015 | Chai et al. |
| 2015/0205297 A1 | 7/2015 | Stevens et al. |
| 2015/0205465 A1 | 7/2015 | Robison et al. |
| 2015/0222517 A1 | 8/2015 | McLaughlin et al. |
| 2015/0222601 A1 | 8/2015 | Metz et al. |
| 2015/0227118 A1 | 8/2015 | Wong |
| 2015/0256355 A1 | 9/2015 | Pera et al. |
| 2015/0261427 A1 | 9/2015 | Sasaki |
| 2015/0266577 A1* | 9/2015 | Jones .................. H04B 7/18504 705/14.58 |
| 2015/0287310 A1 | 10/2015 | Deiiuliis et al. |
| 2015/0304804 A1 | 10/2015 | Lotito |
| 2015/0319006 A1 | 11/2015 | Plummer et al. |
| 2015/0319046 A1 | 11/2015 | Plummer et al. |
| 2015/0325106 A1 | 11/2015 | Dawes et al. |
| 2015/0331662 A1 | 11/2015 | Lambourne |
| 2015/0334087 A1 | 11/2015 | Dawes |
| 2015/0348554 A1 | 12/2015 | Orr et al. |
| 2015/0350031 A1 | 12/2015 | Burks et al. |
| 2015/0350735 A1 | 12/2015 | Crone |
| 2015/0358359 A1 | 12/2015 | Ghai et al. |
| 2015/0365217 A1 | 12/2015 | Scholten et al. |
| 2015/0365933 A1 | 12/2015 | Lee et al. |
| 2015/0371512 A1 | 12/2015 | Bennett et al. |
| 2015/0373149 A1 | 12/2015 | Lyons |
| 2015/0379355 A1 | 12/2015 | Kanga et al. |
| 2016/0004820 A1 | 1/2016 | Moore |
| 2016/0012715 A1 | 1/2016 | Raji et al. |
| 2016/0019763 A1 | 1/2016 | Raji et al. |
| 2016/0019778 A1 | 1/2016 | Raji et al. |
| 2016/0023475 A1 | 1/2016 | Bevier et al. |
| 2016/0027295 A1 | 1/2016 | Raji et al. |
| 2016/0036944 A1 | 2/2016 | Kitchen et al. |
| 2016/0037389 A1 | 2/2016 | Tagg et al. |
| 2016/0042637 A1* | 2/2016 | Cahill .................. G16H 40/67 701/3 |
| 2016/0055573 A1 | 2/2016 | Chen et al. |
| 2016/0062624 A1 | 3/2016 | Sundermeyer et al. |
| 2016/0063642 A1* | 3/2016 | Luciani .................. G06Q 40/08 705/4 |
| 2016/0065413 A1 | 3/2016 | Sundermeyer et al. |
| 2016/0065414 A1 | 3/2016 | Sundermeyer et al. |
| 2016/0065653 A1 | 3/2016 | Chen et al. |
| 2016/0068264 A1* | 3/2016 | Ganesh .............. G06Q 30/0637 701/4 |
| 2016/0077935 A1 | 3/2016 | Zheng et al. |
| 2016/0080365 A1 | 3/2016 | Baker et al. |
| 2016/0087933 A1 | 3/2016 | Johnson et al. |
| 2016/0094421 A1 | 3/2016 | Bali et al. |
| 2016/0100348 A1 | 4/2016 | Cohn et al. |
| 2016/0107749 A1* | 4/2016 | Mucci .................. B64C 39/024 701/3 |
| 2016/0116914 A1* | 4/2016 | Mucci .................. B64C 39/024 701/2 |
| 2016/0127641 A1* | 5/2016 | Gove .................. H04N 5/23218 348/143 |
| 2016/0147919 A1 | 5/2016 | Yabe et al. |
| 2016/0150433 A1 | 5/2016 | Bergquist et al. |
| 2016/0156941 A9 | 6/2016 | Alao et al. |
| 2016/0161277 A1 | 6/2016 | Park et al. |
| 2016/0163185 A1 | 6/2016 | Ramasubbu et al. |
| 2016/0164923 A1 | 6/2016 | Dawes |
| 2016/0171853 A1 | 6/2016 | Naidoo et al. |
| 2016/0180719 A1* | 6/2016 | Wouhaybi .......... G08G 5/0069 701/4 |
| 2016/0183073 A1 | 6/2016 | Saito et al. |
| 2016/0187995 A1 | 6/2016 | Rosewall |
| 2016/0189509 A1 | 6/2016 | Malhotra et al. |
| 2016/0189524 A1 | 6/2016 | Poder et al. |
| 2016/0189527 A1 | 6/2016 | Peterson et al. |
| 2016/0189549 A1* | 6/2016 | Marcus .............. G08G 5/0008 701/3 |
| 2016/0191265 A1 | 6/2016 | Cohn et al. |
| 2016/0191621 A1 | 6/2016 | Oh et al. |
| 2016/0192461 A1 | 6/2016 | Minsky |
| 2016/0196734 A1 | 7/2016 | Hicks, III |
| 2016/0202695 A1* | 7/2016 | Deroos .................. G01C 21/20 701/2 |
| 2016/0209072 A1 | 7/2016 | Golden et al. |
| 2016/0225240 A1 | 8/2016 | Voddhi et al. |
| 2016/0226732 A1 | 8/2016 | Kim et al. |
| 2016/0231916 A1 | 8/2016 | Dawes |
| 2016/0232780 A1 | 8/2016 | Cohn et al. |
| 2016/0234075 A1 | 8/2016 | Sirpal et al. |
| 2016/0241633 A1 | 8/2016 | Overby et al. |
| 2016/0260135 A1 | 9/2016 | Zomet et al. |
| 2016/0261932 A1 | 9/2016 | Fadell et al. |
| 2016/0266579 A1* | 9/2016 | Chen .................. G06V 20/176 |
| 2016/0267751 A1 | 9/2016 | Fulker et al. |
| 2016/0269191 A1 | 9/2016 | Cronin |
| 2016/0274759 A1 | 9/2016 | Dawes |
| 2016/0323731 A1 | 11/2016 | Mohammed et al. |
| 2016/0363337 A1 | 12/2016 | Steinberg et al. |
| 2016/0364089 A1 | 12/2016 | Blackman et al. |
| 2016/0371961 A1 | 12/2016 | Narang et al. |
| 2016/0371967 A1 | 12/2016 | Narang et al. |
| 2016/0373453 A1 | 12/2016 | Ruffner et al. |
| 2016/0378109 A1* | 12/2016 | Raffa .................. G05D 1/0038 701/2 |
| 2017/0004714 A1* | 1/2017 | Rhee .................. G08G 5/0056 |
| 2017/0005818 A1 | 1/2017 | Gould |
| 2017/0006107 A1 | 1/2017 | Dawes et al. |
| 2017/0019644 A1* | 1/2017 | K V .................. G08B 13/19697 |
| 2017/0026440 A1 | 1/2017 | Cockrell et al. |
| 2017/0039413 A1* | 2/2017 | Nadler .................. G06V 10/75 |
| 2017/0052513 A1 | 2/2017 | Raji et al. |
| 2017/0054570 A1 | 2/2017 | Hagins et al. |
| 2017/0054571 A1 | 2/2017 | Kitchen et al. |

(56) References Cited

U.S. PATENT DOCUMENTS

| | | |
|---|---|---|
| 2017/0063967 A1 | 3/2017 | Kitchen et al. |
| 2017/0063968 A1 | 3/2017 | Kitchen et al. |
| 2017/0068419 A1 | 3/2017 | Sundermeyer et al. |
| 2017/0070361 A1 | 3/2017 | Sundermeyer et al. |
| 2017/0070563 A1 | 3/2017 | Sundermeyer et al. |
| 2017/0078298 A1 | 3/2017 | Vlaminck et al. |
| 2017/0092138 A1* | 3/2017 | Trundle ............... G08B 25/14 |
| 2017/0103646 A1 | 4/2017 | Naidoo et al. |
| 2017/0109999 A1 | 4/2017 | Cohn et al. |
| 2017/0111227 A1 | 4/2017 | Papageorgiou et al. |
| 2017/0118037 A1 | 4/2017 | Kitchen et al. |
| 2017/0124987 A1 | 5/2017 | Kim et al. |
| 2017/0127124 A9 | 5/2017 | Wilson et al. |
| 2017/0154507 A1 | 6/2017 | Dawes et al. |
| 2017/0155545 A1 | 6/2017 | Baum et al. |
| 2017/0180306 A1 | 6/2017 | Gutt et al. |
| 2017/0185277 A1 | 6/2017 | Sundermeyer et al. |
| 2017/0185278 A1 | 6/2017 | Sundermeyer et al. |
| 2017/0185281 A1 | 6/2017 | Park et al. |
| 2017/0187993 A1* | 6/2017 | Martch ................ B64C 39/024 |
| 2017/0192402 A1 | 7/2017 | Karp et al. |
| 2017/0225336 A1 | 8/2017 | Deyle et al. |
| 2017/0227965 A1 | 8/2017 | Decenzo et al. |
| 2017/0244573 A1 | 8/2017 | Baum et al. |
| 2017/0255452 A1 | 9/2017 | Barnes et al. |
| 2017/0257257 A1 | 9/2017 | Dawes |
| 2017/0278407 A1* | 9/2017 | Lemmey ............. G06F 21/6245 |
| 2017/0279629 A1 | 9/2017 | Raji |
| 2017/0289323 A1* | 10/2017 | Gelvin ................. G06F 15/173 |
| 2017/0289360 A1 | 10/2017 | Baum et al. |
| 2017/0301216 A1 | 10/2017 | Cohn et al. |
| 2017/0302469 A1 | 10/2017 | Cohn et al. |
| 2017/0303257 A1 | 10/2017 | Yamada et al. |
| 2017/0310500 A1 | 10/2017 | Dawes |
| 2017/0330466 A1* | 11/2017 | Demetriades ........ G08G 5/0086 |
| 2017/0331781 A1 | 11/2017 | Gutt et al. |
| 2017/0332055 A1 | 11/2017 | Henderson |
| 2017/0337806 A1 | 11/2017 | Cohn et al. |
| 2017/0353324 A1 | 12/2017 | Baum et al. |
| 2018/0004377 A1 | 1/2018 | Kitchen et al. |
| 2018/0012460 A1 | 1/2018 | Heitz, III et al. |
| 2018/0019890 A1 | 1/2018 | Dawes |
| 2018/0027517 A9* | 1/2018 | Noonan ................ H04W 64/00 455/456.1 |
| 2018/0045159 A1 | 2/2018 | Patel |
| 2018/0054774 A1 | 2/2018 | Cohn et al. |
| 2018/0063248 A1 | 3/2018 | Dawes et al. |
| 2018/0063259 A1 | 3/2018 | Connelly et al. |
| 2018/0069862 A1 | 3/2018 | Cholas et al. |
| 2018/0069932 A1 | 3/2018 | Tiwari et al. |
| 2018/0082575 A1 | 3/2018 | El-Mankabady |
| 2018/0092046 A1 | 3/2018 | Egan et al. |
| 2018/0095155 A1* | 4/2018 | Soni .................... G01S 19/015 |
| 2018/0096568 A1 | 4/2018 | Cohn et al. |
| 2018/0107196 A1 | 4/2018 | Bian et al. |
| 2018/0152342 A1 | 5/2018 | Karaoguz et al. |
| 2018/0183668 A1 | 6/2018 | Caldwell et al. |
| 2018/0191740 A1 | 7/2018 | Decenzo et al. |
| 2018/0191742 A1 | 7/2018 | Dawes |
| 2018/0191807 A1 | 7/2018 | Dawes |
| 2018/0197387 A1 | 7/2018 | Dawes |
| 2018/0198688 A1 | 7/2018 | Dawes |
| 2018/0198841 A1 | 7/2018 | Chmielewski et al. |
| 2018/0278701 A1 | 9/2018 | Diem |
| 2018/0307223 A1* | 10/2018 | Peeters ................. G05D 1/00 |
| 2018/0322759 A1 | 11/2018 | Devdas et al. |
| 2019/0014413 A1 | 1/2019 | Kallai et al. |
| 2019/0041547 A1 | 2/2019 | Rolf et al. |
| 2019/0058720 A1 | 2/2019 | Lindquist et al. |
| 2019/0073193 A1* | 3/2019 | Krispin ................ B64D 47/08 |
| 2019/0073534 A1* | 3/2019 | Dvir .................... G06V 10/56 |
| 2019/0103030 A1* | 4/2019 | Banga ................. G08G 5/006 |
| 2019/0176985 A1* | 6/2019 | Mucci ................. G08B 25/08 |
| 2019/0197256 A1 | 6/2019 | Lehnhardt et al. |
| 2019/0204836 A1* | 7/2019 | Rezvani ............... G05D 1/0022 |
| 2019/0239008 A1 | 8/2019 | Lambourne |
| 2019/0245798 A1 | 8/2019 | Short et al. |
| 2019/0265694 A1* | 8/2019 | Chen .................... G07C 5/008 |
| 2019/0347924 A1* | 11/2019 | Trundle ............... G05D 1/104 |
| 2019/0391545 A1 | 12/2019 | Frundle et al. |
| 2020/0014675 A1 | 1/2020 | Helms et al. |
| 2020/0026285 A1* | 1/2020 | Perrone ............... B25J 9/1661 |
| 2020/0029339 A1 | 1/2020 | Suzuki |
| 2020/0032887 A1 | 1/2020 | McBurney et al. |
| 2020/0036635 A1 | 1/2020 | Ohuchi |
| 2020/0076858 A1 | 3/2020 | Apsangi et al. |
| 2020/0094963 A1* | 3/2020 | Myslinski ........... B64D 47/02 |
| 2020/0127891 A9 | 4/2020 | Johnson et al. |
| 2020/0137125 A1 | 4/2020 | Patnala et al. |
| 2020/0162890 A1 | 5/2020 | Spencer et al. |
| 2020/0186612 A1 | 6/2020 | Saint Clair |
| 2020/0196213 A1 | 6/2020 | Cheng et al. |
| 2020/0257721 A1* | 8/2020 | McKinnon ........... G06T 15/20 |
| 2020/0273277 A1* | 8/2020 | Kerning .............. H04L 63/102 |
| 2020/0279626 A1 | 9/2020 | Ansari et al. |
| 2020/0322577 A1* | 10/2020 | Raffa ................... G08G 5/0043 |
| 2020/0328880 A1 | 10/2020 | Bolotin et al. |
| 2020/0328887 A1 | 10/2020 | Kostiainen et al. |
| 2020/0329136 A1 | 10/2020 | Gerhardt et al. |
| 2020/0333780 A1* | 10/2020 | Kerzner .............. G08B 15/00 |
| 2020/0349786 A1 | 11/2020 | Ho et al. |
| 2020/0380851 A1* | 12/2020 | Farrand .............. G08B 25/00 |
| 2021/0021710 A1 | 1/2021 | Stepanian |
| 2021/0029547 A1 | 1/2021 | Beachem et al. |
| 2021/0053175 A1 | 2/2021 | Rappl et al. |
| 2021/0068034 A1* | 3/2021 | Juhasz ................. H04W 4/029 |
| 2021/0081553 A1* | 3/2021 | Lemmey ............. H04L 63/10 |
| 2021/0099753 A1 | 4/2021 | Connelly et al. |
| 2021/0153001 A1* | 5/2021 | Eisner ................. H04W 4/90 |
| 2021/0180815 A1 | 6/2021 | Shamoon et al. |
| 2021/0250726 A1* | 8/2021 | Jones .................. H04L 61/4511 |
| 2021/0326451 A1 | 10/2021 | Nuñez Di Croce |
| 2021/0335123 A1* | 10/2021 | Trundle ............... G05D 1/104 |
| 2022/0021552 A1 | 1/2022 | Ansari et al. |
| 2022/0027051 A1 | 1/2022 | Kant et al. |
| 2022/0029994 A1 | 1/2022 | Choyi et al. |
| 2022/0038440 A1 | 2/2022 | Boynton et al. |
| 2022/0073052 A1* | 3/2022 | Zhou ................... B64C 29/0033 |
| 2022/0159334 A1 | 5/2022 | Wang et al. |
| 2022/0247624 A1 | 8/2022 | Johnson et al. |
| 2022/0415104 A1 | 12/2022 | McLachlan et al. |
| 2023/0057193 A1 | 2/2023 | Ansari et al. |

FOREIGN PATENT DOCUMENTS

| | | |
|---|---|---|
| AU | 2011250886 A1 | 1/2013 |
| AU | 2013284428 A1 | 2/2015 |
| AU | 2011305163 B2 | 12/2016 |
| AU | 2017201365 A1 | 3/2017 |
| AU | 2017201585 A1 | 3/2017 |
| BE | 1008939 A6 | 10/1996 |
| CA | 2203813 A1 | 6/1996 |
| CA | 2174482 A1 | 10/1997 |
| CA | 2346638 A1 | 4/2000 |
| CA | 2389958 A1 | 3/2003 |
| CA | 2878117 A1 | 1/2014 |
| CA | 2559842 C | 5/2014 |
| CA | 2992429 A1 | 12/2016 |
| CA | 2976682 A1 | 2/2018 |
| CA | 2976802 A1 | 2/2018 |
| CN | 1599999 A | 3/2005 |
| CN | 102834818 A | 12/2012 |
| CN | 102985915 A | 3/2013 |
| DE | 102004027893 A1 | 1/2006 |
| EP | 0295146 A2 | 12/1988 |
| EP | 0308046 A2 | 3/1989 |
| EP | 0591585 A1 | 4/1994 |
| EP | 1117214 A2 | 7/2001 |
| EP | 1119837 A1 | 8/2001 |
| EP | 0978111 | 11/2001 |
| EP | 1738540 A2 | 1/2007 |
| EP | 1881716 A1 | 1/2008 |
| EP | 2112784 A1 | 10/2009 |
| EP | 2188794 A1 | 5/2010 |

(56) References Cited

FOREIGN PATENT DOCUMENTS

| | | |
|---|---|---|
| EP | 2191351 A1 | 6/2010 |
| EP | 2327063 A1 | 6/2011 |
| EP | 2483788 A1 | 8/2012 |
| EP | 2569712 A1 | 3/2013 |
| EP | 2619686 A1 | 7/2013 |
| EP | 2868039 A2 | 5/2015 |
| EP | 3031206 A2 | 6/2016 |
| EP | 3285238 A2 | 2/2018 |
| EP | 3308222 A1 | 4/2018 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2286423 A | 8/1995 |
| GB | 2291554 A | 1/1996 |
| GB | 2319373 A | 5/1998 |
| GB | 2320644 A | 6/1998 |
| GB | 2324630 A | 10/1998 |
| GB | 2325548 A | 11/1998 |
| GB | 2335523 A | 9/1999 |
| GB | 2349293 A | 10/2000 |
| GB | 2370400 A | 6/2002 |
| GB | 2442628 A | 4/2008 |
| GB | 2442633 A | 4/2008 |
| GB | 2442640 A | 4/2008 |
| GB | 2428821 B | 6/2008 |
| IN | 45/2015 | 11/2015 |
| IN | 04/2016 | 1/2016 |
| JP | 63-033088 A | 2/1988 |
| JP | 05-167712 A | 7/1993 |
| JP | 06-339183 A | 12/1993 |
| JP | 08-227491 | 9/1996 |
| JP | 10-004451 A | 1/1998 |
| JP | 11-234277 A | 8/1999 |
| JP | 2000-006343 A | 1/2000 |
| JP | 2000-023146 A | 1/2000 |
| JP | 2000-278671 A | 10/2000 |
| JP | 2001-006088 A | 1/2001 |
| JP | 2001-006343 A | 1/2001 |
| JP | 2001-069209 A | 3/2001 |
| JP | 2002-055895 | 2/2002 |
| JP | 2002-185629 | 6/2002 |
| JP | 2003-085258 A | 3/2003 |
| JP | 2003-141659 A | 5/2003 |
| JP | 2003-281647 A | 10/2003 |
| JP | 2004-192659 A | 7/2004 |
| JP | 2006-094394 A | 4/2006 |
| JP | 2007-529826 A | 10/2007 |
| JP | 2009-213107 A | 9/2009 |
| JP | 2010-140091 A | 6/2010 |
| KR | 10-2005-0051577 A | 6/2005 |
| KR | 10-2005-0052826 A | 6/2005 |
| KR | 10-2006-0021605 A | 3/2006 |
| KR | 10-0771941 B1 | 10/2007 |
| TW | 340934 B | 9/1998 |
| TW | I239176 B | 9/2005 |
| TW | 201101243 A | 1/2011 |
| TW | 201102976 A | 1/2011 |
| TW | 201102978 A | 1/2011 |
| TW | I340934 B | 4/2011 |
| TW | 201117141 A | 5/2011 |
| TW | I480839 B | 4/2015 |
| TW | I480840 B | 4/2015 |
| TW | I509579 B | 11/2015 |
| TW | I517106 B | 1/2016 |
| WO | 89/07855 A1 | 8/1989 |
| WO | 89/11187 A1 | 11/1989 |
| WO | 94/03881 A1 | 2/1994 |
| WO | 95/13944 A1 | 5/1995 |
| WO | 96/36301 A1 | 11/1996 |
| WO | 97/13230 A2 | 4/1997 |
| WO | 98/25243 A1 | 6/1998 |
| WO | 98/49663 A1 | 11/1998 |
| WO | 98/52343 A1 | 11/1998 |
| WO | 98/59256 A2 | 12/1998 |
| WO | 99/34339 A2 | 7/1999 |
| WO | 00/21053 A1 | 4/2000 |
| WO | 00/36812 A1 | 6/2000 |
| WO | 00/72598 A1 | 11/2000 |
| WO | 01/11586 A1 | 2/2001 |
| WO | 01/52478 A2 | 7/2001 |
| WO | 01/71489 A1 | 9/2001 |
| WO | 01/86622 A1 | 11/2001 |
| WO | 01/99078 A2 | 12/2001 |
| WO | 02/11444 A1 | 2/2002 |
| WO | 02/21300 A1 | 3/2002 |
| WO | 02/97584 A2 | 12/2002 |
| WO | 2002/100083 | 12/2002 |
| WO | 2003/026305 A1 | 3/2003 |
| WO | 03/40839 A1 | 5/2003 |
| WO | 03049379 A1 | 6/2003 |
| WO | 03/98908 A1 | 11/2003 |
| WO | 2004/004222 A1 | 1/2004 |
| WO | 2004/077307 A1 | 9/2004 |
| WO | 2004/098127 A1 | 11/2004 |
| WO | 2004/107710 A1 | 12/2004 |
| WO | 2005/047990 A2 | 5/2005 |
| WO | 2005/091218 A2 | 9/2005 |
| WO | 2007/038872 A1 | 4/2007 |
| WO | 2007/124453 A2 | 11/2007 |
| WO | 2008/056320 A1 | 5/2008 |
| WO | 2009/006670 A1 | 1/2009 |
| WO | 2009/023647 A1 | 2/2009 |
| WO | 2009/029590 A1 | 3/2009 |
| WO | 2009/029597 A1 | 3/2009 |
| WO | 2009/064795 A1 | 5/2009 |
| WO | 2009/145747 A1 | 12/2009 |
| WO | 2010/019624 A1 | 2/2010 |
| WO | 2010/025468 A1 | 3/2010 |
| WO | 2010/127009 A1 | 11/2010 |
| WO | 2010/127194 A2 | 11/2010 |
| WO | 2010/127200 A1 | 11/2010 |
| WO | 2010/127203 A1 | 11/2010 |
| WO | 2011/038409 A1 | 3/2011 |
| WO | 2011/063354 A1 | 5/2011 |
| WO | 2011/143273 A1 | 11/2011 |
| WO | 2012/040653 A1 | 3/2012 |
| WO | 2014/004911 A2 | 1/2014 |
| WO | 2015/021469 A2 | 2/2015 |
| WO | 2015/134520 A1 | 9/2015 |
| WO | 2015/176775 A1 | 11/2015 |
| WO | 2016/201033 A1 | 12/2016 |
| ZA | 201302668 | 6/2014 |

OTHER PUBLICATIONS

U.S. Patent Application filed on Mar. 18, 2019, entitled "Server-Based Notification of Alarm Event Subsequent to Communication Failure With Armed Security System", U.S. Appl. No. 16/356,742.
U.S. Patent Application filed on Mar. 20, 2020, entitled "Security, Monitoring and Automation Controller Access and Use of Legacy Security Control Panel Information", U.S. Appl. No. 16/825,099.
U.S. Patent Application filed on Mar. 22, 2021, entitled "Premises Management Configuration and Control", U.S. Appl. No. 17/208,866.
U.S. Patent Application filed on Apr. 8, 2021, entitled "System for Data Routing in Networks", U.S. Appl. No. 17/301,605.
U.S. Patent Application filed on Apr. 17, 2020, entitled "Method and System for Providing Alternate Network Access", U.S. Appl. No. 16/852,072.
U.S. Patent Application filed on Apr. 17, 2020, entitled "Networked Touchscreen With Integrated Interfaces", U.S. Appl. No. 16/852,058.
U.S. Patent Application filed on Apr. 23, 2019, entitled "Control System User Interface", U.S. Appl. No. 16/391,625.
U.S. Patent Application filed on Apr. 26, 2019, entitled "Custom Content for Premises Management", U.S. Appl. No. 16/396,368.
U.S. patent application filed on May 2, 2018, entitled "Automation System With Mobile Interface", U.S. Appl. No. 15/969,514.
U.S. Patent Application filed on May 10, 2021, entitled "Management of a Security System at a Premises", U.S. Appl. No. 17/316,402.
U.S. Patent Application filed on May 11, 2020, entitled "Control System User Interface", U.S. Appl. No. 16/871,151.

(56) References Cited

OTHER PUBLICATIONS

U.S. Patent Application filed on May 12, 2020, entitled "IP Device Discovery Systems and Methods", U.S. Appl. No. 15/930,029.
U.S. Patent Application filed on May 19, 2020, entitled "User Interface in a Premises Network", U.S. Appl. No. 16/878,099.
U.S. Patent Application filed on May 23, 2018, entitled "Networked Touchscreen With Integrated Interfaces", U.S. Appl. No. 15/987,638.
U.S. Patent Application filed on May 26, 2020, entitled "Premises Management Configuration and Control", U.S. Appl. No. 16/882,876.
U.S. Patent Application filed on Jun. 1, 2012, entitled "Gateway Registry Methods and Systems", U.S. Appl. No. 13/486,276.
U.S. Patent Application filed on Jun. 9, 2021, entitled "Premises Management Configuration and Control", U.S. Appl. No. 17/343,315.
U.S. Patent Application filed on Jun. 10, 2020, entitled "Method and System for Communicating With and Controlling an Alarm System From a Remote Server", U.S. Appl. No. 16/898,146.
U.S. Patent Application filed on Jun. 18, 2021, entitled "Controlling Data Routing Among Networks", U.S. Appl. No. 17/304,342.
U.S. Patent Application filed on Jun. 24, 2020, entitled "Method and System for Processing Security Event Data", U.S. Appl. No. 16/910,967.
U.S. Patent Application filed on Jun. 27, 2018, entitled "Activation of Gateway Device", U.S. Appl. No. 16/020,499.
U.S. Patent Application filed on Jul. 2, 2019, entitled "Communication Protocols in Integrated Systems", U.S. Appl. No. 16/460,712.
U.S. Patent Application filed on Jul. 3, 2018, entitled "WIFI-to-Serial Encapsulation in Systems", U.S. Appl. No. 16/026,703.
U.S. Patent Application filed on Jul. 9, 2020, entitled "Automation System With Mobile Interface", U.S. Appl. No. 16/925,026.
U.S. Patent Application filed on Jul. 12, 2018, entitled "Integrated Security System with Parallel Processing Architecture", U.S. Appl. No. 16/034,132.
U.S. Patent Application filed on Jul. 20, 2018, entitled "Cross-Client Sensor User Interface in an Integrated Security Network", U.S. Appl. No. 16/041,291.
U.S. Patent Application filed on Jul. 26, 2019, entitled "Device Integration Framework", U.S. Appl. No. 16/522,949.
U.S. Patent Application filed on Jul. 26, 2021, entitled "Notification of Event Subsequent to Communication Failure With Security System", U.S. Appl. No. 17/443,427.
U.S. Patent Application filed on Jul. 28, 2016, entitled "Method and System for Automatically Providing Alternate Network Access for Telecommunications", U.S. Appl. No. 15/222,416.
U.S. Patent Application filed on Jul. 30, 2021, entitled "Gateway Integrated With Premises Security System", U.S. Appl. No. 17/390,222.
U.S. Patent Application filed on Aug. 8, 2016, entitled "Security, Monitoring and Automation Controller Access and Use of Legacy Security Control Panel Information", U.S. Appl. No. 15/231,273.
U.S. Patent Application filed on Aug. 9, 2016, entitled "Controller and Interface for Home Security, Monitoring and Automation Having Customizable Audio Alerts for SMA Events", U.S. Appl. No. 15/232,135.
U.S. Patent Application filed on Aug. 9, 2018, entitled "Method and System for Processing Security Event Data", U.S. Appl. No. 16/059,833.
U.S. Patent Application filed on Aug. 10, 2021, entitled "Media Content Management", U.S. Appl. No. 17/398,939.
U.S. Patent Application filed on Aug. 16, 2021, entitled "Control System User Interface", U.S. Appl. No. 17/403,526.
U.S. Patent Application filed on Aug. 21, 2018, entitled "Premises System Management Using Status Signal", U.S. Appl. No. 16/107,568.
U.S. Patent Application filed on Aug. 23, 2019, entitled "Premises System Management Using Status Signal", U.S. Appl. No. 16/549,837.
U.S. Patent Application filed on Aug. 23, 2021, entitled "Method and System for Providing Alternate Network Access", U.S. Appl. No. 17/409,528.
U.S. Patent Application filed on Aug. 26, 2020, entitled "Automation System User Interface With Three-Dimensional Display", U.S. Appl. No. 17/003,550.
U.S. Patent Application filed on Aug. 31, 2021, entitled "Networked Touchscreen With Integrated Interfaces", U.S. Appl. No. 17/463,267.

U.S. Patent Application filed on Sep. 6, 2018, entitled "Takeover of Security Network", U.S. Appl. No. 16/123,695.
U.S. Patent Application filed on Sep. 7, 2021, entitled "Gateway Registry Methods and Systems", U.S. Appl. No. 17/468,188.
U.S. Patent Application filed on Sep. 8, 2021, entitled "User Interface in a Premises Network", U.S. Appl. No. 17/469,417.
U.S. Patent Application filed on Sep. 9, 2021, entitled "Premises System Management Using Status Signal", U.S. Appl. No. 17/470,732.
U.S. Patent Application filed on Sep. 10, 2020, entitled "Security System With Networked Touchscreen", U.S. Appl. No. 17/017,519.
U.S. Patent Application filed on Sep. 11, 2020, entitled "Management of Applications for a Device Located at a Premises", U.S. Appl. No. 17/018,901.
U.S. Patent Application filed on Sep. 17, 2018, entitled "Integrated Security System With Parallel Processing Architecture", U.S. Appl. No. 16/133,135.
U.S. Patent Application filed on Sep. 27, 2019, entitled "Control System User Interface", U.S. Appl. No. 16/585,481.
U.S. Patent Application filed on Sep. 28, 2018, entitled "Control System User Interface", U.S. Appl. No. 16/146,715.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
Requirement for Restriction/Election dated Jan. 22, 2013 for U.S. Appl. No. 13/104,932, filed May 10, 2011.
Requirement for Restriction/Election dated Oct. 24, 2012 for U.S. Appl. No. 12/750,470, filed Mar. 30, 2010.
Security for the Future, Introducing 5804B0—Advanced two-way wireless remote technology, Advertisement, ADEMCO Group, Syosset, NY, circa 1997.
Shang, Wei-Lai, "Study on Application Embedded Intelligent Area System", Journal of Anyang Institute of Technology, Dec. 2010, vol. 9, No. 6, pp. 56-57 and 65.
South African Patent App. No. 2013/02668, corresponds to WO2012/040653.
Supplemental European Search Report for Application No. EP05725743.8 dated Sep. 14, 2010, 2 pages.
Supplementary European Search Report for Application No. EP10819658, dated Mar. 10, 2015, 2 pages.
Supplementary European Search Report for Application No. EP11827671, dated Mar. 10, 2015, 2 pages.
Supplementary Partial European Search Report for Application No. EP09807196, dated Nov. 17, 2014, 5 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, Alarm.com (U.S. Pat. No. 8,350,694B1) (inventors Stephen Scott Trundle & Alison Jane Slavin) V iControl Networks, Inc. (U.S. Appl. No. 13/311,365) (Inventors. Poul j. Dawes, Jim Fulker, Carolyn Wales, Reza Raji, and Gerald Gutt), Patent Interference 106,001 (HHB) (Technology Center 24000), Mar. 31, 2015.
U.S. Patent Application filed on Jan. 3, 2019, entitled "Methods and Systems for Data Communication", U.S. Appl. No. 16/239,114.
U.S. Patent Application filed on Jan. 11, 2021, entitled "Premise Management Systems and Methods", U.S. Appl. No. 17/145,773.
U.S. Patent Application filed on Jan. 22, 2019, entitled "Data Model for Home Automation", U.S. Appl. No. 16/254,535.

(56) References Cited

OTHER PUBLICATIONS

U.S. Patent Application filed on Jan. 22, 2019, entitled "Premises System Automation", U.S. Appl. No. 16/254,480.
U.S. Patent Application filed on Jan. 23, 2020, entitled "Forming a Security Network Including Integrated Security System Components and Network Dev", U.S. Appl. No. 16/750,976.
U.S. Patent Application filed on Jan. 25, 2019, entitled Communication Protocols in Integrated Systems, U.S. Appl. No. 16/257,706.
U.S. Patent Application filed on Jan. 28, 2019, entitled "Automation System User Interface With Three-Dimensional Display", U.S. Appl. No. 16/258,858.
U.S. Patent Application filed on Feb. 6, 2020, entitled "Activation of Gateway Device", U.S. Appl. No. 16/784,159.
U.S. Patent Application filed on Feb. 8, 2022, entitled "Server-Based Notification of Alarm Event Subsequent to Communication Failure With Armed Security System", U.S. Appl. No. 17/650,324.
U.S. Patent Application filed on Feb. 9, 2021, entitled "Premises Management Networking", U.S. Appl. No. 17/171,398.
U.S. Patent Application filed on Mar. 2, 2017, entitled "Generating Risk Profile Using Data of Home Monitoring and Security System", U.S. Appl. No. 15/447,982.
U.S. Patent Application filed on Mar. 2, 2020, entitled "Communication Protocols in Integrated Systems", U.S. Appl. No. 16/807,100.
U.S. Patent Application filed on Mar. 2, 2020, entitled "Coordinated Control of Connected Devices in a Premise", U.S. Appl. No. 16/807,028.
U.S. Patent Application filed on Mar. 7, 2014, entitled "Activation of Gateway Device", U.S. Appl. No. 14/201,162.
U.S. Patent Application filed on Mar. 7, 2014, entitled "Communication Protocols in Integrated Systems", U.S. Appl. No. 14/200,921.
U.S. Patent Application filed on Mar. 7, 2014, entitled "Device Integration Framework", U.S. Appl. No. 14/201,227.
U.S. Patent Application filed on Mar. 7, 2014, entitled "Integrated Security and Control System With Geofencing", U.S. Appl. No. 14/201,189.
U.S. Patent Application filed on Mar. 7, 2014, entitled "Security System Integrated With Social Media Platform", U.S. Appl. No. 14/201,133.
U.S. Patent Application filed on Mar. 10, 2014, entitled "Communication Protocols in Integrated Systems", U.S. Appl. No. 14/202,573.
U.S. Patent Application filed on Mar. 10, 2014, entitled "Communication Protocols in Integrated Systems", U.S. Appl. No. 14/202,592.
U.S. Patent Application filed on Mar. 10, 2014, entitled "Communication Protocols in Integrated Systems", U.S. Appl. No. 14/202,627.
U.S. Patent Application filed on Mar. 10, 2014, entitled "Communication Protocols in Integrated Systems", U.S. Appl. No. 14/202,685.
U.S. Patent Application filed on Mar. 10, 2014, entitled "Communication Protocols in Integrated Systems", U.S. Appl. No. 14/203,077.
U.S. Patent Application filed on Mar. 10, 2014, entitled "Communication Protocols in Integrated Systems", U.S. Appl. No. 14/203,084.
U.S. Patent Application filed on Mar. 10, 2014, entitled "Communication Protocols in Integrated Systems", U.S. Appl. No. 14/203,128.
U.S. Patent Application filed on Mar. 10, 2014, entitled "Communication Protocols in Integrated Systems", U.S. Appl. No. 14/203,141.
U.S. Patent Application filed on Mar. 10, 2014, entitled "Communication Protocols in Integrated Systems", U.S. Appl. No. 14/203,219.
U.S. Patent Application filed on Mar. 10, 2014, entitled "Communication Protocols Over Internet Protocol (IP) Networks", U.S. Appl. No. 14/202,505.
U.S. Patent Application filed on Mar. 10, 2014, entitled "Communication Protocols Over Internet Protocol (IP) Networks", U.S. Appl. No. 14/202,579.
U.S. Patent Application filed on Mar. 10, 2022, entitled "Virtual Device Systems and Methods", U.S. Appl. No. 17/691,774.
U.S. Patent Application filed on Mar. 11, 2020, entitled "Management of a Security System at a Premises", U.S. Appl. No. 16/816,134.
U.S. Patent Application filed on Mar. 15, 2021, entitled "Automation System User Interface", U.S. Appl. No. 17/202,279.
U.S. Patent Application filed on Jun. 1, 2022, entitled "Integrated Cloud System for Premises Automation", U.S. Appl. No. 17/804,941.
U.S. Patent Application filed on Jun. 8, 2022, entitled "Methods and Systems for Data Communication", U.S. Appl. No. 17/835,394.
U.S. Patent Application filed on Jun. 10, 2022, entitled "Media Content Management", U.S. Appl. No. 17/838,046.
U.S. Patent Application filed on Jun. 10, 2022, entitled "Method, System and Apparatus for Automated Reporting of Account and Sensor Zone Information to a Central Station", U.S. Appl. No. 17/806,341.
U.S. Patent Application filed on Jun. 22, 2022, entitled "Activation of Gateway Device", U.S. Appl. No. 17/808,146.
U.S. Patent Application filed on Jun. 22, 2022, entitled "Automation System User Interface With Three-Dimensional Display", U.S. Appl. No. 17/808,275.
U.S. Patent Application filed on Jun. 22, 2022, entitled "Communication Protocols in Integrated Systems", U.S. Appl. No. 17/808,118.
U.S. Patent Application filed on Jul. 1, 2022, entitled "Forming a Security Network Including Integrated Security System Components", U.S. Appl. No. 17/856,448.
Final Office Action dated Jul. 12, 2010 for U.S. Appl. No. 12/019,554, filed Jan. 24, 2008.
Final Office Action dated Sep. 14, 2011 for U.S. Appl. No. 12/197,931, filed Aug. 25, 2008.
Foreign communication from a related counterpart application—International Preliminary Examination Report, App No. PCT/US02/14450, dated Mar. 2, 2004, 4 pgs.
Foreign communication from a related counterpart application—International Search Report, App No. PCT/US02/14450, dated Dec. 17, 2002, 6 pgs.
Form PCT/ISA/210, "PCT International Search Report for the Application No. PCT/US05/08766," dated May 23, 2006, 2 pages.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US08/74246," dated Nov. 14, 2008, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US08/83254," dated Jan. 14, 2009, 2 pages.
Form PCT/ISA/210, "PCT International Search Report for the Application No. PCT/US09/53485,"dated Oct. 22, 2009, 2 pages.
Form PCT/ISA/210, "PCT International Search Report for the Application No. PCT/US09/55559," dated Nov. 12, 2009, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US10/57674," dated Mar. 2, 2011, 2 pages.
Form PCT/ISA/210, "PCT International Search Report for the Application No. PCT/US11/34858," dated Oct. 3, 2011, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/53136," dated Jan. 5, 2012, 2 pages.
Form PCT/ISA/210, "PCT International Search Report," 2 pgs.
Form PCT/ISA/220, "PCT Notification of Transmittal of the International Search Report and the Written Opinion fo the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/83254," dated Jan. 14, 2009, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.

(56) References Cited

OTHER PUBLICATIONS

Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US11/35994," dated Sep. 28, 2011, 1 page.
Form PCT/ISA/220, "PCT Notification of Transmittal of the International Search Report and the Written Opinion of the International Searching Authority, or the Declaration," 1 pg.
Form PCT/ISA/220, PCT Notification of Transmittal of the International Search Report and the Written Opinion of the International Searching Authority, or the Declaration for the Application No. PCT/US05/08766, dated May 23, 2006, 1 page.
Form PCT/ISA/237," PCT Written Opinion of the International Searching Authority for the Application No. PCT/US05/08766," dated May 23, 2006, 5 pages.
Form PCT/ISA/237, "PCT Written Opinion of the International Searching Authority for the Application No. PCT/US08/72831," dated Nov. 4, 2008, 6 pages.
Form PCT/ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/74260," dated Nov. 13, 2008, 6 pages.
Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US09/55559," dated Nov. 12, 2009, 6 pages.
Form PCT/ISA/237, "PCT Written Opinion of the International Searching Authority for the Application No. PCT/US10/50585," dated Dec. 30, 2010, 7 pages.
Form PCT/ISA/237, "PCT Written Opinion of the International Searching Authority for the Application No. PCT/US10/57674," dated Mar. 2, 2011, 6 pages.
Form PCT/ISA/237, "PCT Written Opinion of the International Searching Authority for the Application No. PCT/US11/34858," dated Oct. 3, 2011, 8 pages.
Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/53136," dated Jan. 5, 2012.
Form PCT/ISA/237, "PCT Written Opinion of the International Searching Authority of the Application No. PCT/US08/83254," dated Jan. 14, 2009, 7 pages.
Form PCT/ISA/237, "PCT Written Opinion of the International Searching Authority," 6 pgs.
Genex OmniEye http://www.qenextech.com/prod01.htm, 1999 5 pages.
Genex Technologies, Genex OmniEye, www.aviq.com/avcat/images/documents/pdfs/omnieye%20nightwatchbrochure.pdf; webpage accessed Jan. 10, 2018.
Gong, Li, A Software architecture for open service gateways, Internet Computing, IEEE 5.1, Jan.-Feb. 2001, 64-70.

GrayElectronics, "Digitizing TV cameras on TCP/IP Computer Networks," http://www.grayelectronics.com/default.htm, printed on Oct. 12, 1999 (2 pages).
GrayElectronics, http://www.grayelectronics.com; webpage accessed on Jan. 10, 2018.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012, corresponds to WO2011/143273.
Indian Patent App. No. 3687/DELNP/2012, corresponds to WO2011/038409 filed on Sep. 28, 2010.
Indicate. Meniam-Webster.com Dictionary, Merriam-Webster, https://web.archive.org/web/20061209080613/https://www.merriam-webster.com/dictionary/indicate. Dec. 9, 2006.
U.S. Patent Application filed on Apr. 4, 2022, entitled "Control System User Interface", U.S. Appl. No. 17/712,911.
U.S. Patent Application filed on Apr. 6, 2022, entitled "Hardware Configurable Security, Monitoring and Automation Controller Having Modular Communication Protocol Interfaces", U.S. Appl. No. 17/714,499.
U.S. Patent Application filed on Apr. 14, 2022, entitled "Premises Management Configuration and Control", U.S. Appl. No. 17/659,259.
U.S. Patent Application filed on Apr. 14, 2022, entitled "Premises System Automation", U.S. Appl. No. 17/721,192.
U.S. Patent Application filed on Apr. 18, 2022, entitled "Method and System for Processing Security Event Data", U.S. Appl. No. 17/723,101.
U.S. Patent Application filed on Apr. 22, 2022, entitled "Communication Protocols in Integrated Systems", U.S. Appl. No. 17/727,470.
U.S. Patent Application filed on May 4, 2022, entitled "Premises Management Configuration and Control", U.S. Appl. No. 17/736,408.
U.S. Patent Application filed on May 16, 2022, entitled "Automation System With Mobile Interface", U.S. Appl. No. 17/744,858.
U.S. Patent Application filed on May 23, 2022, entitled "Premise Management Systems and Methods", U.S. Appl. No. 17/664,524.
"Application" The Authoritative Dictionary of IEEE Standard Terms. 7th ed. 2000.
"icon", Newton's Telecom Dictionary, 21st ed., Mar. 2005.
"Modular programming", The Authoritative Dictionary of IEEE Standard Terms. 7th ed. 2000.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
6270 Touch Screen Keypad Notes, Honeywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Associate. Merriaim-Webster.com Dictionary, Merriam-Webster, https://web.archive.org/web/20061209213742/https://www.merriam-webster.com/dictionary/associate. Dec. 9, 2006.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Chapter 6, Securing TCP/IP, pp. 135-164, Oct. 12, 2004.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.

(56) References Cited

OTHER PUBLICATIONS

CorAccess Systems, Companion 6 User Guide, Jun. 17, 2002.
Court action filed for U.S. Pat. Nos. 7,262,690; 7,911,341; 8,073,931; 8,335,842; 8,473,619; 8,478,844 in U.S. District Court, Estern District of Virginia, Case No. 1:13-CV-00834, between *iControl Networks, Inc.* (Plaintiff) vs. *Alarm.com Incorporated et al.* (Defendant) on Jul. 10, 2013.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
Dragging The Authoritative Dictionary of IEEE Standard Terms. 7th ed. 2000, p. 337.
Elwahab et al. ; Device, System and . . . Customer Premises Gateways, Sep. 27, 2001; WO 01/71489.
EP application filed on Jun. 9, 2016, entitled, "Data Model for Flome Automation", 16808247.7.
EP application filed on Aug. 16, 2017, entitled, "Automation System User Interface", 17186497.8.
EP examination report issued in EP08797646.0, dated May 17, 2017, 11 pages.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.
Examination Report under Section 18(3) re for UK Patent Application No. GB0724760.4, dated Jan. 30, 2008.
Examination Report under Section 18(3) re for UK Patent Application No. GB0800040.8, dated Jan. 30, 2008.
Faultline, "AT&T Targets video home security as next broadband market"; Nov. 2, 2006; The Register; 2 Pages.
File, The Authoritative Dictionary of IEEE Standard Terms. 7th ed. 2000, pp. 432.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jan. 13, 2011 for U.S. Appl. No. 12/189,780, filed Aug. 11, 2008.
Final Office Action dated Oct. 17, 2012 for U.S. Appl. No. 12/637,671, filed Dec. 14, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.
Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
Final Office Action dated Feb. 16, 2011 for U.S. Appl. No. 12/019,568, filed Jan. 24, 2008.
International Search Report for Application No. PCT/US13/48324, dated Jan. 14, 2014, 2 pages.
International Search Report for Application No. PCT/US2014/050548, dated Mar. 18, 2015, 4 pages.
J. David Eisenberg, SVG Essentials: Producing Scalable Vector Graphics with XML. O'Reilly & Associates, Inc., Sebastopol, CA 2002.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Lagotek Wireless Flome Automation System, May 2006 [retrieved on Aug. 22, 2012].
Network Working Group, Request for Comments H.Schulzrinne Apr. 1998.
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated Jan. 26, 2012 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.

(56) References Cited

OTHER PUBLICATIONS

Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Non-Final Office Action dated Apr. 13, 2010 for U.S. Appl. No. 11/761,745, filed Jun. 12, 2007.
Non-Final Office Action dated Feb. 21, 2013 for U.S. Appl. No. 12/771,372, filed Apr. 30, 2010.
Non-Final Office Action dated Jan. 5, 2010 for U.S. Appl. No. 12/019,554, filed Jan. 24, 2008.
Non-Final Office Action dated May 23, 2013 for U.S. Appl. No. 13/104,932, filed May 10, 2011.
Non-Final Office Action dated May 23, 2013 for U.S. Appl. No. 13/104,936, filed May 10, 2011.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
Oxford Dictionary, Definition of "application", 2021, 2 pages (Year: 2021).
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
U.S. Patent Application filed on Sep. 28, 2018, entitled "Forming a Security Network Including Integrated Security System Componentsand Network Devices", U.S. Appl. No. 16/147,044.
U.S. Patent Application filed on Sep. 11, 2018, entitled "Premises Management Networking", U.S. Appl. No. 16/128,089.
U.S. Patent Application filed on Oct. 1, 2018, entitled "Integrated Security System With Parallel Processing Architecture", U.S. Appl. No. 16/148,387.
U.S. Patent Application filed on Oct. 1, 2018, entitled "Integrated Security System with Parallel Processing Architecture", U.S. Appl. No. 16/148,411.
U.S. Patent Application filed on Oct. 1, 2018, entitled "User Interface in a Premises Network", U.S. Appl. No. 16/148,572.
U.S. Patent Application filed on Oct. 3, 2018, entitled "Activation of a Home Automation Controller", U.S. Appl. No. 16/150,973.
U.S. Patent Application filed on Oct. 8, 2020, entitled "Communication Protocols in Integrated Systems", U.S. Appl. No. 17/065,841.
U.S. Patent Application filed on Oct. 10, 2018, entitled "Method and System for Providing Alternate Network Access", U.S. Appl. No. 16/156,448.
U.S. Patent Application filed on Oct. 12, 2020, entitled "Integrated Security System With Paralle Processing Architecture", U.S. Appl. No. 17/068,584.
U.S. Patent Application filed on Oct. 13, 2017, entitled "Notification of Event Subsequent to Communication Failure With Security System", U.S. Appl. No. 15/783,858.
U.S. Patent Application filed on Oct. 18, 2018, entitled "Generating Risk Profile Using Data of Home Monitoring and Security System", U.S. Appl. No. 16/164,114.
U.S. Patent Application filed on Oct. 18, 2019, entitled "Wifi-to-Serial Encapsulation in Systems", U.S. Appl. No. 16/656,874.
U.S. Patent Application filed on Oct. 25, 2021, entitled "Forming a Security Network Including Integrated Security System Components and Network Devices", U.S. Appl. No. 17/510,022.
U.S. Patent Application filed on Oct. 27, 2017, entitled "Security System With Networked Touchscreen", U.S. Appl. No. 15/796,421.
U.S. Patent Application filed on Nov. 10, 2020, entitled "Integrated Cloud System for Premises Automation", U.S. Appl. No. 17/094,120.
U.S. Patent Application filed on Nov. 15, 2021, entitled "Communication Protocols in Integrated Systems", U.S. Appl. No. 17/526,915.
U.S. Patent Application filed on Nov. 15, 2021, entitled "Integrated Cloud System With Lightweight Gateway for Premises Automation", U.S. Appl. No. 17/455,005.
U.S. Patent Application filed on Nov. 19, 2019, entitled "Integrated Cloud System With Lightweight Gateway for Premises Automation", U.S. Appl. No. 16/688,717.
U.S. Patent Application filed on Nov. 23, 2021, entitled "Security, Monitoring and Automation Controller Access and Use of Legacy Security Control Panel Information", U.S. Appl. No. 17/534,088.
U.S. Patent Application filed on Nov. 25, 2020, entitled "Premises Management Networking", U.S. Appl. No. 17/105,235.
U.S. Patent Application filed on Nov. 26, 2019, entitled "Communication Protocols Over Internet Protocol (IP) Networks", U.S. Appl. No. 16/696,657.
U.S. Patent Application filed on Nov. 28, 2017, entitled "Forming a Security Network Including Integrated Security System Components", U.S. Appl. No. 15/824,503.
U.S. Patent Application filed on Nov. 29, 2018, entitled "Premise Management Systems and Methods", U.S. Appl. No. 16/204,442.
U.S. Patent Application filed on Nov. 30, 2017, entitled "Controller and Interface for Home Security, Monitoring and Automation Having Customizable Audio Alerts for SMA Events", U.S. Appl. No. 15/828,030.
U.S. Patent Application filed on Dec. 3, 2021, entitled "Communication Protocols in Integrated Systems", U.S. Appl. No. 17/542,302.
U.S. Patent Application filed on Dec. 3, 2021, entitled "Control System User Interface", U.S. Appl. No. 17/457,463.
U.S. Patent Application filed on Dec. 3, 2021, entitled "Method and System for Managing Communication Connectivity", U.S. Appl. No. 17/542,310.
U.S. Patent Application filed on Dec. 9, 2020, entitled "Integrated Security System With Parallel Processing Architecture", U.S. Appl. No. 17/115,936.
U.S. Patent Application filed on Dec. 14, 2018, entitled "Communication Protocols Over Internet Protocol (IP) Networks", U.S. Appl. No. 16/221,299.
U.S. Patent Application filed on Dec. 17, 2021, entitled "Cross-Client Sensor User Interface in an Integrated Security Network", U.S. Appl. No. 17/644,935.
U.S. Patent Application filed on Dec. 23, 2021, entitled "Defining and Implementing Sensor Triggered Response Rules", U.S. Appl. No. 17/645,889.
U.S. Patent Application filed on Dec. 27, 2018, entitled "Communication Protocols in Integrated Systems", U.S. Appl. No. 16/233,913.
U.S. Patent Application filed on Dec. 27, 2019, entitled "Premises Management Systems", U.S. Appl. No. 16/728,608.
Valtchev, D., and I. Frankov. "Service gateway architecture fora smart home." Communications Magazine, IEEE 40.4 (2002): 126-132.
Visitalk, Communication with Vision, http://www.visitalk.jimbo.com; website accessed Jan. 10, 2018.
Wang et al., "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Wilkinson, S: "Logitech Harmony One Universal Remote" Ultimate AV magazine May 2008 (May 2008), XP002597782 Retrieved from the Internet: Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Windows Telecom Dictionary, Mar. 2005, pp. 937-938.
Windows, Newton's Telecom Dictionary, 21st Edition, Mar. 2005, 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.

(56) References Cited

OTHER PUBLICATIONS

Yanni Zhai et al., Design of Smart Home Remote Monitoring System Based on Embedded System, 2011 IEEE 2nd International Conference on Computing, Control and Industrial Engineering, vol. 2, pp. 41-44.
U.S. Patent Application filed on Aug. 3, 2022, entitled "Premises Management Networking", U.S. Appl. No. 17/817,210.
U.S. Patent Application filed on Aug. 11, 2022, entitled "Security Network Integrating Security System and Network Devices", U.S. Appl. No. 17/819,083.
U.S. Patent Application filed on Sep. 22, 2022, entitled "Forming a Security Network Including Integrated Security System Components and Network Devices", U.S. Appl. No. 17/934,443.
U.S. Patent Application filed on Nov. 29, 2022, entitled "Communication Protocols Over Internet Protocol (IP) Networks", U.S. Appl. No. 18/059,604.
U.S. Patent Application filed on Nov. 30, 2022, entitled "Custom Content for Premises Management", U.S. Appl. No. 18/060,374.
U.S. Patent Application filed on Dec. 1, 2022, entitled "Controlling Data Routing in Premises Management Systems", U.S. Appl. No. 18/073,514.
Fujii et al., "Community security platform for individually maintained home computers: The Vigilante Network Project", Proceedings of the 21st IEEE Instrumentation and Measurement Technology Conference, 2004, vol. 2, pp. 891-894.
Kobayashi et al., "Creating worldwide community safety with present technology and privacy protection: The e-JIKEI Network project", Procedia-Social and Behavioral Sciences, 2010, vol. 2, pp. 6-13.
Non-Final Rejection dated Jan. 20, 2023 for U.S. Appl. No. 17/712,911, 8 pages.
Prashyanusorn et al., "Sustainable tourism using security cameras with privacy protecting ability", Journal of Information Security, 2010, vol. 1, pp. 68-73.
U.S. Patent Application filed on Jan. 5, 2023, entitled "Systems and Methods for Device Communication", U.S. Appl. No. 18/150,316.
U.S. Patent Application filed on Jan. 13, 2023, entitled "Communication Protocols in Integrated Systems", U.S. Appl. No. 18/154,590.
U.S. Patent Application filed on Jan. 19, 2023, entitled "Premises Management Configuration and Control", U.S. Appl. No. 18/157,030.
U.S. Patent Application filed on Jan. 24, 2023, entitled "Server-Based Notification of Alarm Event Subsequent to Communication Failure With Armed Security System", U.S. Appl. No. 18/158,876.
U.S. Patent Application filed on Jan. 26, 2023, entitled "System for Data Routing in Networks", U.S. Appl. No. 18/159,869.
U.S. Patent Application filed on Feb. 8, 2023, entitled "Management of a Security System at a Premises", U.S. Appl. No. 18/166,052.
U.S. Patent Application filed on Feb. 8, 2023, entitled "Premises Management Configuration and Control", U.S. Appl. No. 18/166,046.
U.S. Patent Application filed on Feb. 13, 2023, entitled "Premise Management Systems and Methods", U.S. Appl. No. 18/168,314.
X. Li, R. Lu, X. Liang, X. Shen, J. Chen and X. Lin, "Smart community: an internet of things application," in IEEE Communications Magazine, vol. 49, No. 11, pp. 68-75, Nov. 2011, doi: 10.1109/MCOM.2011.6069711. (Year: 2011).

* cited by examiner

MOBILE PREMISES AUTOMATION PLATFORM

CROSS REFERENCE TO RELATED APPLICATIONS

This application is a continuation of U.S. patent application Ser. No. 15/354,380, filed Nov. 17, 2016.

This application claims the benefit of U.S. Patent Application No. 62/256,232, filed Nov. 17, 2015.

This application is a continuation in part application of U.S. patent application Ser. No. 12/189,780, filed Aug. 11, 2008, now abandoned.

This application is a continuation in part application of U.S. patent application Ser. No. 13/531,757, filed Jun. 25, 2012, now abandoned.

This application is a continuation in part application of U.S. patent application Ser. No. 12/197,958, filed Aug. 25, 2008, issued as U.S. Pat. No. 10,721,087 on Jul. 21, 2020.

This application is a continuation in part application of U.S. patent application Ser. No. 13/334,998, filed Dec. 22, 2011, issued as U.S. Pat. No. 9,531,593 on Dec. 27, 2016.

This application is a continuation in part application of U.S. patent application Ser. No. 12/539,537, filed Aug. 11, 2009, issued as U.S. Pat. No. 10,156,959 on Dec. 18, 2018.

This application is a continuation in part application of U.S. patent application Ser. No. 14/645,808, filed Mar. 12, 2015, issued as U.S. Pat. No. 10,127,801 on Nov. 13, 2018.

This application is a continuation in part application of U.S. patent application Ser. No. 13/104,932, filed May 10, 2011, now abandoned.

This application is a continuation in part application of U.S. patent application Ser. No. 13/104,936, filed May 10, 2011, issued as U.S. Pat. No. 10,380,871 on Aug. 13, 2019.

This application is a continuation in part application of U.S. patent application Ser. No. 13/929,568, filed Jun. 27, 2013, issued as U.S. Pat. No. 10,444,964 on Oct. 15, 2019.

This application is a continuation in part application of U.S. patent application Ser. No. 14/704,045, filed May 5, 2015, issued as U.S. Pat. No. 10,365,810 on Jul. 30, 2019.

This application is a continuation in part application of U.S. patent application Ser. No. 14/704,098, filed May 5, 2015, issued as U.S. Pat. No. 10,348,575 on Jul. 9, 2019.

This application is a continuation in part application of U.S. patent application Ser. No. 14/704,127, filed May 5, 2015.

This application is a continuation in part application of U.S. patent application Ser. No. 14/628,651, filed Feb. 23, 2015, issued as U.S. Pat. No. 10,091,014 on Oct. 2, 2018.

This application is a continuation in part application of U.S. patent application Ser. No. 13/718,851, filed Dec. 18, 2012, issued as U.S. Pat. No. 10,156,831 on Dec. 18, 2018.

This application is a continuation in part application of U.S. patent application Ser. No. 12/972,740, filed Dec. 20, 2010, issued as U.S. Pat. No. 9,729,342 on Aug. 8, 2017.

This application is a continuation in part application of U.S. patent application Ser. No. 13/954,553, filed Jul. 30, 2013.

This application is a continuation in part application of U.S. patent application Ser. No. 14/943,162, filed Nov. 17, 2015, issued as U.S. Pat. No. 10,062,245 on Aug. 28, 2018.

This application is a continuation in part application of U.S. patent application Ser. No. 15/177,915, filed Jun. 9, 2016.

This application is a continuation in part application of U.S. patent application Ser. No. 15/196,281, filed Jun. 29, 2016.

This application is a continuation in part application of U.S. patent application Ser. No. 15/198,531, filed Jun. 30, 2016, issued as U.S. Pat. No. 11,190,578 on Nov. 30, 2021.

This application is a continuation in part application of U.S. patent application Ser. No. 15/204,662, filed Jul. 7, 2016, issued as U.S. Pat. No. 10,522,026 on Dec. 31, 2019.

This application is a continuation in part application of U.S. patent application Ser. No. 15/292,866, filed Oct. 13, 2016, now abandoned.

BACKGROUND

There exists a need for systems, devices, and methods that extend the reach and capabilities of premises security and automation systems without requiring large numbers of additional sensors and devices to be added to the systems, and without requiring extensive modifications to the system.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 1 is a reference to FIGS. 1A-1D, collectively.

DETAILED DESCRIPTION

Figure 1A:
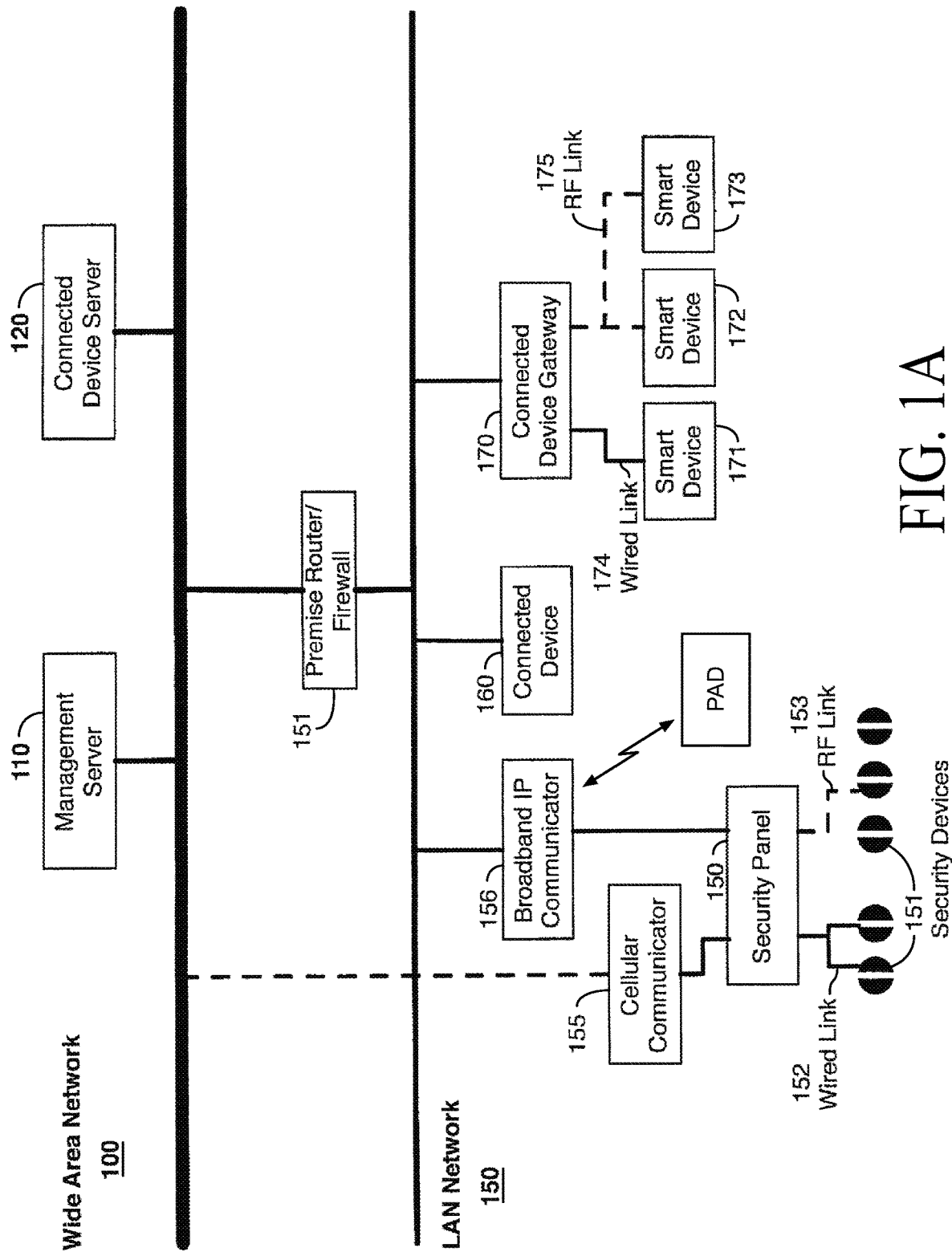
FIG. 1A is a block diagram of a premises automation and security system that includes the premises automation drone (PAD) along with connected devices and security devices and corresponding system components, under an embodiment.

The present invention relates generally to systems and methods for extending the capabilities of a premises automation and security system. More particularly, it relates to systems and methods for providing a mobile premises device or platform configured to autonomously traverse or patrol the premises and capture data (e.g., audio, video, etc.) in response to events and in accordance with rules corresponding to the premises.

A system including a drone or unmanned vehicle configured to perform surveillance of a premises. The drone surveillance includes autonomous navigation and/or remote or optional piloting around the premises. The drone includes a controller coupled to a plurality of sensors configured to collect drone data and security data at the premises, wherein the controller is configured to generate control data for the drone and the premises using the drone data and the security data. A remote device coupled to the drone includes a user interface configured to present the drone data, the security data, and/or the control data.

Although this detailed description contains many specifics for the purposes of illustration, anyone of ordinary skill in the art will appreciate that many variations and alterations to the following details are within the scope of the invention. Thus, the following illustrative embodiments of the invention are set forth without any loss of generality to, and without imposing limitations upon, the claimed invention. Note that whenever the same reference numeral is repeated with respect to different figures, it refers to the corresponding structure in each such figure.

Generally, embodiments include a premises surveillance system comprising a drone. In this example, the premises (e.g., a commercial, industrial, building, facility, interior areas, exterior areas, etc.) includes internal and/or external areas subject to surveillance. The buildings can be of any configuration, including open spaces such as a warehouse, to compartmentalized facilities such as rooms or offices. The surveillance system includes one or more drones and one or more drone stations. As used herein, a "drone" includes unmanned vehicles, unmanned autonomous vehicles, autonomous vehicles, remotely controlled vehicles, autonomous/remotely controlled vehicles, radio-controlled vehicles, and optionally-controlled vehicles, but may not be so limited. The drone may be programmed in advance using weigh points and simultaneously be controlled with a radio control transmitter so that real time manipulation and control of the drone may occur based on particular operation of the drone that is desired.

The system of an embodiment also includes drone stations configured to be bases and/or charging stations for one or more of drones. The system also includes a gateway and/or a server that is in communication with the drones via one or more data or communication networks (e.g., broadband, cellular, WiFi, etc.) as described in detail herein. The gateway/server receives signals from the drones, and the signals include sensor or surveillance data as well as drone data. The gateway of an embodiment includes the drone base station but is not so limited.

The data or communication network of an embodiment includes any combination of wired and/or wireless channels capable of carrying data traffic, and may span multiple carriers, and a wide geography. In one embodiment, the data network includes a broadband network such as the Internet. In another embodiment, the data network may include one or more wireless links, and may include a wireless data network (e.g., WiFi, cellular network, etc.). The network of an embodiment includes additional components (e.g., access points, routers, switches, DSL modems, etc.) interconnecting the server with the data network, but is not so limited.

The drones can carry one or more sensors/detectors comprising numerous different types of sensor/detectors. One example sensor type includes a video camera that captures camera or video data and provides the captured data (e.g., recorded, live, etc.) to the gateway/server. Examples of other types of sensors include microphones to receive or detect audio data. Other sensors can include but are not limited to sensors to capture motion, vibration, pressure, and heat, to name a few, in an appropriate combination to detect a true condition at a facility. The sensors may communicate wirelessly to the gateway/server or communicate through an on-board computer on the drone. In general, sensors capture data (e.g., audio, video, environmental, data of drone systems/subsystems, etc.) and send signals to the gateway/server. Based on the information received from the onboard sensors, the gateway/server determines whether to trigger and/or send alarm messages to the remote server or device.

An example drone of an embodiment includes at least one processor coupled to at least one memory device. The drone also includes one or more sensors and one or more interfaces to receive sensor data from the sensors. The drone also includes propulsion control electronics and one or more electric motors to control one or more drive devices (e.g., propellers, wheels, tracks, rudders, etc.). The drone system electronics are responsive to signals received by the processor from the gateway/server.

When inside of a facility, the drone is guided through corridors or other areas to reach the location of interest under operator control and/or autonomously by following a programmed route and applying guidance processing to allow the drone to follow the pattern, i.e., without an operator at security monitoring station guiding all of the drone movements.

The drone is launched, and as the drone flies the programmed pattern the onboard sensors collect sensor data. The gateway/server and/or a central monitoring station receives signals from various sensors (e.g., camera, microphone, etc.) on the drones. The server applies analytics to the sensor data by comparing for instance, current images captured by the drone at a particular location to stored images previously taken at the same location to detect features in the current images that are different than expected based on the stored images.

In the case where an unacceptable level of feature differences is detected that could be an indication of detected movement of a person or thing, within the field of view of the images, the analytics outputs an indication. In the case where the gateway/server performs the processing, the gateway/server notifies the monitoring station or where the monitor station is performing the processing, monitoring station alerts the operator. The processing upon detection of an unacceptable level of feature differences, modifies the drone navigation pattern. If intrusion is detected by the drone and/or other sensors within a facility, such as a window being opened or a glass break detector or contact switch being asserted on an intrusion detection system, the drone can be immediately guided (e.g., autonomously, by the operator, etc.) to that location providing similar surveillance until the incident is evaluated and handled.

When the drone is in autonomous mode, the modified pattern can be accomplished by the gateway/server producing a new route taking into consideration results of analytics processing, and reprogramming the drone with the new route. Alternatively, the gateway/server can transfer control of the drone to an operator. When the drone is initially under operator control, the analytics produce messages sent to a display (not shown) within view of the operator to assist the operator in guiding the drone and thus apply a new route. The new route can be varied including causing the drone to hold station or position about that location providing continuous video surveillance or data collection back to the monitoring station or to follow a path determined by the analytics processing.

Guidance within or outside of a building can be accomplished by several techniques. For example, when outside of a building, guidance can be accomplished by global position system (GPS) tracking. Alternative techniques include an operator at the monitoring facility manually controlling the drone to a specific location or having the drone hover at the location. Within a building guidance can be accomplished by feature recognition to follow a preprogrammed map of the interior of the building. Another type of navigation is a map based type navigation that includes a database that stores images of landmarks, descriptions of items and navigation instructions. A third type of navigation is by radio frequency (RF) beacons being deployed within the facility, sending out RF signals that a guidance system on board the drone captures and uses to apply a triangulation algorithm to figure out current location. When traversing internal areas of the premises, embodiments use one or more guidance techniques (e.g., RF-based, sonar, optical, beacon, etc.), but are not so limited.

The drone of an embodiment includes collision or crash avoidance systems that are used during tours to detect and record any physical objects that disrupt the ability of the drone to follow a tour route plan. These crash avoidance systems determine proximity to nearby objects and are used with drone navigation to navigate around the object and return to a preprogrammed path or route but are not so limited.

A drone route uses a route plan that includes a navigation map structure that is generated and includes waypoints and paths between a starting waypoint and an ending waypoint. When establishing a route plan, programmable waypoints are placed (e.g., at location points, objects, locations, etc.) along a path determined by the plan that a drone will navigate to in sequential order while using crash avoidance capability to move along safely and intact. The waypoints of an embodiment are stored in onboard memory but are not so limited. In an alternative embodiment, waypoints are stored on the gateway/server and delivered to the drone during operation. The waypoints include small devices that are programmable and include RF transmitter devices (e.g., RFID, beacon, etc.) or low power RF transmitters that continually broadcast its identity and/or placement and which are placed at locations where the asset being protected is located and at all permitted points of entry to the protected area.

The route plan is a predetermine route that is provided to and/or programmed into the drone and defined by the use of the waypoints as described herein. The drone recognizes the existence of the waypoints and determines or calculates the shortest path to and between waypoints. Using crash avoidance while traveling to a waypoint, the route plan is established, recorded, and presented to an operator/user via a graphical user interface. The operator defines a route schedule through the user interface. When conducting the tour, the drone uses crash avoidance to determine and report any deviations from the already determined route plan. The drone captures images of the deviation and reports them as troubles during the premises disarmed period or alarm during the premises armed period.

The drone navigates using the waypoints and processing captured signals from the various waypoints to recognize its current position (e.g. stairs, exits, doors, corridors, etc.) within a facility. The drone stores the route plan that takes into consideration the relevant building or environment. Having this information, the drone correlates captured signals to features in the route plan. By correlating the captured signals to the features in the route plan, the drone can determine its current waypoint, is provided information on that waypoint, and can navigate to a subsequent waypoint based on the route plan. The drone may incorporate the functionality of a compass, GPS, and/or other navigation element or system to assist in navigation. In some implementations, the processing, rather than be performed by the drone, is performed by the gateway and/or the server.

The drone of an embodiment includes a triggered alarm response for responding to abnormal or alarm situations detected in/around the premises. On detecting or receiving any alarm or trouble that is initiated by an interconnected security system or as a result of drone sensors, the drone uses the route plan and crash avoidance to navigate to the waypoint closest to the reported point of protection that triggered the alarm or trouble to capture and transmit video images, sound, and/or environmental data. This data is stored and/or relayed to the command center and/or monitoring center.

The system includes a docking or charging station configured to receive or house the drone and recharge the drone power source as needed. During a surveillance route or tour, the drone will continually make the rounds of this tour or can be programmed to conduct another tour. When the drone is not touring, the drone returns to the drone charging station for recharging of its batteries, or otherwise refueling. Alternatively, the drone receives a signal to return to base. The signal can originate from the operator or the gateway/server, a remote client device, and/or the drone itself, as the drone could be monitoring its fuel supply or level of remaining battery charge.

Drones employed herein are selected according to the type and nature of the premises and/or surveillance. For example, when the drones are employed to hover, a helicopter-type aircraft drone might be preferable. In addition, when deployed outdoors of the premises, the drones in general can be relatively large in comparison to those employed inside the premises. Moreover, a drone employed within a premises that has wide open spaces can be in general larger than one employed in a premises that has many rooms and corridors. In addition, when used exclusively outside the drone can be powered electrically (e.g., fuel cell and/or batteries) or with a hydrocarbon (e.g., gas or gasoline engine), whereas inside the drone should be powered electrically (e.g., fuel cell and/or batteries).

More specifically, FIG. 1A is a block diagram of a premises automation and security system that includes a premises automation drone (PAD) along with connected devices and security devices and corresponding system components, under an embodiment. This connected device system includes the PAD as well as devices (e.g., smart devices, connected devices, security devices, etc.) in communication with a server environment. The system includes a connected device gateway at the premises coupled or connected to one or more smart devices at the premises via wired and/or wireless channels or protocols. A security panel (optional) of a premises security system is coupled to the server environment via a broadband IP communicator and remote network and/or a coupling or connection using a cellular communicator and a cellular or other wireless radio channel. The PAD of this embodiment is configured to communicate (e.g., exchange data, etc.) with components of the server environment via one or more of the broadband communicator, the cellular communicator, and the connected device gateway, as described in detail herein. The PAD of an alternative embodiment is configured to communicate directly with components of the server environment via one or more on-board communication components (e.g., cellular transceiver, etc.), but is not so limited.

Figure 1B:
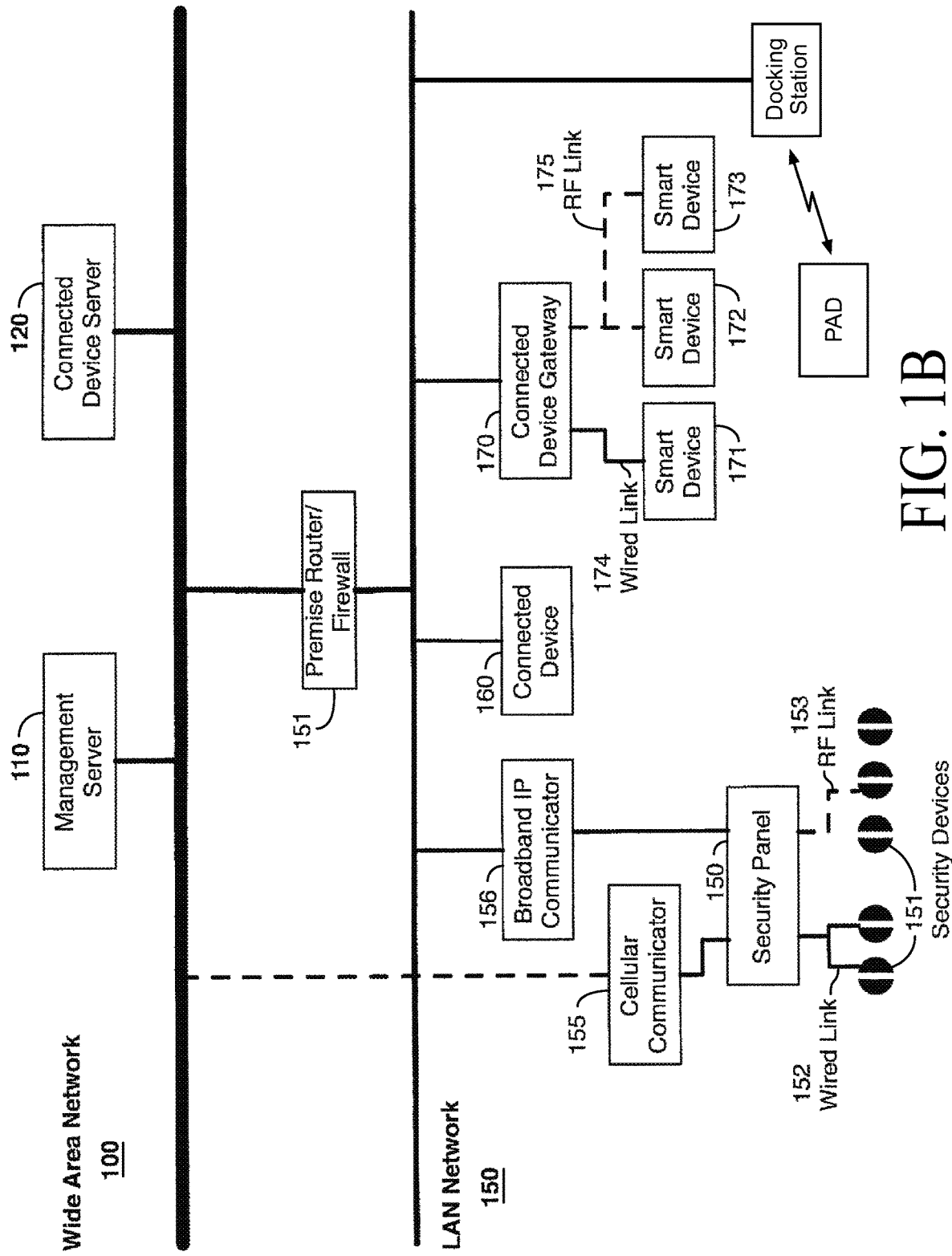
FIG. 1B is a block diagram of a premises automation and security system that includes the premises automation drone (PAD) and corresponding docking station along with connected devices and security devices and corresponding system components, under an embodiment.

FIG. 1B is a block diagram of a premises automation and security system that includes the premises automation drone (PAD) and corresponding docking station along with connected devices and security devices and corresponding system components, under an embodiment. This connected device system includes the PAD as well as devices (e.g., smart devices, connected devices, security devices, etc.) in communication with a server environment. The system includes a connected device gateway at the premises coupled or connected to one or more smart devices at the premises via wired and/or wireless channels or protocols. A security panel of a premises security system is coupled to the server environment via a broadband IP communicator and remote network and/or a coupling or connection using a cellular communicator and a cellular or other wireless radio channel. The PAD of this embodiment is configured to communicate (e.g., exchange data, etc.) with components of the server environment via the docking station or base station, but is not so limited. Similarly, the PAD of this embodiment is configured to communicate with components of the server environment via one or more of the docking station, broadband communicator, the cellular communication, and the connected device gateway, as described in detail herein.

With reference to FIG. 1 (collectively FIGS. 1A-1D) and the Related Applications, the PAD of an alternative embodiment (not shown) is configured as the connected device gateway 170 and includes all components of the connected device gateway 170 so that it is the intermediary between premises smart devices (e.g., smart device 172, 173, etc.) and components of the server environment (e.g., management server 110, connected device server 120, etc.).

With reference to FIG. 1 (collectively FIGS. 1A-1D) and the Related Applications, the PAD of another alternative embodiment (not shown) is configured as the security panel 150 and includes all components of the security panel 150 (e.g., cellular communicator 155, broadband IP communicator 156, etc.) so that it is the intermediary between security devices (e.g., security devices 151, etc.) and components of the server environment.

With reference to FIG. 1 (collectively FIGS. 1A-1D) and the Related Applications, the PAD of yet another alternative embodiment (not shown) is configured as the security panel 150 and the connected device gateway 170 and includes all components of the security panel 150 and the connected device gateway 170 so that it is the intermediary between security devices and premises smart devices and components of the server environment.

Figure 1C:
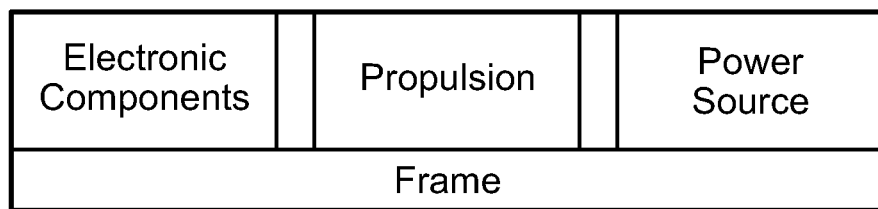
FIG. 1C is a block diagram of a premises automation drone (PAD), under an embodiment.

FIG. 1C is a block diagram of a premises automation drone (PAD), under an embodiment. The term "drone" as used herein includes any vehicle without an on-board human operator. The PAD, which is a mobile premises automation platform or component, provides data for location awareness in and around the host premises. The PAD is configured to be deployable on/in environments including one or more of land, surface, table top, and water, using methods of propulsion that include one or more of rolling, sliding, crawling, walking, flying, swimming, and floating. The PAD of an embodiment includes, but is not limited to, an unmanned aerial vehicles (UAV), a fixed-wing UAVs, rotorcraft, rovers, rolling robots, walking robots, crawling robots, surface vehicles, submersibles, boats, and hovercraft, for example. The PAD may utilize any mode of propulsion as appropriate to the deployment environment, and includes a commercially available drone platform that has been modified to carry specific electronic components as described in detail herein. The PAD described herein is a component of a PAD system that includes cloud-based or server-based components ("server environment"), premises equipment (e.g., gateway, security system, network devices, CPE, etc.), and (optionally) a docking station or base station configured to receive and/or couple to components of the PAD.

The PAD of an embodiment generally includes a frame, electronics components (e.g., communication components, navigation components, sensors, sensor suite, etc.), propulsion, and power source. The PAD can include an electronics case for housing the PAD components, and the electronics case includes a weatherized enclosure. Electronics components within the electronics case may be secured to the electronics case. The frame provides mounting points for attaching components inside and outside of the electronics case.

The PAD as described in detail herein is configured to be autonomous, which includes autonomous or remotely controlled operation as a component of a premises system like a premises automation or security system described in detail herein. When configured as a component of a premises automation or security system (referred to herein as the "automation system"), PAD operation is at least partially under control of automations and schedules in the automation system. The automations and schedules comprise rules executing or running one or more of locally in electronic components of the PAD, in premises equipment, and remotely in components of the server environment, as described in detail herein. In certain embodiments in which the PAD includes the rules engine hosting the rules, the PAD is configured to include the automation system and rules engine so that the PAD is configured as the gateway or virtual hub as described in detail herein. In various alternative embodiments, the rules are distributed among some combination of one or more of the PAD, the premises equipment, and the server environment.

The PAD is configured for autonomous operations in which it is triggered or activated by a system event or schedule, and for remote controlled operations. Operations of the PAD are controlled via a rules engine that is hosted at least one of in the electronic components of the PAD, hosted in premises equipment (e.g., CPE, etc.), hosted in the server environment, and distributed among components of the PAD, the premises equipment (e.g., CPE, etc.), and the server environment, as described in detail herein. The rules engine includes rules for controlling PAD activity (e.g., 'if <type> sensor goes to <state>, and <system state>, then, go <location> and perform <operation>', 'if <time>, then, go <location> and perform <operation>', etc.). Triggering events include for example, but are not limited to, at least one of a pre-specified time, an event detected by premises sensors and/or network devices (e.g., sensor event, door opens, motion, glass breaks, broadband connection fails, etc.), an event detected at on-board PAD sensors and/or network devices (e.g., sensor event, light, motion, sound, heat, etc.), external system data or alerts (e.g., weather alerts, off-premises alert at an adjacent premises, etc.), and the like. In this manner, the rules are configured to associate sensors or triggers with specific locations of the premises, thereby enabling the PAD to deploy to any of these locations in response to a trigger being received.

As an example of the PAD operating under system automations, a premises sensor detects motion, and the PAD is deployed to a location of the sensor to determine the source of motion using the on-board sensor suite. In another example, motion is detected in a family room of the premises while the premises security system is in an "armed away" state, and this motion triggers the PAD to deploy to the family room and pan the room with on-board camera(s) to capture video of the area. In yet another example, the PAD acts as a virtual "watch dog" and automatically deploys to areas of the premises at which activity is detected in order to capture data of the activity. More particularly, a presence is detected (e.g., motion detector, video detector, door chime, etc.) at an exterior door, and this presence triggers the PAD to deploy to the exterior side of the door and stream a live video feed of the area adjacent the door to client devices (e.g., remote client devices, smart phones, local touchscreens, etc.).

In an example under which the PAD has scheduled operation, the PAD is deployed to one or more regions inside/outside of the premises according to a schedule (e.g., at 3 PM every day the PAD is deployed to the back yard and captures video of regions of the back yard; at 10 AM every day the PAD is deployed on a patrol of interior regions of the premises and captures sensor data of the areas of the premises; at 1 PM every day the PAD is deployed to capture images or video in a vicinity of all doors and windows to verify security of the premises; during evening hours the PAD is deployed according to a regular schedule to "patrol" areas outside the premises; etc.). Furthermore, a user can remotely command or control the PAD from a remote client device in order to check on particular activities or areas of the premises (e.g., user takes control of PAD after children return from school to check on activities of children at the premises, etc.).

Generally, PAD deployments involve the PAD being deployed in response to an event detected at the premises and/or in accordance with a scheduled deployment. When deployed, the PAD departs a current location (e.g., from a docking station, from a current deployment, etc.) and traverses a route in/around the premises. The PAD route includes any route to or through an environment accessible by the PAD, and may be one or more of a free-style route dynamically determined by the PAD, a regular route periodically traversed by the PAD in order to gather sensor data in regions of the premises, a specific route designated for a particular purpose, and a route directed from a remote client device. For example, if unexpected activity is detected by a premises sensor, the PAD is dispatched to the vicinity of the detected activity via a programmed route or via autonomous navigation by the PAD.

The PAD uses route information to control deployment operations in/around/through the premises. The route information of an embodiment is received from one or more of on-board components, remote components (e.g., server environment, CPE, etc.), and a remote client device. In various embodiments, the route information may be stored in on-board PAD memory. The route information may be created autonomously or provided by an individual operating the PAD. The route information includes location data of at least one of a destination and a route, and the location information comprises one or more of coordinates, PAD altitude, PAD orientation, PAD velocity, a proximity sensor using active or passive sensors, a beacon technology (e.g. BLE or WiFi beacons), and the like. The PAD navigation system or component uses the route information during the deployment to navigate the PAD along a route and/or to a destination. The PAD on-board components continuously determine the position of the PAD based on route information, premises characteristics detected by on-board sensors, and signals received from external devices or systems.

As an example the PAD determines and/or supplements data of its location based on WiFi signals and/or beacon or senor signals or data at the premises. The PAD is configured to compare the signal strength of one or more WiFi and/or beacon or sensor signals. The signal strength may be indicative of the distance between the PAD and the corresponding WiFi/sensor device. If numerous WIFI and/or sensor devices with known locations are present, the PAD may be able to accurately triangulate its location based only on these external signals. The PAD may also use the external system location data along with other positioning system information to triangulate its position, creating a dataset of location environment that synthesizes data from these various sensors to establish a method of relative navigation.

Data of the external devices or systems in the premises may be used to correct any errors detected in the navigation source information as the PAD traverses the route. For example, this locally-derived location information may be used to determine an offset of the actual location determined from the navigation information provided. The offset when available is then applied by the PAD navigation component (s) to future location information used in PAD navigation.

Data collected by the PAD during deployments in and adjacent to the premises includes at least one of data from all on-board sensors and data from premises sensors and network devices. The PAD is configured to manage collected data, and data management includes storing all or portions of the data locally in on-board memory, live streaming all or portions of the data to at least one of CPE and server environment components, and post-event and/or post-deployment streaming or downloading of all or portions of the data to at least one of CPE and server environment components.

Figure 1D:
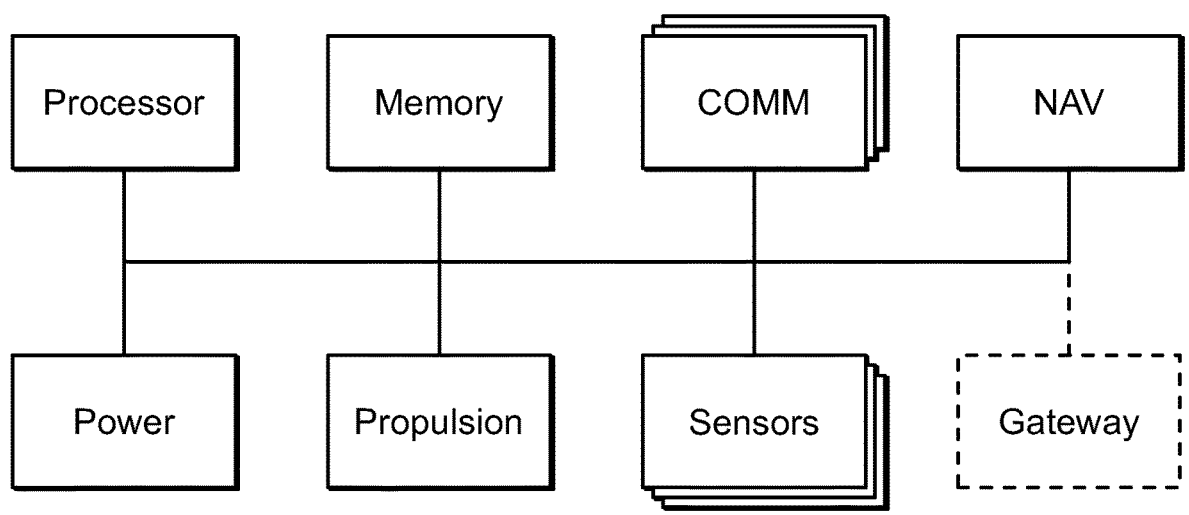
FIG. 1D is a schematic diagram of the electronic components of the PAD, under an embodiment.

FIG. 1D is a schematic diagram of the electronic components of the PAD, under an embodiment. The PAD includes but is not limited to a power source (e.g., battery, etc.), processor, memory, navigation components (e.g., GPS receiver, etc.), communication components, sensor suite, and sensor identification (SID) module, for example. In other embodiments, SID module may be replaced or used in conjunction with other detection and sensing devices, which may include laser scanners, electrical/optical equipment with recognition software, infrared scanners, radar, sonar, an audio/visual device with recognition software, quick response codes, bar code scanners, and/or chemical sensors, for example. The PAD may also include an avoidance or anti-collision system.

The power source is configured to store energy for powering the PAD. In various embodiments, the source is a battery (e.g., lithium-ion battery) but is not so limited. The battery power source may be augmented or replaced by a fuel cell, solar unit, laser powering system, and/or other remote charging methodology. In some embodiments, the battery may be charged using inductive charging methods. Any power source providing sufficient power for the PAD may be used, and it should be appreciated that a power source with a high energy to weight ratio may improve operating time of the PAD.

The PAD processor includes one or more processors and/or coprocessors coupled or connected to electronic components of the PAD and configured to control operation of various systems and computer applications on the PAD. The processor is configured to process data of the PAD and exchange data among on-board and remote PAD components. The processor may receive data from one or more components and format the data for use by at least one other component. The processor comprises a processor architecture that includes at least one of a stand-alone processor, a co-processor, and a shared processor integral with another electronic component, such as, for example, a navigation module or other electronic components.

The PAD on-board memory is configured to store data received or collected by the PAD as well as computer programs or instructions for execution by the processor and/or any component or system of the PAD. In various embodiments, the memory may store deployment or navigation information for an operating environment. The deployment information may include premises maps (e.g., preloaded maps, maps dynamically generated by the PAD, etc.), predetermined routes, restricted areas, and maps or routes corresponding to previous PAD deployments. For example, a PAD operating within a home may use a predetermined route to traverse the entire home efficiently. As another example, in a PAD operating within a back yard of a home, the memory may store a mapping of restricted areas where obstacles make it difficult for the PAD to navigate. As yet another example, a PAD may encounter an object as it traverses an area, and automatically add that object to its mapping algorithm. Alternatively, the PAD may request user input before adding an object to its mapping algorithm, and may request such input by transmitting object information (e.g., location. photo, video, audio, other sensor inputs, etc.) to a local or remote user requesting assistance in classifying the object. In various embodiments, the memory may store any information received by the PAD sensor suite.

The communication component includes one or more of transmitters and receivers appropriate to communication protocols used in operation of the PAD. The communication component can include at least one of cellular, satellite, WiFi, broadband, Internet Protocol (IP), data, voice, proprietary, and other radio-frequency protocols. The communication component can also include mesh and/or repeater protocols.

As an example, the communication component includes a wireless client configured as an IEEE 802.11 wireless client. Any wireless protocol may be used. In various embodiments, IEEE 802.11a, b, g, n, or ac protocols may be used or any other wireless communication protocol. The wireless client may be capable of high-speed handoffs so that wireless client may be in communication with multiple wireless access points during mobile operations of the PAD. Wireless client may use security protocols such as WEP, WPA, WPA2, and 802.11X to secure wireless communications. Filters may be used to limit wireless traffic to prevent interference.

The PAD navigation components include any device or receiver for receiving location signals and determining a location or other information necessary to movements by the PAD. The navigation components can include devices that include at least one of gyroscopes, optics-based devices, (e.g., laser range finder, laser dopler velocimeter, infrared rangers, etc.), filters, map recognition applications, and the like. For example, navigation module may include a GPS receiver for receiving GPS location signals and determining a location. Location data may also be calculated using WiFi triangulation, sensor signal triangulation, NFC positioning, RFID tag positioning, hardwired/physically placed network equipment, and pre-positioned quick response code tags and other sensing media. In various embodiments, navigation module may be integrated with a compass module and a PAD navigation system or coprocessor. Alternatively, processor and memory may perform navigation based on data received from navigation module. The navigation module may receive navigation data from a remote client device, map or navigation data stored in memory, and/or navigation data provided via the wireless client. In various alternative embodiments, navigation module may provide information via a remote client device to a user who remotely controls the PAD via wireless client.

The PAD includes a sensor suite comprising one or more sensors and detectors to gather data in/around the premises during operations by the PAD. The sensor suite includes but is not limited to at least one of motion sensors, acoustic sensors, audio sensors, imaging sensors, video sensors, cameras, infrared sensors, ultraviolet sensors, proximity sensors, environmental sensors, temperature sensors, fire sensors, smoke sensors, carbon monoxide sensors, and moisture sensors.

The premises can include an automation or premises security system comprising a gateway, as described in detail herein. In this premises configuration, the PAD of an embodiment includes the gateway (e.g., gateway, connected device gateway, cloud hub, etc.) in addition to the other components described herein. Furthermore, the PAD of another alternative embodiment is configured as the security panel of the security system and includes all components of the security panel so that it is the intermediary between security devices of the security system and components of the server environment. Additionally, the PAD of another alternative embodiment is configured as the security panel and the premises gateway and includes all components of the security panel and the premises gateway so that it is the intermediary between security devices and premises smart devices and components of the server environment.

The PAD of an embodiment is configured to autonomously navigate the premises using learned, received, and/or programmed route information of premises layout, where the navigation uses one or more of the navigation techniques described herein. The premises layout includes a mapping of the premises, wherein the mapping of an embodiment includes location and sensor data of home automation or security sensors. The PAD is also configured to traverse the premises under remote control via a remote client device.

The PAD of an embodiment includes components configured to target or control PAD deployments to premises areas based on detected events and activity in/around the premises. In so doing, the PAD of an embodiment generates maps of regions of the premises by mapping characteristics of regions of the premises to sensors and network devices in the premises. The maps or premises layout are used, in some embodiments with supplemental navigation and/or sensor information, to guide the PAD to a target adjacent to a sensor or device location, thereby providing PAD targeting based on activity in/around the premises.

A training or calibration route may be established to determine or learn characteristics of the premises and/or sensor presence and location. This route is one or more of delivered to the PAD by a remote operator/user communicating remotely with the PAD, an autonomous route determined by onboard or remote software, and a pre-determined route programmed into the device using either the on-board computing power of the PAD or by a computer communicating with the device via the wireless client. As the PAD traverses the premises, the on-board sensor suite collects data of the premises. The data gathered by the sensor suite is used by one or more of the PAD on-board electronics, components of the server environment, and premises CPE to generate one or more maps of the premises.

The PAD of an embodiment is configured to "learn" layout and characteristics of the premises. In an embodiment, an installer or user trains the PAD. In this mode, the PAD is moved through the premises and "learns" the route used for this training along with characteristics of the route. The characteristics include but are not limited to location, size, shape, doors, windows, openings, lights, stairs, furniture, household objects, obstacles, sensors, trees, limbs, etc. Following training, the PAD is configured to use the learned data to autonomously traverse one or more routes through the premises.

The PAD of an alternative embodiment includes sensors that configure the PAD to dynamically self-learn the premise and calibrate. In this embodiment, the PAD is not required to "learn" the premises under control of a human operator. Instead, the PAD sensor suite (e.g., proximity sensors, etc.) enables the PAD to autonomously navigate in/around the premises in order to self-learn and map the layout and characteristics of the premises. The PAD generates a mapping of the premises during this self-learning phase, and continuously updates and maintains the mapping data using data of subsequent patrol deployments. In essence, data of the premises (e.g., routes, characteristics, etc.) is collected during every operation of the PAD and that data is used to update and maintain the premises "virtual" floor plan used to support the security system and the PAD. Consequently, the PAD is dynamically adaptable to changes in the premises as they occur (e.g., moving furniture, room addition, remodeling, etc.).

The mapping of the premises by the PAD of an embodiment includes the PAD learning or gathering information of premises sensors. Furthermore, the premises map generated is supplemented to include the premises sensor information. Generally, the PAD is configured to determine or assist determination of location based on sensor technologies. For example, the PAD of an embodiment determines location relative to premises sensors using a triangulation technique based on signals and signal characteristics of the premises sensors. As an example, the PAD of an embodiment includes or uses near-field communication (NFC) technology for location awareness. For example, the PAD sensor suite is configured to locate and identify premises sensors using NFC to communicate and/or exchange data with the premises sensors.

In this configuration, the PAD of an embodiment includes or uses sensor identification technology that includes at least one of near-field communication (NFC) technology and radio frequency identification (RFID) technology for location awareness. The sensor suite on-board the PAD is configured to use these technologies to locate and identify premises sensors and to communicate and/or exchange data with the premises sensors.

As an example, a SID module of the PAD is configured to detect or process signals of sensor devices located at the premises. The SID module is configured to read various types of sensor signals. The speed of the PAD as it traverses the premises may be controlled to ensure that SID module is capable of accurately reading sensor signals while in motion. In some embodiments, the SID module may include radar technology capable of sensing direction and distance from given sensor signal(s) to determine the positions of detected tags. The speed of the PAD may be based on the number or density of sensor signals, strength of sensor signals, direction of sensor signals, and distance to sensors.

A spatial identifier may be utilized to determine sensor and/or PAD location. These spatial identifiers may include RFID tags placed at previously determined physical locations to create a grid of known physical data points. Alternative types of input devices (e.g. quick response codes, laser scanner, bar codes, electrical/optical sensors with recognition capabilities) may also provide spatial information in a similar manner. Spatial information may be attached to permanently affixed RFID tags. As such, a network or location grid may be developed to permit the derivation of precise location of the point read.

The SID module is coupled or connected to the PAD on-board wireless client. As SID module reads sensor signals, SID module may send sensor identification information to wireless client for transmission as described in detail herein. In various embodiments, SID module may be configured to read particular data fields from sensor signals and format the read data into packets. If radar technology or other location-detecting sensor is implemented, sensor distance and direction may be used to calculate precise location.

An embodiment includes methods of determining the position and presence of sensors in the premises using data collected by the PAD. As the PAD travels the path, data provided either by navigation module, SID module, wireless data provided by wireless client, by spatial identifiers, or combinations thereof, are used to determine the position and presence of detected sensors in two-dimensional (2D) and three-dimensional (3D) space. Using the training path, spatial data and presence data will be collected, and sensor signal data may be collected. As sensors are detected, the physical location and data of the sensor detected may be stored. As the PAD passes out of range of the first sensors detected and detects the next set of sensors, this data and location information may be stored. As the PAD navigates its route, signals from new sensors may be collected and signals from previously collected sensors will be lost. Software hosted on the PAD and/or elsewhere in the PAD system determines the precise location of the sensors detected. When the sensor is no longer detected, a physical position may be determined. This position may then be identified in the software, stored, and then transferred to corresponding systems as appropriate to the system configuration.

The PAD of an embodiment also captures any location or positioning information (e.g., GPS data, etc.) from the navigation system during the route traversal. The positioning information may be associated with the sensor data collected by the PAD. The positioning information and/or sensor data are processed and used by components of the PAD system to maintain accurate data of the premises and the state of the premises.

Following mapping of the premises, the PAD is configured to autonomously traverse the premises using the premises floor plan and data gathered during PAD training or mapping operations. Alternatively, the PAD is configured to receive programmed routes based on the premises floor plan as described herein.

The PAD components in an embodiment are configured to execute a method of self-calibration that ensures the PAD can successfully perform the elements described herein. This calibration may include configuration and quality checks on the PAD platform, the sensor suite or arrays attached to the platform, the communication systems on the platform, communication linkages, safety systems, power systems, propulsion systems, computing systems, and data transfer. The PAD may be directed to travel to a known calibration point, e.g. a "configuration station", to test its capabilities against a series of known and pre-determined data points. This enables the PAD to calibrate its system against this known information. Status information may be transferred to a maintenance system either on-board the PAD or transferred wirelessly to controlling servers. The PAD may continue its mission if certain system failures permit, else it may be configured to return to a point of origin (e.g., base station) for configuration or repair either manually, programmatically, or autonomously as necessary. If during travel on-board safety systems detect a significant systems error, the PAD may be either instructed to return to point of origin or immediately cease travel in the safest means possible.

The PAD of an embodiment incorporates 'anti-hacking' protection. Anti-hacking protection may include encrypted communications and secure authentication with beacons, sensors, etc. to ensure that false beacons or sensors cannot mislead the PAD. Other anti-hacking protection includes redundant sensor technology and logic to handle attempts to jam, corrupt, or otherwise interfere with sensor/beacon signals. In this embodiment the PAD incorporates logic that detects jamming (e.g., spread-spectrum power in the necessary sensor/beacon frequencies) and treats this event as an attempt to disable the system. In various embodiments, the PAD, security panel, gateway, and/or server logic incorporates algorithms to notify remote servers or monitoring stations in the event of such hacking or jamming.

The PAD electronic components of an embodiment include an output device that is a device configured to provide local communication from the PAD. In an example embodiment, output device may be an audio system. Other examples of an output device include a projector and dispenser. The output device may receive data via the PAD processor and/or wireless client and process the received data to interact with people near the PAD. For example, the PAD may receive or generate premises status messages for occupants within or outside a premises, where the status messages are based on premises sensor data. The messages may include status information, security warnings, and safety warnings, to name a few.

The output device of an embodiment includes one or more actuators configured to manipulate, or cause to be manipulated, physical objects. Example manipulation actions of the PAD include lifting, carrying, moving, opening, closing, pushing, pulling, sweeping, and dispensing, but are not so limited. The manipulation of physical objects includes the PAD automatically manipulating the object, and the PAD manipulating the object in response to remote control signals received from a remote client device.

The PAD system of an embodiment includes a docking or base station as described herein with reference to FIG. 1.

The docking station, which is optional in some configurations, includes a processor running applications and coupled to a memory. The processor is coupled to an electronics suite configured to interface with the PAD, and a power source configured to recharge or power the PAD power source. The power source of an embodiment includes but is not limited to one or more of an alternating current (AC) source, a direct current (DC) source, and a solar powered source, to name a few. The docking station of an embodiment is optionally coupled or connected to the remote network. The docking station of an embodiment is configured as the gateway or virtual hub, and in this configuration transfers data between PAD on-board components and server-based or cloud-based components of the PAD system as described in detail herein.

The PAD system includes server components of the cloud environment or server environment configured to communicate with the PAD, as described herein and with reference to FIG. 1. The PAD system includes network components configured to support PAD operations in a premises and premises automation system. The PAD system includes the PAD operating in/around a premises environment, and coupled to a server or processing system operating in the cloud environment. The premises environment includes interior regions or areas of a premises such as a home or office, and exterior or outdoor regions adjacent a premises, such as a yard or adjacent property or structure.

The PAD system includes a network access point (e.g., wireless, wired, wireless/wired, etc.) to access a remote network and devices remote to the premises. The remote network is coupled or connected to the cloud domain comprising one or more of a remote server or cloud-based computing infrastructure (e.g., automation server, security server, database server, application server, etc.). The cloud environment includes one or more components and/or applications for interaction with the PAD. For example, a component of the cloud environment may receive some subset or all data from components in the premises environment and update components in the cloud environment using the received data. As another example, the cloud environment may receive customer or subscriber information and in response provide instructions or commands to one or more components in the premises environment.

The PAD system includes components of and/or couplings to one or more of an automation or security system, sensors or components of the automation or security system (e.g., security sensors, detectors, RFID tags, IP devices, etc.), and network devices of a local premises network. The PAD is configured to communicate with one or more of the docking station, cloud servers, premises sensors, and premises network devices, to name a few.

As described in detail herein, the network access point includes one or more of a gateway, PAD docking station, premises security system, premises automation system, connected device gateway, and the like. When the PAD system includes a "gateway", the "gateway" includes a standalone gateway or touchscreen as described herein with reference to the integrated automation or security system, a gateway configured as a component of the PAD, and a gateway configured as a component of the docking station. The components and functionality of the gateway are described in detail herein.

The network access point of an embodiment includes a wireless access point in communication with a wireless client located on-board the PAD. The wireless access point includes, for example, IEEE 802.11 wireless protocols, but is not so limited. A wireless protocol may be selected based on the size of the network environment, required data rate, and power needs of the PAD. The wireless access point of an embodiment is a component of one or more other components of the network environment (e.g., gateway, premises automation system, premises security system, etc.). At least a subset of data received via the on-board wireless access point is one or more of processed using the PAD on-board electronics, transferred to the gateway, and transferred to the cloud environment, but is not so limited.

The PAD system includes a remote client device that provides a user or remote operator access to the network. In various embodiments, an operator may interact with the PAD as well as any components of the network environment. For example, remote client device may be used to control the PAD. As further examples, an operator may use remote client device to access and/or monitor any component of the network environment. The remote client device includes at least one of personal computers, smart telephones, tablet computers, mobile devices, and other processing devices.

The PAD of an embodiment is configured to receive control signals from the remote client devices. The control signals of an embodiment control one or more of the PAD, sensors on the PAD, and systems on the PAD, but are not so limited. For example, the premises floor plan is accessed via the remote client device, and selection of an area on the floor plan causes the PAD to automatically be deployed to that area to capture images.

The 'Internet of Things' (IOT) and 'Connected Home' are terms used to describe the growth of devices within a premise that include some form of local intelligence, connectivity to other devices, or connectivity to 'cloud-based services' located remotely from the premises. Some examples of devices included within the existing art include connected or 'smart' thermostats, cameras, door locks, lighting control solutions, security sensors and controllers, HVAC controllers, kitchen appliances, etc.

In the conventional art these devices typically include an IP protocol connection to a server remote to the premise ('in the cloud'). This server often provides remote access and control of the device through mobile apps running on phones or tablets. In some cases the connected devices communicate through this 'cloud' server to other devices through their own servers 'in the cloud'. By way of example, a thermostat in a home can connect to a corresponding cloud server and relay state information to the cloud service of a connected light switch at the same premises. In this way a state change in one device can trigger actions in other devices using the 'cloud relay' mechanism. Further, high bandwidth media applications (e.g., video, voice, etc.) use complex and proprietary approaches or protocols to provide remote access including such processes as router port-forwarding and/or heavy-weight server proxies and protocols.

In contrast, the field of home and small business security is served by technology suppliers providing comprehensive 'closed' security systems in which individual components (e.g., sensors, security panels, keypads, etc.) operate exclusively within the confines of a single-vendor or proprietary solution. For example, a wireless motion sensor provided by vendor A cannot be used with a security panel provided by vendor B. Each vendor typically has developed sophisticated proprietary wireless technologies to enable the installation and management of wireless sensors, with little or no ability for the wireless devices to operate separate from the vendor's homogeneous system. Furthermore, these 'closed' systems are extremely proprietary in their approach to interfacing with either local or wide area standards-based network technologies (e.g., IP networks, etc.). Wireless security technology from providers such as GE Security, Honeywell, and DSC/Tyco are well known in the art, and are examples of this proprietary approach to security systems for home and business.

There is inherent difficulty under this 'closed system' approach in interfacing between the plethora of 'Connected Home' devices and the proprietary home security systems. Home security system vendors use proprietary LAN protocols and proprietary cloud services to manage and interact with security devices in the home. There is no way for a 'cloud connected device' to easily integrate with a security system from any of the proprietary system vendors. Further, it is difficult if not impossible to integrate media into such a proprietary system.

Integration involving a closed system is also difficult due to the complexity and cost of the physical interface between the proprietary security system and the more open 'Connected Home' devices. Because the systems are proprietary, typically additional hardware must be retrofitted to these security systems to enable them to communicate locally with non-proprietary devices. This hardware often requires additional wiring or the incorporation of new wireless technologies (e.g., Wifi, Zigbee, etc.) that must be retrofitted to the extant proprietary security system.

Installation and operational complexities also arise due to functional limitations associated with hardwiring a new component into existing security systems. Further, and no less difficult, is interfacing of a new component(s) with the existing system using RF/wireless technology, because installation, security, and the requirement of new radios in the security system impart additional complexity.

With reference to FIG. 1 (collectively FIGS. 1A, 1B, 1C), the connected device system is configured to include devices (e.g., smart devices, connected devices, security devices, PAD, etc.) at a premises in communication with a server environment, under an embodiment. The system includes a connected device gateway at the premises coupled or connected to one or more smart devices at the premises via wired and/or wireless channels or protocols. The system also includes one or more independent connected devices that are independent of any gateway. The independent connected devices of an embodiment are coupled or connected to a premises local area network (LAN) but are not so limited. A security panel of a premises security system is coupled to the server environment via a coupling or connection to a wide area network (WAN); the coupling to the WAN comprises a coupling or connection to a broadband IP communicator that is coupled to the LAN and/or a coupling or connection using a cellular communicator and a cellular or other wireless radio channel.

The server environment of the connected device system includes one or more of a bridge server, connected device server, and security server, as described in detail herein. Each smart device coupled to the connected device gateway at the premises has a corresponding connected device server but the embodiment is not so limited. Thus, connected device configurations of an embodiment include configurations in which a connected device server is dedicated to each smart device, a connected device server is dedicated to a type of smart device (e.g., first connected device server for sensor devices, second connected device server for automation devices, etc.), a connected device server is dedicated to a type of protocol used by the smart devices (e.g., first connected device server for Z-Wave devices, second connected device server for Zigbee devices, etc.), and/or a connected device server is dedicated to a plurality of smart devices. The connected device server of an embodiment is configured as one or more of a router that routes or directs communications to/from one or more corresponding connected or smart devices, a service provider (e.g., server in the middle) that stores at least a portion of data of smart or connected devices, and a gateway that couples remote devices (e.g., smart phones, tablet computers, personal computers, etc.) to the connected or smart devices.

Applications hosted or running on client devices (e.g., remote devices, iOS devices, Android devices, web browsers, etc.) are configured to communicate with the connected devices, smart devices, connected device gateway, PAD, and/or security system (panel) at the premises through their respective servers. Further, the PAD can stream media (e.g., video, audio, etc.) to the remote devices, receive media from remote devices, and output media if desired (e.g., enable audio output from a remote person to generate sounds or video at the premise, etc.). In this manner, the system of an embodiment is configured to provide control of and access to data of a variety of smart and connected devices at the premises using the client device application synchronized to the smart or connected devices via the cloud-based server environment.

The system of an embodiment generally includes one or more of a cellular radio or broadband 'IP communicator' module that is included as a component of or coupled to the proprietary security system. These communicators have typically served to communicate critical life-safety and intrusion signals to a remote central monitoring station, or to provide remote control of the security system from personal computers, mobile devices, and/or other remote client devices to name a few. The communicators of an embodiment (e.g., whether cellular or broadband-based) are each configured to provide a linkage between the security system and the 'Connected Home' devices through a cloud server-to-server interface.

Figure 2:
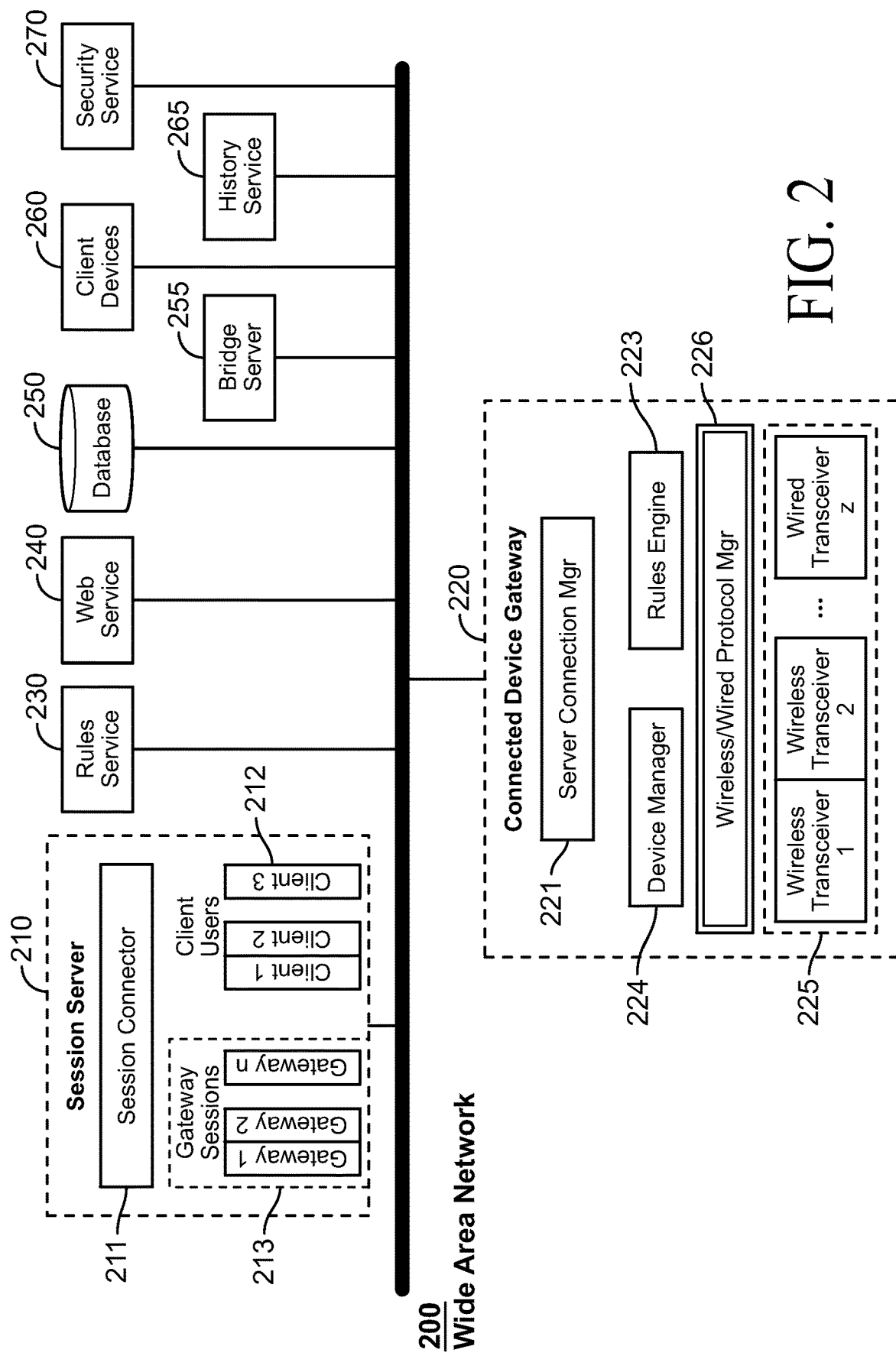
FIG. 2 is a block diagram of a connected device system showing components of the connected device gateway at the premises and the session server in the cloud-based server environment, under an embodiment.

FIG. 2 is a block diagram of a connected device system showing components of the connected device gateway at the premises and the session server in the cloud-based server environment, under an embodiment. The connected device gateway, which is also referred to herein as "Cloud Hub" in some embodiments, comprises a processor that includes or is coupled to one or more logical components that include a server connection manager, a device manager, a rules engine and a communication protocol manager (e.g., wired, wireless, etc.). The communication protocol manager is coupled to the transceivers or radios of the connected device gateway that are configured to communicate with the various connected devices at the premises. The server connection manager is configured to communicate with servers coupled to the WAN, while the device manager is configured to manage communications with devices at the premises.

The system of an embodiment also includes a security panel of a security system coupled to a wide area network (WAN) via a coupling or connection to a broadband IP and/or a cellular communicator (not shown), as described with reference to FIG. 1. Applications hosted or running on client devices (e.g., remote devices, iOS devices, Android devices, web browsers, etc.) are configured to communicate with the connected devices, smart devices, connected device gateway, and/or security system (panel) at the premises through their respective servers.

The server or cloud environment of an embodiment comprises one or more logical components that include a rules service, web service, client devices service, history service, and security service, to name a few. The rules service (e.g., IFTT, etc.) is configured to generate rules for the rules engine, where the new rules complement and/or replace rules hosted or running in the rules engine. The web service is configured to manage web portal communications. The client devices service is configured to manage communications of client device applications. The history service is configured to manage history data associated with components of the system (e.g., client devices, connected devices, gateways, sessions, etc.). The security service is configured to manage communications and/or data of a security panel (system) at the premises that is a component of the cloud system described in detail herein.

The connected device gateway communicates with a session server (cloud router) that comprises gateway sessions, also referred to in embodiments as "Lightweight Gateway (LWGW) instances." The session server with the gateway sessions is configured to manage communications with gateways, client devices, etc. The session server is configured as a communication relay or router (e.g. cloud router) that relays communications between devices; alternatively, the session server is configured to provide a device initiating a communication session with an address (e.g., IP address, etc.) of the target device so that the initiating device and the target device communicate directly without going through the session server. As such, the session server is configured to manage couplings or connections between the communicator module or device and the cloud server.

The server environment of an embodiment also includes a bridge server configured to provide an open communications interface between the smart devices and/or the connected devices and the security system. Any device can be a plugin or a subscriber to the bridge server, but the embodiment is not so limited.

Figure 3:
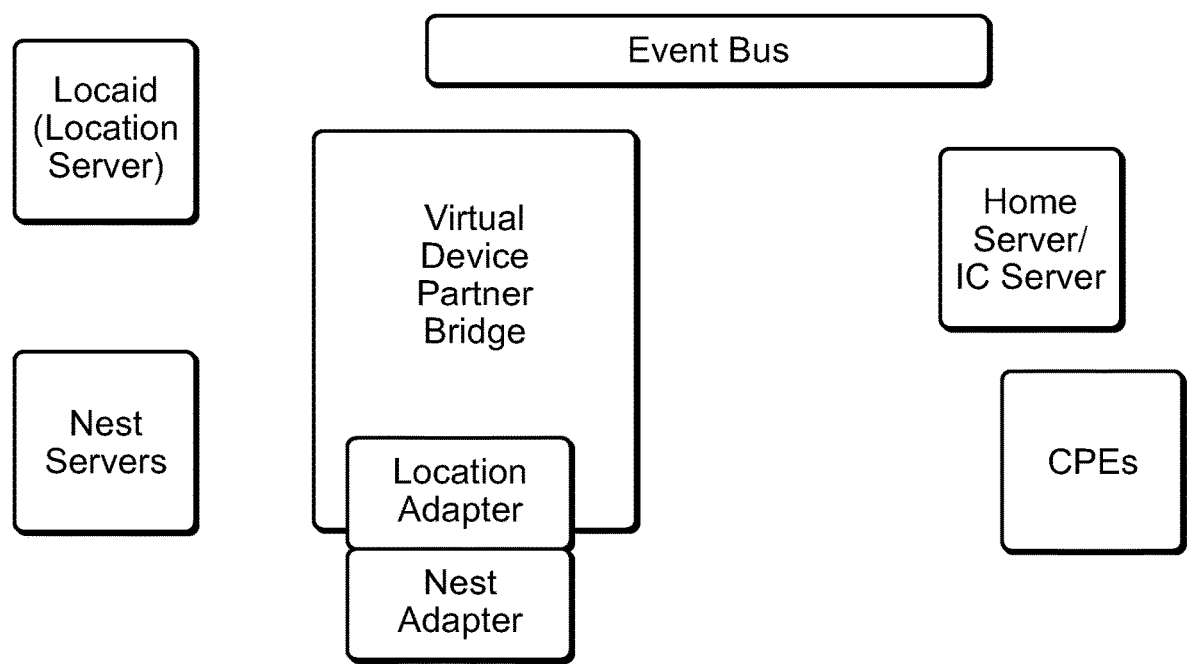
FIG. 3 is a block diagram of an example connected device system including a bridge server, under an embodiment.
Figure 4:
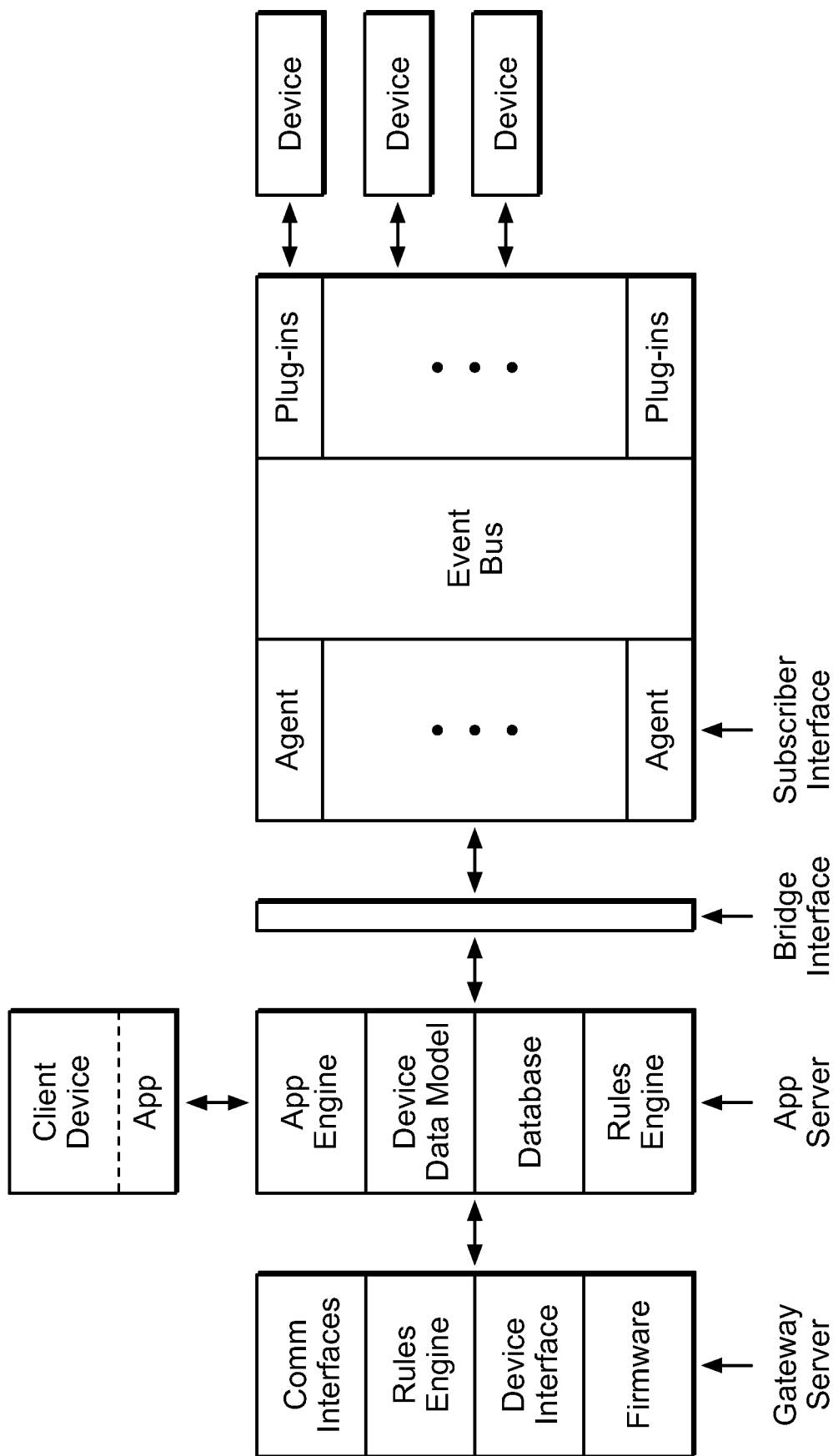
FIG. 4 is a block diagram of a system comprising a bridge server in communication with devices and an application server and gateway server, under an embodiment.

FIG. 3 is a block diagram of an example connected device system including a bridge server, under an embodiment. FIG. 4 is a block diagram of a system comprising a bridge server in communication with devices and an application server and gateway server, under an embodiment. With reference to these figures, the bridge server includes an event bus (e.g., bidirectional event bus) coupled to a set of device-specific plugins (e.g., location adapter, Nest adapter, etc.) that each corresponds to a particular device or type of device. Each plugin comprises code written to an API that corresponds to that device. Each plugin puts events for its corresponding device onto the event bus (e.g., Nest thermostat, change temperature, etc.) and receives data via the event bus. The plugins of an embodiment include but are not limited to an API plugin, a UI plugin, and a card UI.

The bridge server includes a subscriber interface coupled to the event bus, and the subscriber interface comprises one or more user agents or agents. The agent(s) of the subscriber interface pulls events or event data from the event bus and transfers them to another component or application as described herein. The subscriber interface also puts events onto the event bus for transfer to the device-specific plugins.

The subscriber interface is coupled to an application ("app") server (e.g., Location server, Nest servers, etc.) via a bridge interface. The app server includes one or more components that comprise one or more of an app engine, a rules engine, a device data model, and a database. The app engine serves events to a corresponding app and/or receives data from the corresponding app. The rules engine includes rules that are executed in response to event data. The device data model, also referred to as a virtual device, is a device data definition or logical model. The database stores records that include event data and corresponding data or information. The components of the app server communicate with a gateway server that manages components (e.g., firmware, devices, rules engine, communication interface(s), etc.) of a gateway at the premises.

As an example, a user has a Nest thermostat in her home, and when the temperature changes at the thermostat then the thermostat puts an event on the event bus indicating the temperature change. The event includes a unique identifier of the thermostat, and a user agent of the bridge server is listening for the identifier. The user agent, when it identifies an event having an identifier for which it is listening, pulls the event with the particular identifier from the event bus. Data of the event when pulled from the event bus can, for example, be stored in a database, and also checked for correlation to any rule running under the rules engine and, if a correlation is identified, then the data causes the rule to execute.

The rules engine is configured to enable end users or system providers to establish linkages between information or data of device state changes ('triggers') and the control of other devices ('actions'). The rules engine is configured, for example, to control the state of a smart (connected) device (e.g. a thermostat or door lock) in response to a state change of a corresponding connected system (e.g., the security system). As another example, the rules engine controls the state of the security system (e.g., disarm security system ('action')) in response to a state change in a connected device (e.g., unlocking of a door ('trigger')). The rules engine also controls the state of a LAN device (e.g., a Z-Wave thermostat) by determining a state change of the security system and relaying the desired Connected Device state to the intermediate Cloud Hub for processing.

The rules engine of an embodiment runs or executes at least one of remotely on a cloud-based server (e.g., Rules Service, etc.), locally on consumer premises equipment (CPE) or a premises device (e.g., the Cloud Hub, etc.), and in some distributed combination of devices of the system. The rules engine is configured to store and run at least a portion of the rules locally at the premises in the Cloud Hub or other local CPE. The rules engine of an alternative embodiment is configured to store the rules in a remote server that is located remote to the premises in the server or cloud environment. The rules engine of another alternative embodiment is configured to distribute storage and execution of the rules between local CPE and remote server(s) for redundancy or to provide more timely operation.

The premises devices and systems operate according to rules running on a rules engine at the premises (CPE) and/or in the cloud. Generally, a system configuration includes rules executed on a server in the cloud to support interactions between two or more premises devices (e.g., an event of a first device triggers an action on a second device via one or more rules, etc.). Furthermore, a system configuration includes rules running locally at the premises (e.g., CPE) to support interactions with other devices at the premises via direct interactions when information is not required from a third party or remote server or system in order to effect the interaction.

Additionally, rules running locally at the premises (e.g., CPE) and at a cloud-based server control interaction under an embodiment. For example, a door opens at the premises causing a sensor signal to be sent to the security panel, and the security panel in turn provides notification of the sensor event to a gateway. Rule(s) running at the gateway cause the gateway to issue a request to a cloud-based server for an action by a particular connected device (e.g., camera device at the premises, camera device at a different premises, etc.). Rule(s) running at the server generate a command or control signal to perform the action and send the command to the particular connected device. The particular connected device includes, for example, another device at the premises (e.g. camera in the premises, etc.) and/or a device at a difference premises (e.g., initiate an alarm at a first house if a door is opened at a second house). Optionally, an acknowledgement is generated or issued by the connected device upon completion of the requested action.

The system described herein provides a cloud interface to connected premises (e.g., home, office, etc.) devices and systems. For example, a system includes one or more on-premise devices coupled to a premises security system, and a smart device (e.g., Nest thermostat, etc.) is integrated at the premises through the cloud to the premises system that includes the premises devices and security system.

As a more particular example, the premises includes a security panel and security devices communicating with the cloud ("server environment") via a broadband IP module, cellular communicator, and/or a gateway. The premises includes a second device (e.g., Z-Wave controller, etc.) that provides or creates a local device network (e.g., Z-Wave, Zigbee, WiFi, WPS, etc.) coupled or connected to the premises LAN. The premises of this example includes a third device (e.g., one or more Dropcams, etc.) comprising a WiFi client communicating with the cloud. Under the configurations described herein, two or more premises devices are coupled at the premises via a connected device gateway and/or at the cloud via a server interface, but are not so limited. Each of the premises devices (e.g., smart devices, connected devices, security devices, etc.), regardless of device type or protocol, is integrated into the system through pushbutton enrollment.

The system of an alternative embodiment includes a gateway device located at the premises. The gateway device is configured to provide a plurality of network interfaces that include, but are not limited to, one or more LAN interfaces for communicating with devices within the premise (e.g., Z-Wave, Wifi, Zigbee, etc.), and a WAN interface for communicating with the Session Server. In this 'Cloud Hub' embodiment the gateway is not required to provide a local area coupling or connection between the Connected Home devices and the security system because this connection is provided by/through the cloud interface.

Figure 5:
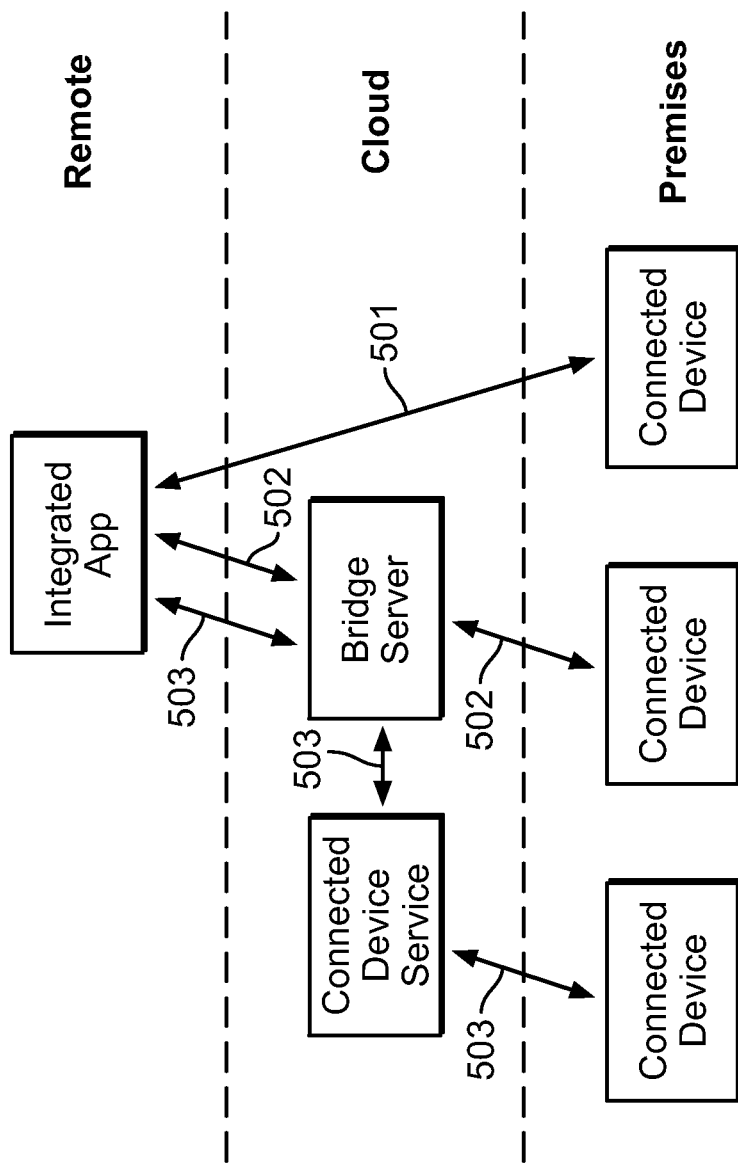
FIG. 5 is an example connected device flow diagram, under an embodiment.

The embodiments of the connected premises systems described herein include numerous operational flows, but are not so limited. FIG. 5 is an example connected device flow diagram, under an embodiment. This example includes three connected devices (e.g., thermostat, camera, smart lock), each of which corresponds to a third party server and control application for accessing and controlling the respective device. In addition to the three connected devices in the premises, the system of this example includes a cloud-based connected device server and bridge server, and an integrated or combined device application hosted on a remote client device. The integrated device application is configured to provide integrated access to the three connected devices but is not so limited. The bridge server is configured to aggregate (e.g., using APIs) interfaces to the three third party servers of the device providers and enables communication between the bridge server and these third party servers. The bridge server is configured to communicate directly with one or more of the connected devices and to communicate with the connected devices through the connected device server.

The combined device application provided in an embodiment is an application hosted on a client device (e.g., downloaded to the client device, installed on the client device, etc.) that includes the capabilities of the individual control applications of the respective connected devices. In an embodiment, the combined application is configured to communicate 501 directly with the corresponding connected device(s) (e.g., using information from the bridge server and/or connected device server). In an alternative embodiment, the combined application is configured to communicate 502 with the corresponding device(s) through the bridge server, which communicates with the third party server corresponding to the respective device(s). In another alternative embodiment, the combined application is configured to communicate 503 with the corresponding connected device(s) through the bridge server and the connected device server.

Figure 6:
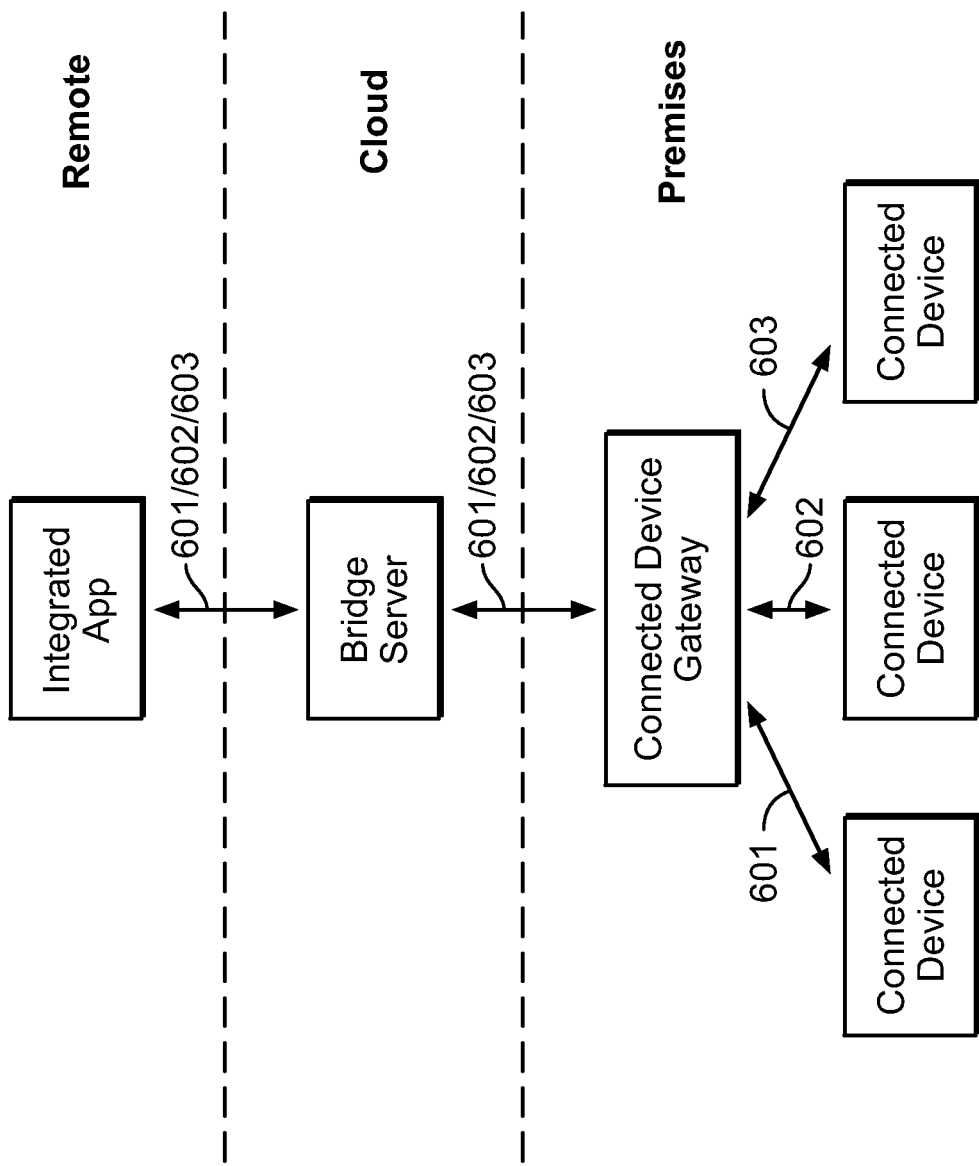
FIG. 6 is another example connected device flow diagram, under an embodiment.

FIG. 6 is another example connected device flow diagram, under an embodiment. This example includes three connected devices (e.g., thermostat, camera, smart lock), each of which corresponds to a third party server and control application for accessing and controlling the respective device. The three connected devices are coupled to a connected device gateway in the premises as described in detail herein. In addition to the three connected devices in the premises, the system of this example includes a cloud-based bridge server. The bridge server is configured to aggregate (e.g., using APIs) interfaces to the three third party servers of the device providers and enables communication between the bridge server and these third party servers. The bridge server is configured to communicate with the connected devices through the connected device server.

The system of this example includes an integrated or combined device application hosted on a remote client device to provide integrated access to the three connected devices. In an embodiment, the combined application communicates 601/602/603 with the corresponding device(s) through the bridge server, which communicates 601/602/603 directly with the connected device gateway at the premises. Additionally, the connected device gateway is configured to synchronize between connected devices at the local premises and connected devices at a remote premises.

Figure 7:
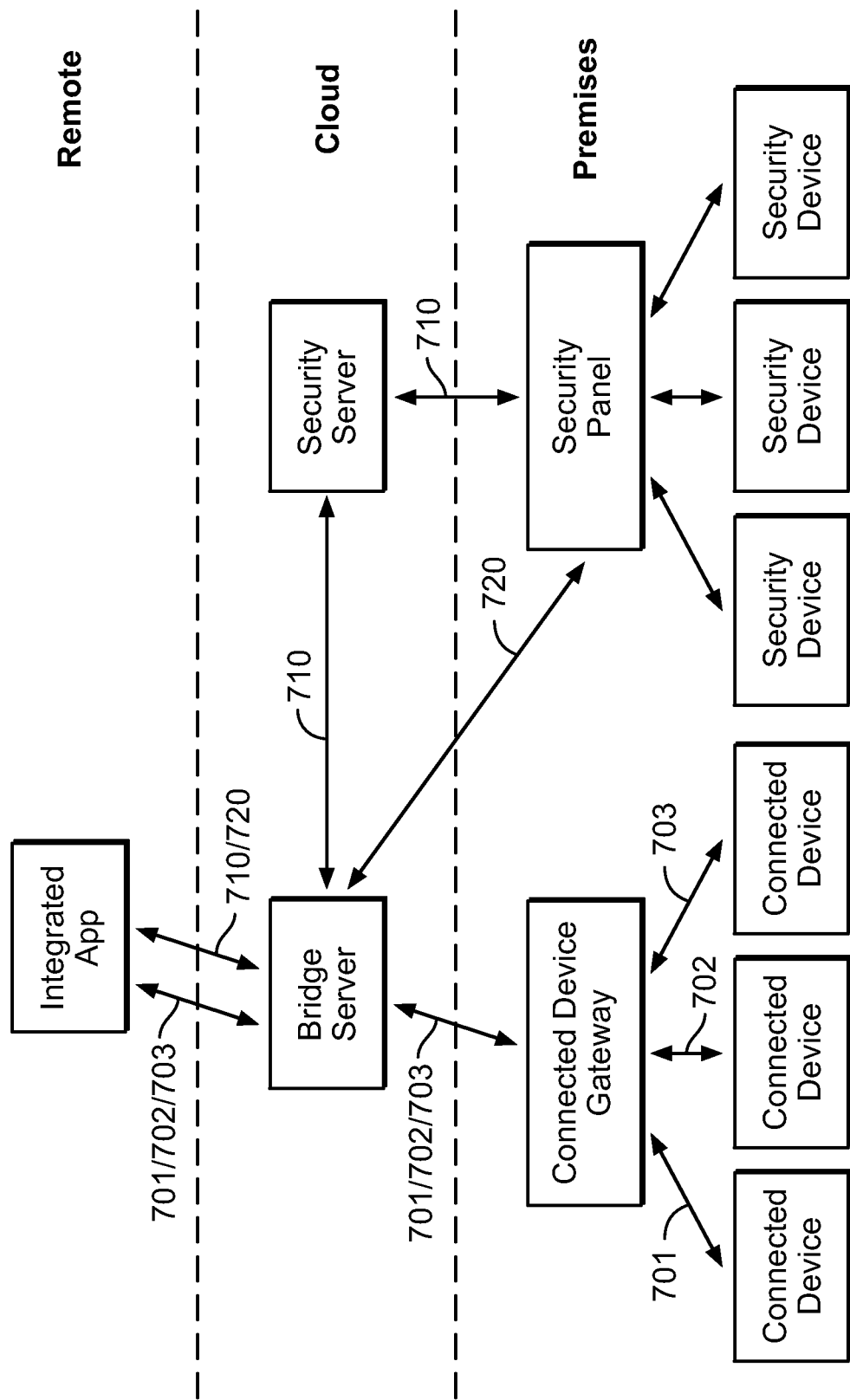
FIG. 7 is yet another example connected device flow diagram, under an embodiment.

FIG. 7 is yet another example connected device flow diagram, under an embodiment. This example includes three connected devices (e.g., thermostat, camera, smart lock), each of which corresponds to a third party server and control application for accessing and controlling the respective device. The three connected devices are coupled to a connected device gateway in the premises as described in detail herein. In addition to the three connected devices in the premises, the system of this example includes a cloud-based bridge server. The bridge server is configured to aggregate (e.g., using APIs) interfaces to the three third party servers of the device providers and enables communication between the bridge server and these third party servers. The bridge server is configured to communicate with the connected devices through the connected device server.

The system of this example also includes three security devices (e.g., door sensor, window sensor, motion detector) coupled to a security panel at the premises. The local security panel communicates with a cloud-based security server. The bridge server of an embodiment communicates with the security panel via the security server. Alternatively, the bridge server communicates directly with the security panel as it does with the connected device gateway, and integrates the interfaces of the connected device providers and the security system provider, but is not so limited.

The system of this example includes an integrated or combined device application hosted on a remote client device and configured to provide integrated access to the three connected devices and the security panel. In an embodiment, the combined application communicates 701/702/703 with the connected device(s) via the bridge server and the connected device gateway at the premises, and communicates 710 with the security devices via the bridge server, the security server, and the security panel. Alternatively, the combined application communicates 720 with the security devices via the bridge server and the security panel.

The connected device gateway is configured to synchronize between connected devices at the local premises and connected devices at a remote premises. Similarly, the security panel is configured to synchronize between security devices at the local premises and security devices at a remote premises.

A process flow of an embodiment for interaction between the integrated app and a connected device comprises but is not limited to the following: an event is commanded at the app for a connected device (e.g., temperature increase commanded three increments); the event is posted to the device data model at the app server; the device data model posts data representing the event on the bridge interface of the bridge server; the bridge interface posts data representing the event onto the event bus; the connected device (e.g., thermostat) plugin, which is listening for events that correspond to the device, pulls the event data from event bus and passes the event (command) data to the corresponding connected device; the event (command) data causes a corresponding change at the connected device (e.g., temperature raised three degrees on thermostat).

A process flow of an embodiment for interactions among connected devices resulting from a state change at a connected device comprises but is not limited to the following: an event is detected at a connected device (e.g., temperature rises 5 degrees to 72 degrees); the device puts data of the event on the event bus of the bridge server via the corresponding device plugin; an agent or listener subscribed to the connected device pulls data of the event from event bus and transfers the data to the app server; app engine of app server posts the event to the corresponding app, and posts the event data in the database; app engine posts the event data to the rules engine because the rules engine, which includes a rule that corresponds to the event (e.g., if temperature rises above 70 degrees, turn on lamp in den); rules engine executes the rule and sends a message to the gateway server to carry out the action (e.g., turn on lamp in den) or, alternatively, the rules engine passes the event data to the gateway server, which executes the rule for the connected device (lamp).

A process flow of an embodiment for interactions among connected devices resulting from a state change at a security sensor comprises but is not limited to the following: an event is detected at a sensor; sensor event data received from the sensor and processed at the security panel; the processed sensor event data is transmitted to the security server where it is stored; the security server posts information representing the sensor event data via an API; the security server communicates the sensor event to the bridge server via a security system plugin; an agent or listener subscribed to the security system pulls data of the event from the event bus and transfers the data to the app server via the bridge interface; app engine of app server posts the event to the corresponding app, and posts the event data in the database; app engine posts the event data to the rules engine, which includes a rule that corresponds to the event (e.g., if door sensor state change, record video at door camera); rules engine executes the rule and sends a message to the gateway server to carry out the action (e.g., activate door camera) or, alternatively, the rules engine passes the event data to the gateway server, which executes the rule for the connected device (camera).

Embodiments include pushbutton enrollment of devices (e.g., smart devices, connected devices, security devices, etc.) into the premises environment using one or more technologies. In an embodiment, the device is triggered to initiate an enrollment routine or process that enrolls the smart device into the premises environment via one or more of the premises components described herein (e.g. connected devices, smart devices, gateways, security devices, etc.). Device enrollment causes the enrolling device to update the system as to the state of currently installed devices via the coupling to the sever environment. When a device is added to the system, the system automatically recognizes the device in the system and populates the device throughout the system. Similarly, when a device is removed from the system, the system removes the device throughout the system.

More particularly, a process flow of an embodiment for enrolling and accessing connected or smart devices comprises but is not limited to the following: bridge server identifies supported device(s); bridge server locates supported device(s) on local network or prompts user for added device(s); bridge server authenticates or validates device(s); validated device(s) is added to the integrated or combined app for control and/or rules; generic device-specific interface is presented to user (e.g., generic thermostat interface), and/or customized device-specific interface is presented to user, and/or launch third party UI for device.

A process flow of an alternative embodiment for enrolling and accessing connected or smart devices comprises but is not limited to the following: bridge server identifies supported device(s); identified device(s) added to the system; added device(s) connects to connected device server and corresponding connected device app; integrated app is downloaded, downloaded app identifies devices to be bridged (keys, login credentials) and authenticates or validates device(s); validated device(s) is added to the app for control and/or rules; generic device-specific interface is presented to user (e.g., generic thermostat interface), and/or customized device-specific interface is presented to user, and/or launch third party UI for device.

The embodiments described in detail herein provide the Cloud Hub as a low-cost solution for home automation, which can be added to an existing site (e.g., Tier-1 site). The Cloud Hub device of the embodiments, as a component of the consumer premises equipment (CPE), couples or connects to a broadband connection at the host premises and is configured as a gateway for devices (e.g., cameras, sensors, Z-Wave, Zigbee, etc.) located or installed at the premises. More particularly, the Cloud Hub is a multi-purpose device access point configured to enable full home automation. The Cloud Hub is configured to enable premises devices (e.g., cameras, sensors, Z-Wave, Zigbee, etc.) for sites that do not currently support these devices, and/or provide a "sandbox" for Direct Cameras, but is not so limited.

The Cloud Hub of an embodiment is configured to communicate with a Lightweight Gateway (LWGW) that includes a corresponding server-side abstraction with which it interacts or communicates. In an embodiment this device class interacts with the server and the actual Cloud Hub device in much the same way that a RISSecurityPanel (e.g., server-side module that receives state change events from a security panel and is able to communicate directory with the panel in order to control (arm/disarm) or configure (add/remove security sensors the panel) class interacts, as described in detail herein. As such, an embodiment re-factors the common code out of the RISSecurityPanel into a class capable of use by both the RISSecurityPanel and the Cloud Hub device. A new device definition is provided for this type of device, along with various changes to the StandardGateway class to control and manage the additional communication channel with the new device.

The Session Server of an embodiment is configured to use a gateway registry service to route incoming UDP packets from the CPE to the proper LWGW instance via a one to one mapping of CPE-unique IDs to site IDs. With the addition of the Cloud Hub, a second CPE-unique ID is used which is mapped to the same LWGW instance as the primary SMA client's CPE-unique ID. To accomplish this the Device Registry service is leveraged, and this registry maintains a mapping of CPE ID and device type to site ID. The session server is configured to use this Device Registry to properly route income packets but is not so limited.

Figure 8:
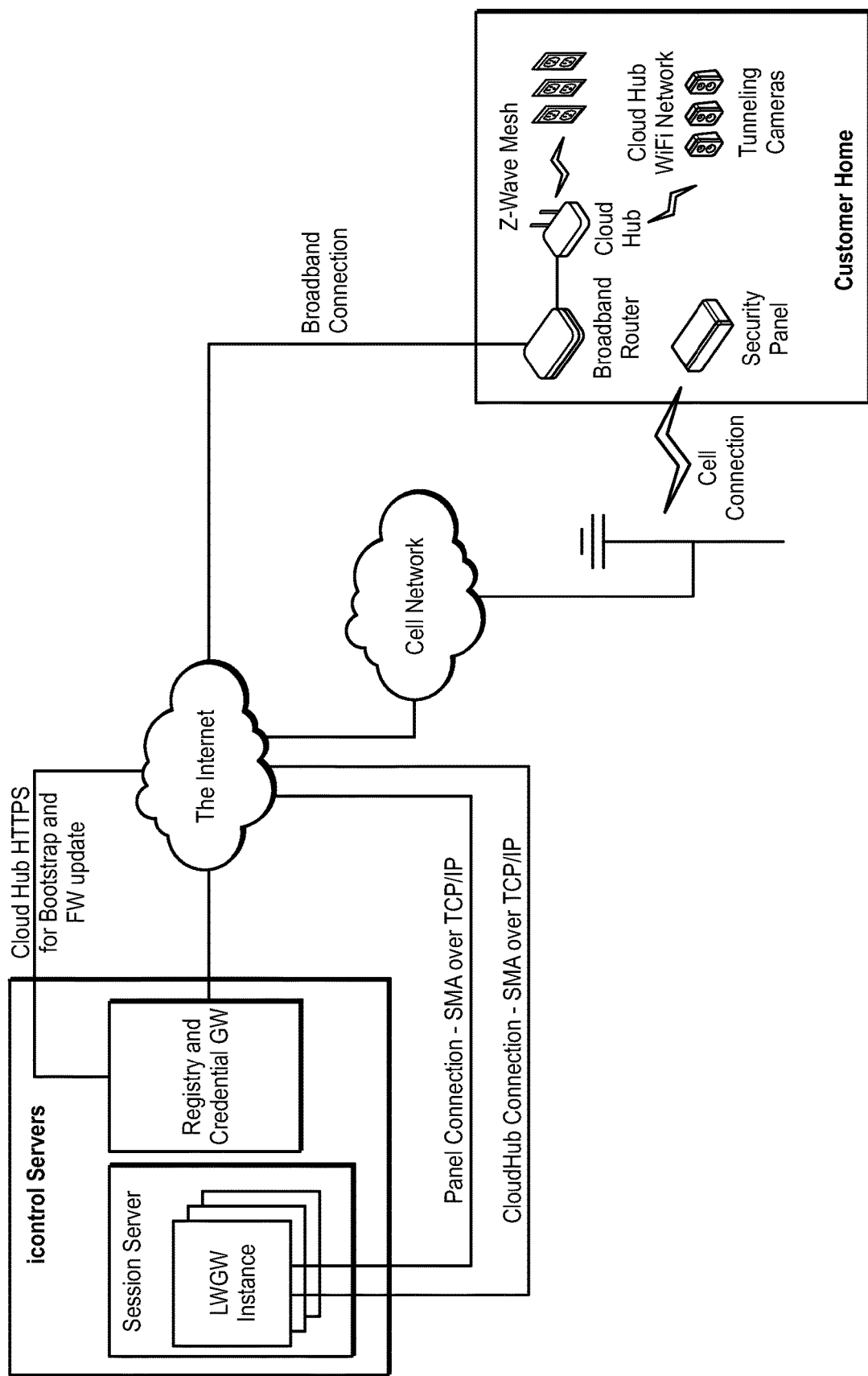
FIG. 8 is a block diagram of a system including the Cloud Hub, under an embodiment.

FIG. 8 is a block diagram of a system including the Cloud Hub, under an embodiment. The system configuration includes a Cloud Hub coupled to a wide area network (WAN) at the premises. The iControl servers include a session server and one or more LWGW instances, and a registry and credential gateway, as described in detail herein. The device installation and bootstrap mechanism is configured to one or more of associate the Cloud Hub device with an existing site, and securely deliver SMA communication configuration, including master key, SMA server address, and network ports, but is not so limited.

Figure 9:
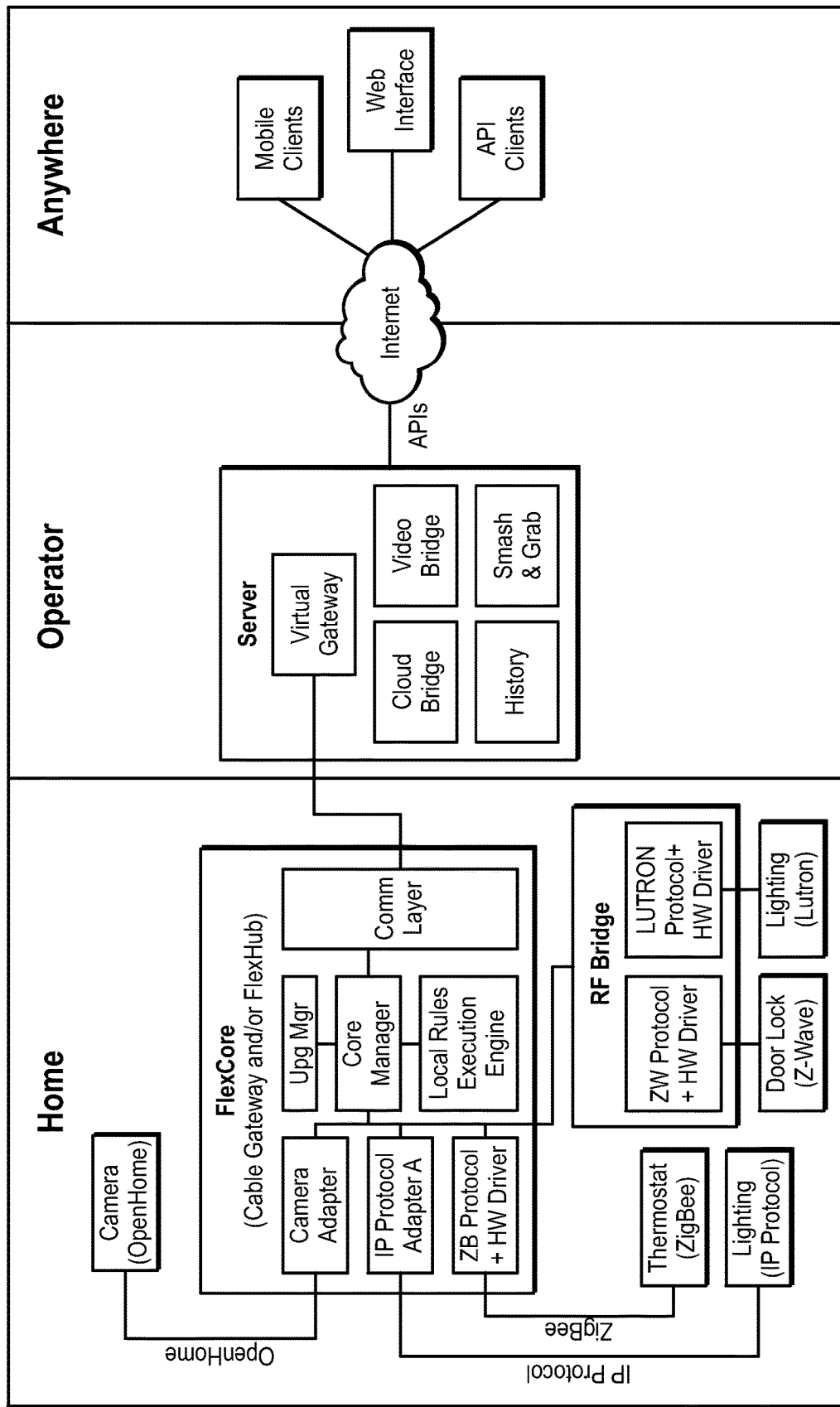
FIG. 9 is a block diagram of a system including a Cloud Hub and Virtual Gateway showing the premises, service provider, and mobile environments, under an embodiment.

FIG. 9 is a block diagram of a system including a Cloud Hub and Virtual Gateway showing the premises, service provider, and mobile environments, under an embodiment. The system of an embodiment includes the gateway (Cloud Hub) in the premises (e.g., home, office, etc.), and the gateway is coupled to a LWGW in the operator (server/cloud) domain. The gateway includes one or more of a camera adapter to integrate premises cameras, an IP adapter to integrate premises IP devices, and a ZigBee protocol and hardware driver to integrate premises ZigBee devices. Components of the gateway of an embodiment are coupled to a radio frequency (RF) bridge as appropriate to a configuration of devices in the premises, and the RF bridge integrates additional premises devices (e.g., Z-Wave devices, proprietary devices, etc.) into the system.

The LWGW and cloud-based infrastructure of an embodiment uses an existing service provider infrastructure, security, performance, and APIs, along with system components that are separated into modules executed on distributed in-premises systesms. The LWGW and cloud-based infrastructure includes a pluggable architecture that enables new device protocols and RF technologies to be added without the need to overhaul the core infrastructure. Use of a relatively small memory footprint on the CPE enables the infrastructure to execute on many devices, and this refactoring of local versus cloud services provides a virtual device (e.g., Internet of Things (TOT), etc.) gateway service that pushes as much as possible to the cloud while maintaining local performance and offline capabilities.

The LWGW included in an embodiment is configured as the server-side abstraction for the Cloud Hub. The LWGW is subordinate to the gateway object, and interacts with the server and the Cloud Hub device in much the same way that a RISSecurityPanel class does. As such, an embodiment re-factors the common code out of RISSecurityPanel into a class that both RISSecurityPanel and the Cloud Hub device can use. A new device definition is created for this type of device, and various changes to the StandardGateway class to control and manage the additional communication channel with the new device.

The Session Server configuration uses a gateway registry service to route incoming UDP packets from the CPE to the proper LWGW instance via a one-to-one mapping of CPE-unique IDs to site IDs. With the addition of the Cloud Hub, a second CPE-unique ID is mapped to the same LWGW instance as the primary SMA client's CPE-unique ID. This is accomplished by leveraging the Device Registry, which maintains a mapping of CPE ID and device type to site ID. Further, the session server is modified to use this Device Registry to properly route income packets.

Regarding client application software or applications, the clients include UX additions to present the new Cloud Hub device. When the Cloud Hub is present, UX flow will potentially be different. For example, on a Cloud Hub system, Z-Wave devices are not added until the Cloud Hub is added. Also, deleting the Cloud Hub includes deleting the associated Z-Wave devices, and this uses special UX messaging. The activation app and the installer app will also need new flows for installing and managing these devices.

The Cloud Hub Firmware of an example embodiment includes but is not limited to the following components: SMA Client: an always-on (i.e., always-TCP-connected) SMA client, supporting AES-256 encryption; ezwLib: port of the Icontrol embedded Z-Wave stack; Bootstrap Client for secure bootstrap of the master key, and then secure provisioning of the SMA Server connection information and initialization information; LED Driver to drive CPE LED that displays Server connectivity and Z-Wave status (CPE-dependent); Firmware Update Logic for fault-tolerant updates of the full CPE image (CPE-dependent); detailed/tunable error logging; Reset To Factory Default Logic for factory-default Z-Wave (erase node cache and security keys), WiFi (disable sandbox, reset SSID/PSK; CPE-dependent), and de-provision (erase SMA Server info).

In an example configuration, Server-CPE communication is over the SMAv1 protocol, except for bootstrapping and provisioning which uses the OpenHome "Off-Premise Bootstrap Procedure." On the CPE, the OS and network layer (Wi-Fi sandbox, WPS, routing, etc.) are provided and managed by the CPE OEM (e.g., Sercomm). Wi-Fi provisioning and traffic is handled by the CPE OEM (e.g., Sercomm) without Cloud Hub intervention/signaling, except with respect to enabling/disabling and resetting to defaults.

The Cloud Hub device installation and bootstrap mechanism performs one or more of the following: associate the device with an existing site; securely deliver the SMA communication configuration, including master key, SMA server address, and network ports. An embodiment includes an off-premise bootstrapping procedure, also used for bootstrapping tunneling cameras, that includes a three-step process.

Figure 10:
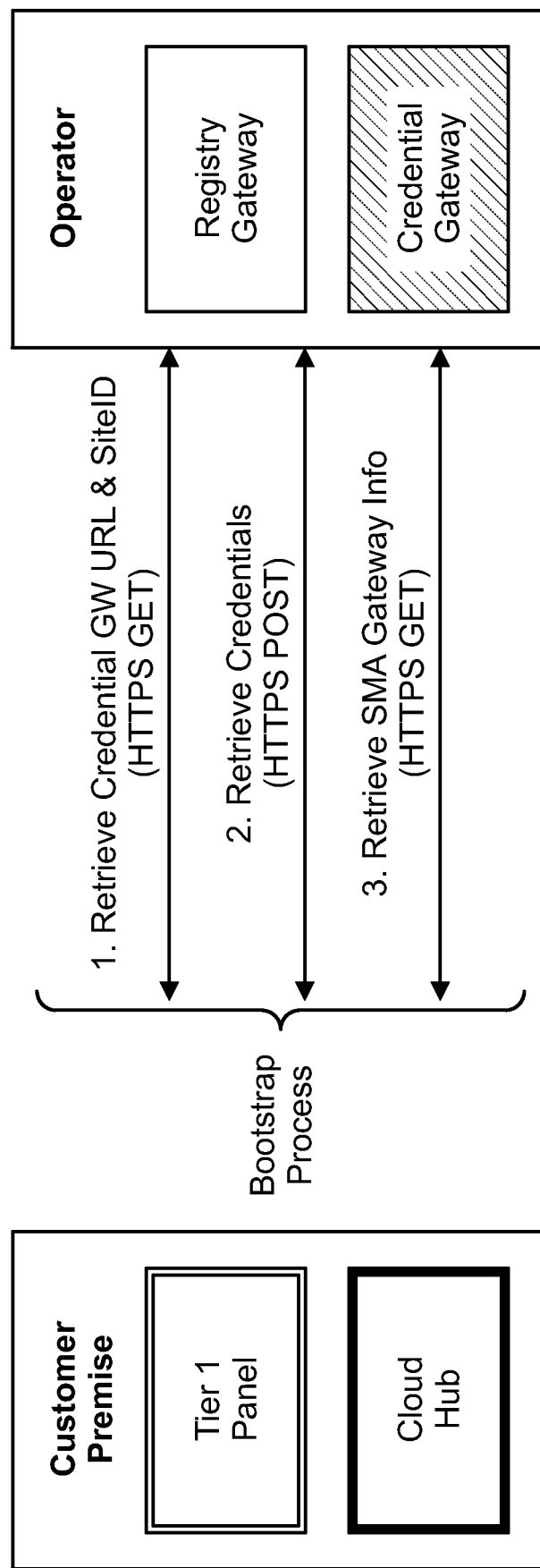
FIG. 10 is a flow diagram for device installation and bootstrapping, under an embodiment.

FIG. 10 is a flow diagram for device installation and bootstrapping, under an embodiment. The process for device installation and bootstrapping includes a first step that couples or connects the Cloud Hub to the Registry Gateway (e.g., via the pre-configured Registry Gateway URL) and retrieves its assigned siteID and the Credential Gateway URL. A second step includes the Cloud Hub retrieving its master key from the Credential Gateway using its siteID and Activation Key. The process comprises a third step in which the Cloud Hub retrieves Session Gateway Information from the Credential Gateway. At the end of the Bootstrap phase, the Cloud Hub has obtained its master key and its Session Gateway address from the iControl Gateway.

More particularly, the Cloud Hub retrieves its SiteID and Credential Gateway URL during the first step of the process.

| | |
|---|---|
| Purpose | Retrieve Credential Gateway URL and siteID using Cloud Hub Serial Number as input |
| Message Format | HTTPS GET /<Registry Gateway URL>/<Serial Number> HTTP/1.1 |
| Authentication | None |
| Mandatory Request Headers | Host |
| | <registryEntry serial="<Serial Number>" href="/<Registry Gateway URL>/<Serial Number>"> |
| 200 OK response | <functions>...</functions ><br><siteId><siteID></siteId><br><gatewayUrl><Credential Gateway URL></gatewayUrl><br></registryEntry> |
| Error responses | Standard HTTP response codes (e.g., 404) |
| Example Request | https://adminsirius3.icontrol.com/rest/icontrol/registry/serial/00603504026c<br><registryEntry serial="00:60:35:04:02:6c" href="/rest/icontrol/registry/serial/00603504026c"><br><functions count="1"> |
| Example 200 OK Response | <function name="delete" action="/rest/icontrol/registry/serial/00603504026c" method="DELETE"/><br></functions><br><siteId>00603504026c</siteId><br><gatewayUrl>http://gsess-sirius3.icontrol.com/gw</gatewayUrl><br></registryEntry> |

| Variable Name | Format | Description/Notes |
|---|---|---|
| Registry Gateway URL | URL | Pre-configured in Cloud Hub firmware |
| Serial Number | 12 byte hex string | Pre-configured in Cloud Hub firmware |
| siteID | 12-20 digit alpha numeric string | |
| gatewayUrl otherwise known as CredentialGatewayURL | URL prefix protocol:host[:port]/path | Prefix to use for Pending Master Key and Connect Info requests. |

The Cloud Hub retrieves its Pending Master Key when the Master Key is not already established from a previous successful Retreieve Credital procedure, during the second step of the process.

("<SharedSecret>") will not automatically expire; however, the Gateway may update a Cloud Hub's <SharedSecret>. Once a pending key becomes active, subsequent requests for the PendingDeviceKey receive method="retry" responses

| | |
|---|---|
| Purpose | Retrieve device-specific Master Key using its siteID, serial number and Activation Key as inputs |
| Message Format | HTTPS POST/<CredentialGatewayURL>/GatewayService/<siteID>/PendingDevice-Key HTTP/1.1 |
| Authentication | None |
| Mandatory Request Headers | Host, Content-Length, Content-Type (application/x-www-form-urlencoded ) |
| POST body | serial=<Serial Number>&activationkey=<ActivationKey> |
| 200 OK response with pending master key | <pendingPaidKey method=" server"expires="<pending master key expiration epoch millisecs>" ts="<current epoch millisecs>" key="<master key>" partner="icontrol"/> |
| 200 OK response with retry | Gateway responds with a method="retry" if the Cloud Hub is not yet activated within the system. Response includes timeout for retry. <PendingPaidKey method="retry" expires="<retry epoch millisecs>" ts="<current epoch millisecs>" partner="icontrol"/> |
| Other HTTP responses | Standard HTTP error response codes for example 5xx indicate a temporary server issue and Cloud Hub devices should perform an automatic retry in randomized 10 minute backoff. |
| Example POST body | serial=555500000010&activationkey=AABB12345678 |
| Example 200 OK with pending key Response | <pendingPaidKey method="server" expires="1308892493528" ts="1308849293540" key="398341159498190458" partner="icontrol"/> |
| Example 200 OK response with retry | <pendingPaidKey method="retry" expires="1308849242148" ts="1308849122148" partner="icontrol"/> |

| Variable Name | Format | Description/Notes |
|---|---|---|
| CredentialGatewayURL | Hostname[:port] | Retrieved via Step 1 - Retrieve Gateway URL and SiteID |
| siteID | 12 byte hexadecimal string | Retrieved via Step 1 - Retrieve Gateway URL and SiteID |
| ActivationKey | 10+ digit alpha numeric string | Pre-configured in Cloud Hub, generated by manufacturer and printed on device |
| 'method' (in 200 OK body) | String | "server" or "retry" |
| 'key' (in 200 OK body) | Alphanumeric string | Pending key returned by Gateway in 200 OK body |
| 'ts' (in 200 OK body) | Numeric string | Gateway's timestamp in UTC time |
| 'expires' (in 200 OK body) | Numeric string | UTC time when the current pending key expires |
| Pending Key | Alphanumeric string | Initial key retrieved from Gateway that is not yet confirmed with the Gateway. |
| SharedSecret or master key | Alphanumeric string | Pending key becomes <SharedSecret> after successful connection to Gateway (see below) |

While Cloud Hub activation is underway, the Gateway responds to a Cloud Hub's request for Credential with 200 OK including the PendingPaidKey XML body (with method="server") with a pending key field. The pending key field becomes active once the Cloud Hub couples or connects to the Gateway over the SMA channel and is authenticated by using the pending key to encrypt the initial SMA exchange. Once authenticated (via a successful SMA session with the Gateway), the key is no longer pending and instead becomes active, or otherwise known as the Cloud Hub's <SharedSecret> or master key. The active master key unless a new activation process is initiated (this can be done by administrators and installers via the iControl admin and portal applications).

If the Cloud Hub does not connect to the server over the SMA channel and get authenticated using the key by the "expires" time specified in the PendingPaidKey XML body, then the pending key will expire and no longer be valid. While Cloud Hub activation is underway, each request for the PendingPaidKey receives a different key in the response, causing the previous pending key to be replaced with the new one.

The Cloud Hub retrieves Session Gateway Info, which includes SMA Gateway address, during the third step of the process for device installation and bootstrapping.

| | |
|---|---|
| Purpose | Retrieve SMA Gateway hostname and port from Credential Gateway |
| Message Format | HTTPS GET /<gatewayUrl>/GatewayService/<siteID>/connectInfo HTTP/1.1 |
| Authentication Mandatory | None |
| Request Headers | Host |
| 200 OK response | <connectInfo><br>   <session host=<Session Gateway host>port=[port]/><ris eventPort1='[port]' eventPort2='[port]' controlPort1='[port]' controlPort2='[port]"/><br>    <xmpp host=<XMPP Gateway host>port=[port]/>(ignored)<br>   </connectInfo> |
| Error responses | Standard HTTP response codes (e.g., 404) |
| Example 200 OK Response | <connectInfo><br>   <session host='gsess-aristotleqapicontrol.com' port='443'/><ris eventPort1='11083' eventPort2='11083' controlPort1='11084' controlPort2='11084'><br>   <xmpp host='gsess-aristotleqapicontrol.com' port='5222'><media url='https://media-aristotleqap.icontrol.com/gw/GatewayService'></connectInfo> |

| Variable Name | Format | Description/Notes |
|---|---|---|
| gatewayUrl | https://hostname[:port]/path | Retrieved Via Step 1 - Retrieve Gateway URL and SiteID |
| siteID | 12-20 char alpha numeric string | Retrieved Via Step 1 - Retrieve Gateway URL and SiteID |
| XMPP Gateway host:port | Hostname and port IPAddress and port | These variables should be ignored by the Cloud Hub. |
| Session Gateway host | Hostname | Host and command port to use for SMA communication with the Gateway. |
| session:port | port | This port variable should be ignored by the Cloud Hub. |
| ris:eventPort1/2 | port | ports on Session Gateway host to which SMA async events should be sent |
| ris:controlPort1/2 | port | ports on Session Gateway host for establishing the SMA control channel |

During the course of operation, the CPE executes the first and third steps of the installation process described above during each start-up/restart; the second step of the installation is executed when there is no previously stored master key. Hence, security 5 credentials can be re-bootstrapped by invalidating the existing master key.

The installation process of an embodiment is as follows:
1) The user starts the "Add Control Hub" wizard.
2) The user is prompted to enter the Control Hub's Activation Key, printed on the device.
3) REST request generated: POST /rest/[partner]/nw/[siteId]/devices?technology=CSMAP&type=Icontrol_OneLink_CH1000_controlhub&name=[name]&activationKey=[akey]
   a) Gateway derives the 12-hex-digit CPE serial number from the Activation Key
   b) Gateway validates the activation key. HTTP 403 is returned if activation key is incorrect
   c) Gateway calls the addDevice method on the gapp server to add LWG_SerComm_ControlHub_1000 with given serial to site.
      i) server detects the device type and populates registry
      ii) HTTP 409 is returned if the device cannot be added
      iii) HTTP 503 is returned if the device cannot be referenced after it was just recently created.
   d) Gateway puts the device into pending key state.
   e) Upon success, HTTP 201 is returned with the "Location" header pointing to relative URI of /rest/[partner]/nw/[netId]/instances/[indexId]
4) On device connection, the gateway updates device-auth/pending-expiry to −1 and device-auth/session-key with password and device/connection-status to connected.
5) Polls for the data point "connection-status" to change to "connected" in the data returned by a GET to the URL returned in step 3e.; if does not connect after 60 seconds, displays a timeout message (device has not connected—continue waiting or start over).
6) Upon detecting successful connection, IA displays a successful detection message to the user.

The LWGW of an embodiment is configured to maintain a single CPE coupling or connection. This coupling or connection is encapsulated and managed by the RISSecurityPanel class, but is not so limited.

Figure 11:
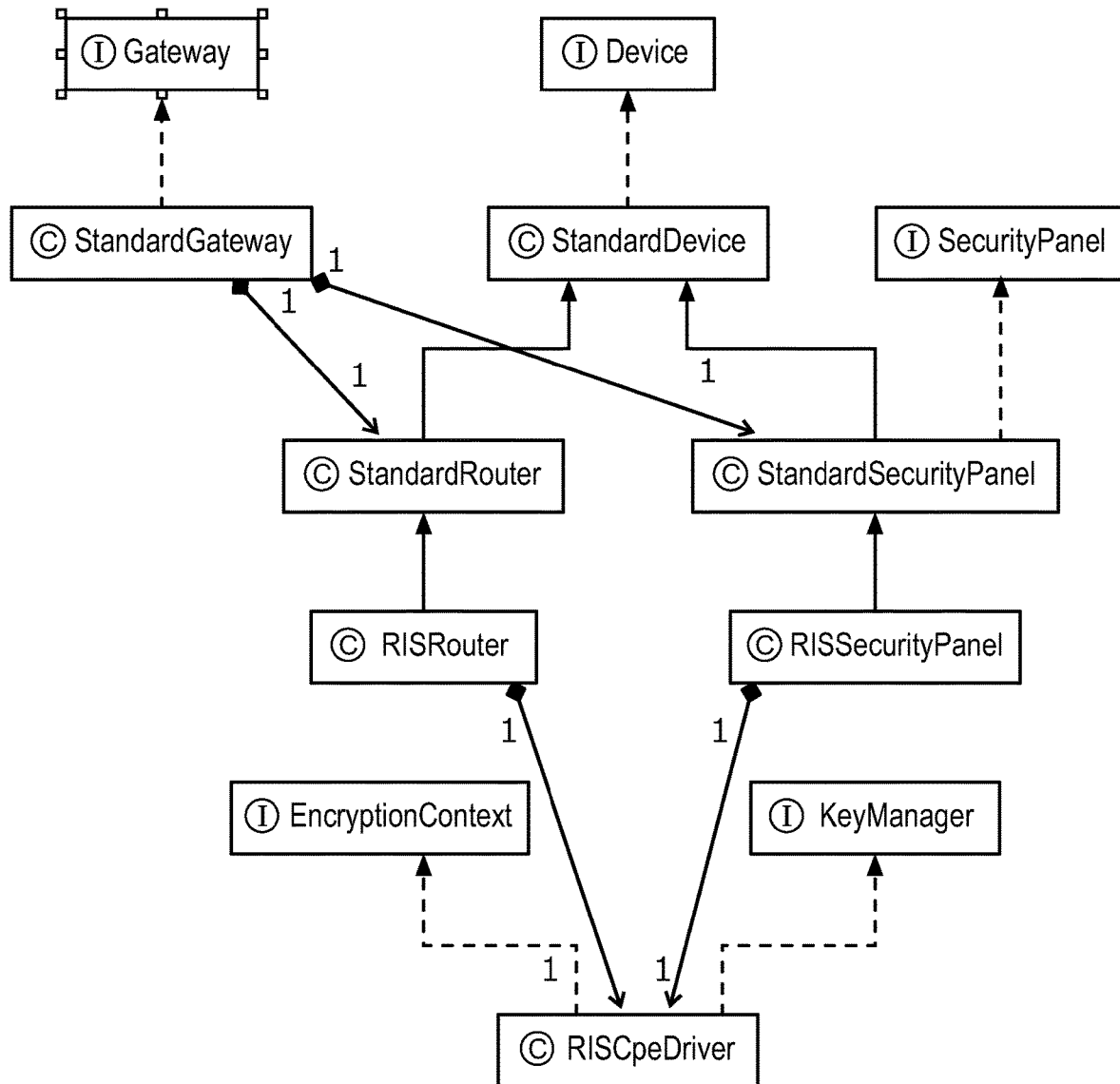
FIG. 11 is a block diagram of the LWGW class structure, under an embodiment.

When configuring the system to include the Cloud Hub, an embodiment factors out the SMA communication and generic state-machine functionality from the RISSecurityPanel to create a new class RISCpeDriver, and a new subclass StandardDevice. The new subclass of StandardDevice, RISRouter, represents the Cloud Hub abstraction in the LWGW. A new class RISMCDevManager is also created. The StandardGateway and RISSecurityPanel classes are configured to perform monitor and control (M/C or MC) (e.g., Z-Wave) device operations via this class's public interface. The LWGW representation of CPE connection state is expanded to allow M/C operations to occur, even if the panel connection is down. FIG. 11 is a block diagram of the LWGW class structure, under an embodiment.

The following methods from RISSecurityPanel (some are over-rides from StandardSecurityPanel) are not panel-specific, but rather represent the functionality of any device which implements basic functionality of an SMA client. Therefore, an embodiment includes use of these methods for the RISRouter class: getSequenceNumber( ); setSequenceNumber( ); getMasterKey( ); getMasterKeyBytes( ); getSessionKey( ); getDeviceHardwareId; getSessionKeyBytes; setSessionKey; getPendingSessionKey; getPendingSessionKeyBytes; setPendingSessionKey; getSmsPinEncoded; getSmsPin; getSmsPinBytes; setSmsPin; getCommandKeyBytes; getWakeupSK; getConfigSK; getConfigSC; getSK; decryptAESCBC256; decryptAESCBC256IV; getType; encrypt; decrypt; getEncryptionContext; messageWasMissed; setConnected; handleUplinkData; refreshAesKey; setAesKey; isMCPointVariable; sendPendingData; doApplicationTick; getSessionId; startPremisesConnectionTest; getSMSTs; configMessage; wakeupMessage; startDiscovery; cancelDiscovery; getDiscoveryState; getSmaFraming; sendPremesisKeepalive; sendNoop; getIfConfig; setIfConfig; getLogFile; getSystemLogFile; setFirmwareUpgrade; getCpeVersion; getCpeFirmwareVersion; setFwUpgradeProgress; getFwUpgradeProgress; getFwUpgradeProgressString; getControllerId; getNextCommandTime; setNextCommandTime; sendDownRequest; setSyncNoAndCheckForMissedEvents; handleAsyncMessage; handleSessionResponseMessage; sendPremesisConfiguration; getSmsHeaders; sendTestSms; sendWakeupSms; setConnected; commandChannelReady; getConnectivityTestTimeout; getCpeStarter; getCommTest; setSilenceAllTroubles; setClearAllTroubles.

The following methods from RISSecurityPanel are related to M/C devices, and this functionality is handled by the RISRouter (Cloud Hub) class, when present. Hence an interface for them comes out of RISSecurityPanel to be implemented by the RISRouter class. The StandardGateway is configured to decide which class method to call based on the presence of a Cloud Hub: handleMCDiscoveryModeStatusReport; handleMCDeviceStatusReport; reportMCPointUpdate; hasMatchingDeviceNames; getDiscoveredMCDeviceName; doZWave; getMCDevices; getMCDevRoute; getMCDevRoutes; getMCPointValue; getMCPointValues; getMCPointConfigs; getMCPointConfig; setAllMCPointConfigs; setDeviceMCPointConfigs; setMCPointConfig; setMCPointValue; setMCPointValue; failMCCommand; getMCDeviceVersionString; renameDevice; removeDevice.

Commands (e.g., SMAv1) to be routed through the RISRouter class, when present, include but are not limited to the following: GET_MC_DEVICE_CONFIG; GET_MC_POINT_CONFIG; SET_MC_POINT_REPORT_ CONFIG; GET_MC_POINT_STATUS; SET_MC_POINT_STATUS; GET_MC_DEVICE_USER_CODES; SET_MC_DEVICE_USER_CODES; REMOVE_MC_DEVICE_USER_CODES; LOCAL_PORT_PASSTHROUGH; REMOVE_MC_DEVICE; SET_MC_DEVICE_NAME; GET_MC_DEVICE_ROUTES.

System commands to be routed through the RISRouter class, when present, include but are not limited to the following: MC_MESH_RELEARN; GET_DISCOVERY_STATUS; SET_DISCOVERY_STATUS; GET_LOCAL_PORT_CONFIG; SET_LOCAL_PORT_CONFIG; GET_MESH_RELEARN_STATUS; RESET_MC_MODULE.

System commands to be conditionally routed to either RISRouter or RISSecurityPanel, include but are not limited to the following: UPGRADE_FIRMWARE; GET_LOG_FILE; GET_LOCAL_TIME; SET_LOCAL_TIME; GET_TIME_ZONE; SET_TIME_ZONE; GET_FIRMWARE_VERSION.

The Cloud Hub of an embodiment is a broadband-connected device, and it is configured to attempt to maintain an always-on TCP/IP connection with the server. Therefore, there is no need for a shoulder-tap mechanism. Likewise, no "wake-up" message is required because the Cloud Hub is effectively always awake. With conventional Tier-1 systems, the server tears down the TCP connection after several minutes of inactivity; for Cloud Hub, the TCP connection should stay up for as long as possible, with periodic server-originated SMA heartbeat messages (SMA Request Type 0), so that the CPE can supervise the connection as being truly active.

Incoming UDP messages from the CPE are routed to the LWGW instance associated with a given site ID. The session server uses the Gateway Registry, which is a one-to-one mapping of CPE-unique IDs to site IDs for this purpose. With the addition of the Cloud Hub, an embodiment includes a second CPE-unique ID that is mapped to the same site ID (LWGW instance) as the primary SMA client's CPE-unique ID. This is accomplished by leveraging a Device Registry service that maintains a mapping of CPE ID and device type to site ID. The session server is modified to use the following procedure upon receipt of a UDP packet:
1. Look up the received packet CPE-unique ID in the Gateway Registry. If a corresponding site ID is found, route the packet to the associated LWGW instance. This is a standard, non-Cloud Hub packet from the CPE's primary SMA Client.
2. If a corresponding site ID is not found in step 1, the session server will look up the received CPE-unique ID with a general Cloud Hub device type ID. If a correspond site ID is found, route the packet to the associated LWGW instance. If not site ID is found, the packet is discarded.

The Cloud Hub, UDP and TCP messages received from the CPE at the session server are sent to the correct LWGW via two REST endpoints, thereby allowing the receiving LWGW instance to run on a session server other than the one at which the message was received.

When a UDP SMA message arrives at a session server, if the LWGW corresponding to the CPE-unique ID message is not already running on the given session server, then the session server initiates a new LWGW instance there, and if the corresponding LWGW is currently running on another session server, it will be gracefully shut down. In this way, the LWGW can move from one session server to another.

Regarding the session server/LWGW routing mechanism of an embodiment, the Cloud Hub network traffic includes a mechanism in which incoming UDP messages to a first session server cause the first session server to determine if the LWGW is running on the first session server. If so, using a LocalRestClient, UDP messages are passed through to the LWGW via a rest endpoint that calls through to the handleAsyncMessage method of the RIS device; if not, LWGW routing cache is checked to determine which session server is hosting the LWGW. If a routing entry is found, then use AMQPRestClient to pass the UDP message through to the specific session server hosting the LWGW via the same rest endpoint that calls through to the handleAsyncMessage method of the RIS device. If no routing entry is found, or the session server returns 404 (e.g., stale routing entry), then the session server sends out a broadcast request using the AMQPRestClient to ask all session servers "who has this LWGW". If a session server responds to the broadcast request, then the async event is sent to that session server following the method described herein. If no session server responds to the broadcast request, then the LWGW is started on this first session server.

In an embodiment, the Cloud Hub network traffic includes a mechanism in which incoming TCP messages to a first session server cause the first session server to determine if LWGW is running on the first session server. If LWGW is not running on the first session server, LWGW routing cache is checked to determine which session server is hosting the LWGW and the TCP message is passed through accordingly, but using a different rest endpoint than UDP message handling. In the rest endpoint call, the name of the session server with the TCP connection is sent along with the request. When the LWGW receives TCP messages through the rest endpoint, it tracks the name of the session server with the TCP connection.

When the LWGW sends a command over the TCP coupling or connection in an embodiment, it sends a command via the AMQPRestClient to the session server hosting the TCP connection. It has this name saved from when it received the first TCP message for the given connection. If the TCP session server hostname is not known, or responds with a message indicating the TCP connection no longer present, then the LWGW sends out a broadcast request using the AMQPRestClient to ask all session servers "who has this TCP connection". If any session server responds to the broadcast request, then the LWGW sends the command to that session server following the method described above. If no session server responds to the broadcast request, then the LWGW queues the command for a pre-specified time period.

The system of an embodiment including the Cloud Hub and Virtual Gateway as described in detail herein includes one or more components of the "integrated security system" described in detail in the Related Applications, which are incorporated by reference herein. An example of the "integrated security system" is available as one or more of the numerous systems or platforms available from iControl Networks, Inc., Redwood City, Calif. The system of an embodiment described herein incorporates one or more components of the "integrated security system". The system of an embodiment described herein is coupled to one or more components of the "integrated security system". The system of an embodiment described herein integrates with one or more components of the "integrated security system".

More particularly, the methods and processes of the integrated security system, and hence the full functionality, can be implemented in the system described herein including the Cloud Hub and Virtual Gateway. Therefore, embodiments of the systems described herein integrate broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wife, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols.

The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard XML/TCP/IP protocols and ports are employed over secured SSL sessions; USB 2.0 via ports on the gateway; 802.11b/g/n IP communications; GSM/GPRS RF WAN communications; CDMA 1×RTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

Figure 12:
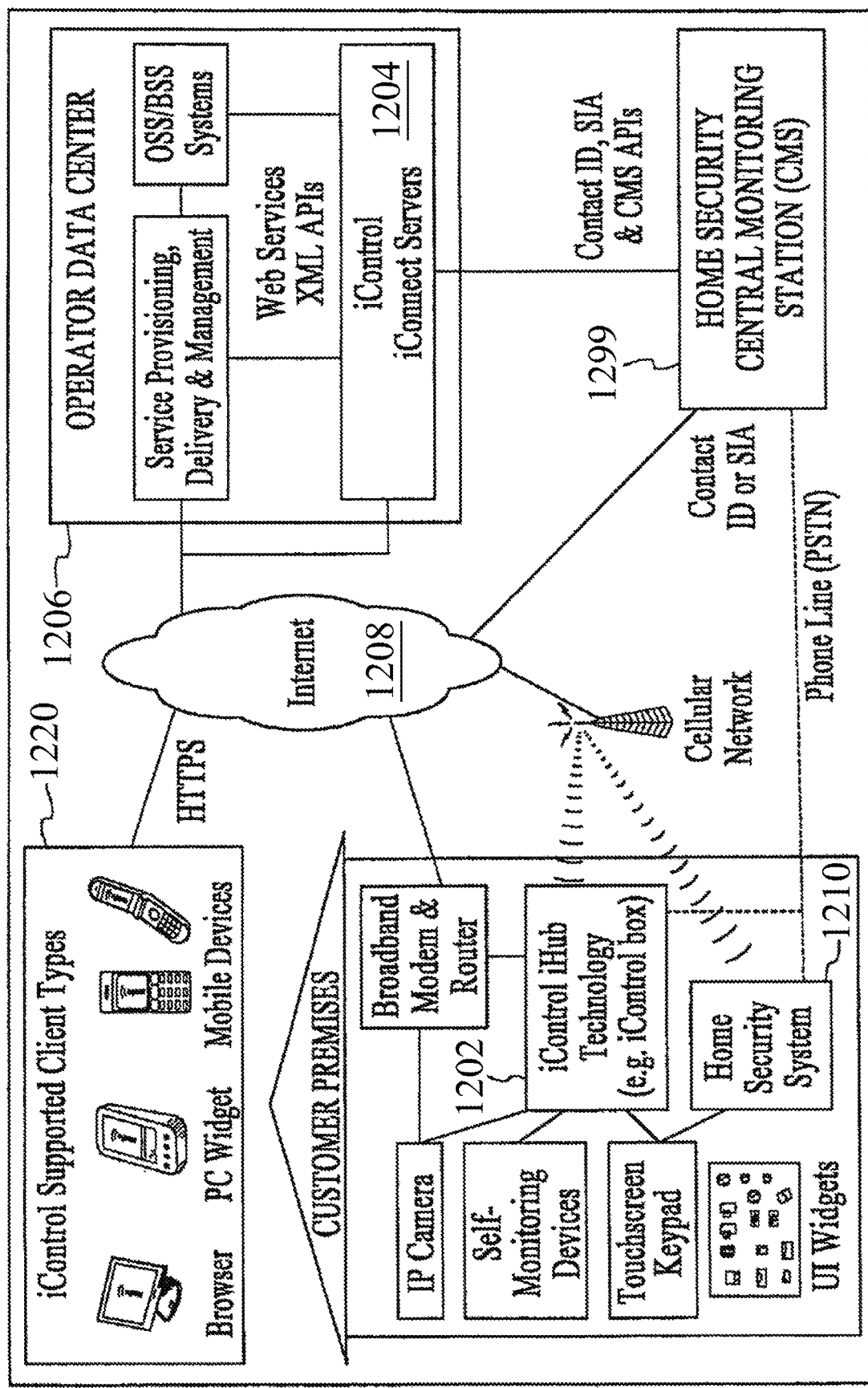
FIG. 12 is a block diagram of the integrated security system, under an embodiment.

FIG. 12 is a block diagram of the integrated security system 1200, under an embodiment. The integrated security system 1200 of an embodiment includes the gateway 1202 and the security servers 1202 coupled to the conventional home security system 1210. At a customer's home or business, the gateway 1202 connects and manages the diverse variety of home security and self-monitoring devices. The gateway 1202 communicates with the iConnect Servers 1204 located in the service provider's data center 1206 (or hosted in integrated security system data center), with the communication taking place via a communication network 1208 or other network (e.g., cellular network, internet, etc.). These servers 1204 manage the system integrations necessary to deliver the integrated system service described herein. The combination of the gateway 1202 and the iConnect servers 1204 enable a wide variety of remote client devices 1220 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OSS/BSS and service delivery systems via the iConnect web services-based XML APIs.

The integrated security system service can also coordinate the sending of alarms to the home security Central Monitoring Station (CMS) 1299. Alarms are passed to the CMS 1299 using standard protocols such as Contact ID or SIA and can be generated from the home security panel location as well as by iConnect server 1204 conditions (such as lack of communications with the integrated security system). In addition, the link between the security servers 1204 and CMS 1299 provides tighter integration between home security and self-monitoring devices and the gateway 1202. Such integration enables advanced security capabilities such as the ability for CMS personnel to view photos taken at the time a burglary alarm was triggered. For maximum security, the gateway 1202 and iConnect servers 1204 support the use of a mobile network (both GPRS and CDMA options are available) as a backup to the primary broadband connection.

Figure 13:
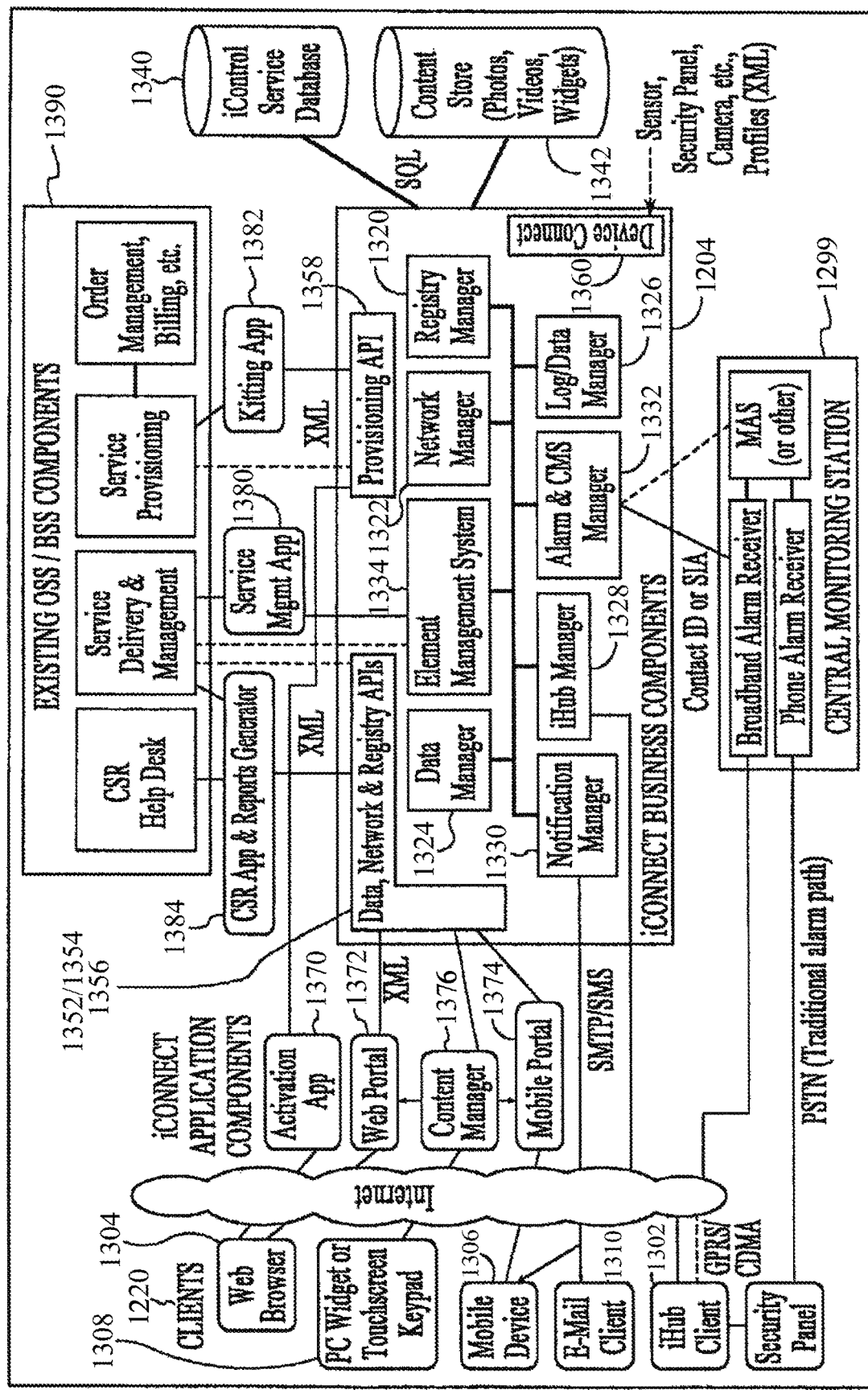
FIG. 13 is a block diagram of components of the integrated security system, under an embodiment.

The integrated security system service is delivered by hosted servers running software components that communicate with a variety of client types while interacting with other systems. FIG. 13 is a block diagram of components of the integrated security system 1200, under an embodiment. Following is a more detailed description of the components.

The iConnect servers 1204 support a diverse collection of clients 1220 ranging from mobile devices, to PCs, to in-home security devices, to a service provider's internal systems. Most clients 1220 are used by end-users, but there are also a number of clients 1220 that are used to operate the service.

Clients 1220 used by end-users of the integrated security system 1200 include, but are not limited to, the following:
Clients based on gateway client applications 1302 (e.g., a processor-based device running the gateway technology that manages home security and automation devices).

A web browser 1304 accessing a Web Portal application, performing end-user configuration and customization of the integrated security system service as well as monitoring of in-home device status, viewing photos and video, etc.

Device and user management can also be performed by this portal application. A mobile device 1306 (e.g., PDA, mobile phone, etc.) accessing the integrated security system Mobile Portal. This type of client 1306 is used by end-users to view system status and perform operations on devices (e.g., turning on a lamp, arming a security panel, etc.) rather than for system configuration tasks such as adding a new device or user.

PC or browser-based "widget" containers 1308 that present integrated security system service content, as well as other third-party content, in simple, targeted ways (e.g. a widget that resides on a PC desktop and shows live video from a single in-home camera). "Widget" as used herein means applications or programs in the system.

Touchscreen home security keypads 1308 and advanced in-home devices that present a variety of content widgets via an intuitive touchscreen user interface.

Notification recipients 1310 (e.g., cell phones that receive SMS-based notifications when certain events occur (or don't occur), email clients that receive an email message with similar information, etc.).

Custom-built clients (not shown) that access the iConnect web services XML API to interact with users' home security and self-monitoring information in new and unique ways. Such clients could include new types of mobile devices, or complex applications where integrated security system content is integrated into a broader set of application features.

In addition to the end-user clients, the iConnect servers 1204 support PC browser-based Service Management clients that manage the ongoing operation of the overall service. These clients run applications that handle tasks such as provisioning, service monitoring, customer support and reporting.

There are numerous types of server components of the iConnect servers 1204 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 1202 is located, and is also commonly referred to as a site or premises; the premises can include any type of structure (e.g., home, office, warehouse, etc.) at which a gateway 1202 is located. Users can only access the networks to which they have been granted permission. Within a network, every object monitored by the gateway 1202 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 1299. The Business Components are implemented as portable Java J2EE Servlets, but are not so limited.

The following iConnect Business Components manage the main elements of the integrated security system service, but the embodiment is not so limited:

A Registry Manager 1320 defines and manages users and networks. This component is responsible for the creation, modification and termination of users and networks. It is also where a user's access to networks is defined.

A Network Manager 1322 defines and manages security and self-monitoring devices that are deployed on a network (site). This component handles the creation, modification, deletion and configuration of the devices, as well as the creation of automations, schedules and notification rules associated with those devices.

A Data Manager 1324 manages access to current and logged state data for an existing network and its devices. This component specifically does not provide any access to network management capabilities, such as adding new devices to a network, which are handled exclusively by the Network Manager 1322.

To achieve optimal performance for all types of queries, data for current device states is stored separately from historical state data (a.k.a. "logs") in the database. A Log Data Manager 1326 performs ongoing transfers of current device state data to the historical data log tables.

Additional iConnect Business Components handle direct communications with certain clients and other systems, for example:

An iHub Manager 1328 directly manages all communications with gateway clients, including receiving information about device state changes, changing the configuration of devices, and pushing new versions of the gateway client to the hardware it is running on.

A Notification Manager 1330 is responsible for sending all notifications to clients via SMS (mobile phone messages), email (via a relay server like an SMTP email server), etc.

An Alarm and CMS Manager 1332 sends critical server-generated alarm events to the home security Central Monitoring Station (CMS) and manages all other communications of integrated security system service data to and from the CMS.

The Element Management System (EMS) 1334 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 1340 and in the iControl Content Store 1342. The iControl Content Store is used to store media objects like video, photos and widget content, while the Service Database stores information about users, networks, and devices. Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:

A Registry Manager API 1352 provides access to the Registry Manager Business Component's functionality, allowing management of networks and users.

A Network Manager API 1354 provides access to the Network Manager Business Component's functionality, allowing management of devices on a network.

A Data Manager API 1356 provides access to the Data Manager Business Component's functionality, such as setting and retrieving (current and historical) data about device states.

A Provisioning API 1358 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 1360 for quickly adding support for new devices to the integrated security system. This interface 1360, referred to as DeviceConnect 1360, is a flexible, standards-based mechanism for defining the properties of new devices and how they can be managed. Although the format is flexible enough to allow the addition of any type of future device, pre-defined XML profiles are currently available for adding common types of devices such as sensors (SensorConnect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

An iControl Activation Application 1370 that delivers the first application that a user sees when they set up the integrated security system service. This wizard-based web browser application securely associates a new user with a purchased gateway and the other devices included with it as a kit (if any). It primarily uses functionality published by the Provisioning API.

An iControl Web Portal Application 1372 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.

An iControl Mobile Portal 1374 is a small-footprint web-based interface that runs on mobile phones and PDAs. This interface is optimized for remote viewing of device states and pictures/videos rather than network management. As such, its interaction with the Business Components is primarily via the Data Manager API.

Custom portals and targeted client applications can be provided that leverage the same Business Component APIs used by the above applications.

A Content Manager Application Component 1376 delivers content to a variety of clients. It sends multimedia-rich user interface components to widget container clients (both PC and browser-based), as well as to advanced touchscreen keypad clients. In addition to providing content directly to end-user devices, the Content Manager 1376 provides widget-based user interface components to satisfy requests from other Application Components such as the iControl Web 1372 and Mobile 1374 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

A Service Management Application 1380 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.

A Kitting Application 1382 is used by employees performing service provisioning tasks. This application allows home security and self-monitoring devices to be associated with gateways during the warehouse kitting process.

A CSR Application and Report Generator 1384 is used by personnel supporting the integrated security system service, such as CSRs resolving end-user issues and employees enquiring about overall service usage. Pushes of new gateway firmware to deployed gateways is also managed by this application.

The iConnect servers 1204 also support custom-built integrations with a service provider's existing OSS/BSS, CSR and service delivery systems 1390. Such systems can access the iConnect web services XML API to transfer data to and from the iConnect servers 1204. These types of integrations can compliment or replace the PC browser-based Service Management applications, depending on service provider needs.

As described above, the integrated security system of an embodiment includes a gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 14:
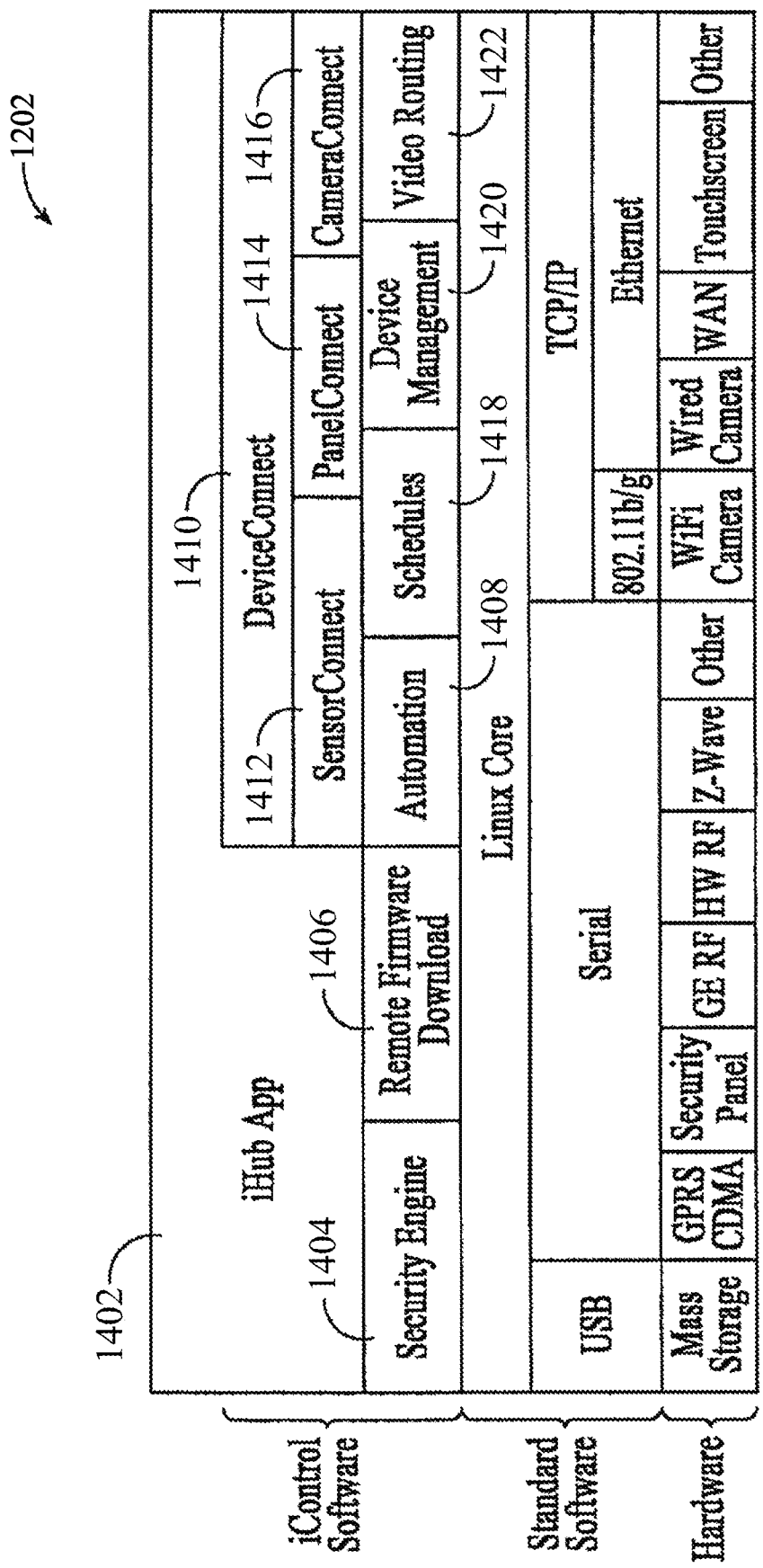
FIG. 14 is a block diagram of the gateway including gateway software or applications, under an embodiment.

FIG. 14 is a block diagram of the gateway 1202 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 1402 is the main program that orchestrates the operations performed by the gateway. The Security Engine 1404 provides robust protection against intentional and unintentional intrusion into the integrated security system network from the outside world (both from inside the premises as well as from the WAN). The Security Engine 1404 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The gateway provides for 128-bit SSL encapsulation of the user picture and video data sent over the internet for complete user security and privacy.

802.11b/g/n with WPA-2 security to ensure that wireless camera communications always takes place using the strongest available protection.

A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 1406 allows for seamless and secure updates to the gateway firmware through the iControl Maintenance Application on the server 1204, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Gateway firmware can be remotely download either for one gateway at a time, a group of gateways, or in batches.

The Automations engine 1408 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 1410 includes definitions of all supported devices (e.g., cameras, security panels, sensors, etc.) using a standardized plug-in architecture. The DeviceConnect module 1410 offers an interface that can be used to quickly add support for any new device as well as enabling interoperability between devices that use different technologies/protocols. For common device types, pre-defined sub-modules have been defined, making supporting new devices of these types even easier. SensorConnect 1412 is provided for adding new sensors, CameraConnect 1416 for adding IP cameras, and PanelConnect 1414 for adding home security panels.

The Schedules engine 1418 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 1418 then interfaces with SensorConnect 1412 to ensure that scheduled events occur at precisely the desired time.

The Device Management module 1420 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 1422 is responsible for delivering seamless video streams to the user with zero-configuration. Through a multi-step, staged approach the video routing engine uses a combination of UPnP port-forwarding, relay server routing and STUN/TURN peer-to-peer routing.

Figure 15:
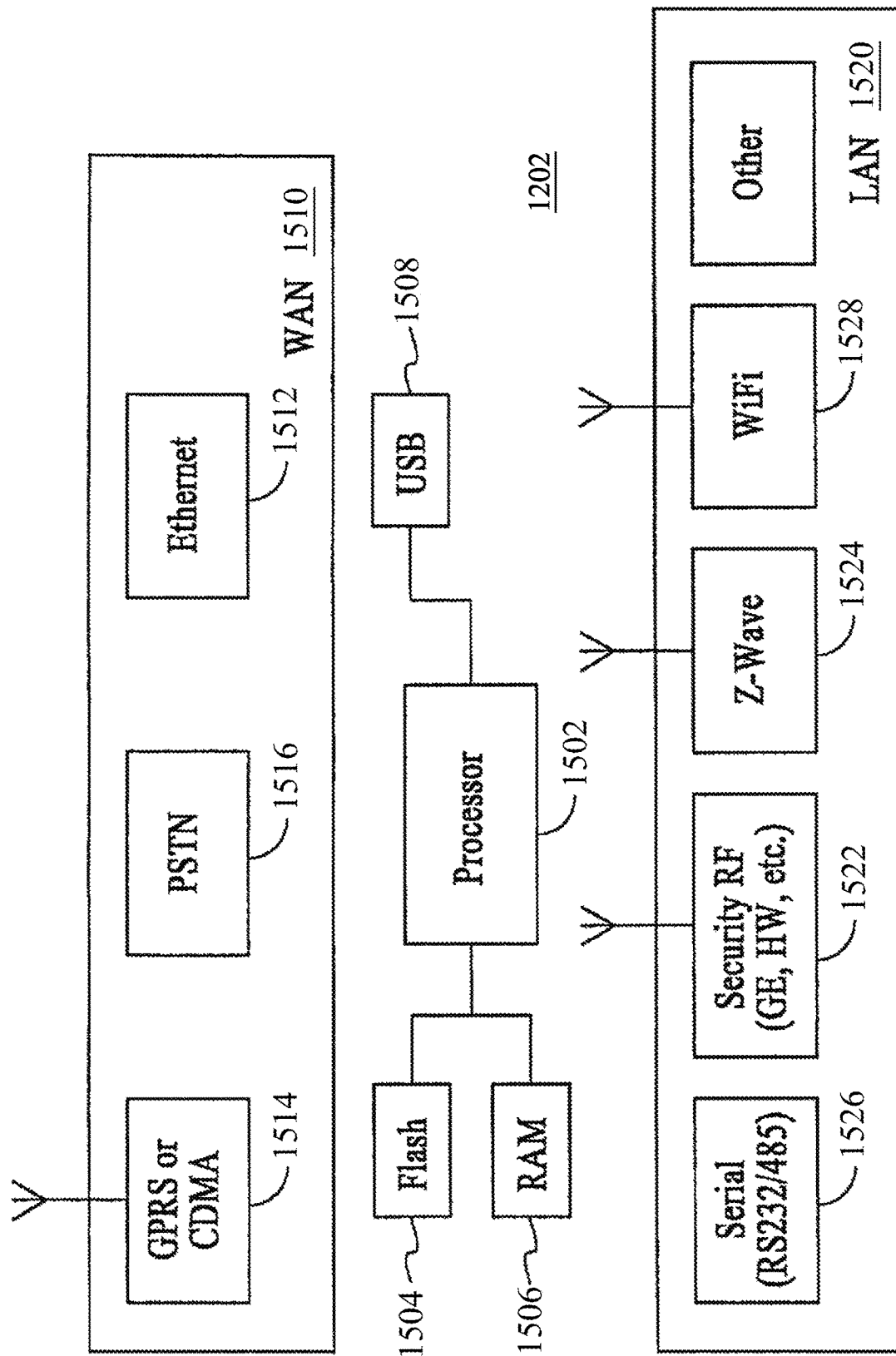
FIG. 15 is a block diagram of components of the gateway, under an embodiment.

FIG. 15 is a block diagram of components of the gateway 1202, under an embodiment. Depending on the specific set of functionality desired by the service provider deploying the integrated security system service, the gateway 1202 can use any of a number of processors 1502, due to the small footprint of the gateway application firmware. In an embodiment, the gateway could include the Broadcom BCM5354 as the processor for example. In addition, the gateway 1202 includes memory (e.g., FLASH 1504, RAM 1506, etc.) and any number of input/output (I/O) ports 1508.

Referring to the WAN portion 1510 of the gateway 1202, the gateway 1202 of an embodiment can communicate with the iConnect server using a number of communication types and/or protocols, for example Broadband 1512, GPRS 1514 and/or Public Switched Telephone Network (PTSN) 1516 to name a few. In general, broadband communication 1512 is the primary means of connection between the gateway 1202 and the iConnect server 1204 and the GPRS/CDMA 1514 and/or PSTN 1516 interfaces acts as backup for fault tolerance in case the user's broadband connection fails for whatever reason, but the embodiment is not so limited.

Referring to the LAN portion 1520 of the gateway 1202, various protocols and physical transceivers can be used to communicate to off-the-shelf sensors and cameras. The gateway 1202 is protocol-agnostic and technology-agnostic and as such can easily support almost any device networking protocol. The gateway 1202 can, for example, support GE and Honeywell security RF protocols 1522, Z-Wave 1524, serial (RS232 and RS485) 1526 for direct connection to security panels as well as WiFi 1528 (802.11b/g) for communication to WiFi cameras.

Embodiments include a system comprising a drone comprising a plurality of sensors configured to collect surveillance data at a premises. The drone includes a positioning system and propulsion system configured to control position and movement of the drone for premises surveillance. The system includes a plurality of network devices installed at the premises. The system includes a gateway comprising a rules engine. The gateway is coupled to the drone and the plurality of network devices. The gateway is configured to receive drone data and the surveillance data from the drone and device data from the plurality of network devices. The rules engine is configured to generate control data for the drone and the plurality of network devices using the drone data, the surveillance data and the device data. The system includes a remote client device coupled to the gateway, wherein the remote client device includes a user interface generated by an application of the remote client device. The user interface is configured to present at least one of the drone data, the surveillance data and the device data.

Embodiments include a system comprising: a drone comprising a plurality of sensors configured to collect surveillance data at a premises, wherein the drone includes a positioning system and propulsion system configured to control position and movement of the drone for premises surveillance; a plurality of network devices installed at the premises; a gateway comprising a rules engine, wherein the gateway is coupled to the drone and the plurality of network devices, wherein the gateway is configured to receive drone data and the surveillance data from the drone and device data from the plurality of network devices, wherein the rules engine is configured to generate control data for the drone and the plurality of network devices using the drone data, the surveillance data and the device data; and a remote client device coupled to the gateway, wherein the remote client device includes a user interface generated by an application of the remote client device, wherein the user interface is configured to present at least one of the drone data, the surveillance data and the device data.

The drone comprises an unmanned autonomous vehicle, wherein the plurality of sensors includes at least one of an image sensor, an acoustic sensor, an environmental sensor, a motion sensor, and a detector.

The drone includes at least one of an aircraft, a land vehicle, a watercraft, and a motor vehicle.

The drone includes control logic comprising at least one of the following: operation logic defined by one or more predefined operation procedures using data of sensor states of at least one system sensor of the drone including at least one of velocity, a timer, an inertial measurement unit, and a global positioning system (GPS); range prediction logic defined by a status of the power source of the drone and premises environmental conditions including at least one of wind speed and direction, humidity, altitude, temperature, and air pressure, and a trajectory planner associated with one or more mobile operations; and autonomous logic associated with the range prediction logic including collision avoidance logic and control and encryption for information transmitted between the drone and at least one of the gateway and the remote server.

The drone comprises operational states including at least one of a quiet state, a charging state, and a patrol state when the drone is performing surveillance of the premises.

The drone includes at least one pre-programmed premises patrol route for use in the patrol state.

The drone generates a premises patrol route for use in a patrol state.

The system comprises a remote server coupled to at least one of the gateway and the drone, wherein the remote server is configured to receive at least a portion of the drone data, the surveillance data, the device data, and the control data.

The remote server includes a server rules engine, wherein the server rules engine is configured to control at least one of the drone and at least one premises device of the plurality of premises devices.

Processing of at least one of the drone data, the surveillance data and the device data is distributed among the rules engine of the gateway and the server rules engine.

At least one of the remote server and the gateway are configured to coordinate control of the drone using at least one of the drone data, the surveillance data and the device data.

The system comprises a map of the premises, wherein the map includes at least one of a two-dimensional and a three-dimensional map.

The drone is configured to generate the map from at least one of the drone data, the surveillance data and the device data.

At least one of the drone, the gateway, and the remote server is configured to generate the map from at least one of the drone data, the surveillance data and the device data.

The drone includes a communication system configured to transmit at least one of the surveillance data and the drone data to at least one of the remote server and the gateway, wherein the communication system includes at least one of radio frequency (RF) and cellular channels.

At least one of the gateway and the remote server is configured to generate alert messages using at least one of the drone data, the surveillance data and the device data, and provide the alert messages to the user interface of the remote client device.

The gateway is located at the premises. The drone includes the gateway.

The remote server includes the gateway.

The gateway is coupled to the remote server via a plurality of communication channels, wherein the plurality of communication channels include at least one of a broadband channel, a cellular channel, and an RF channel.

The rules engine is configured to control interaction among the plurality of premises devices.

The rules engine is configured to control interaction among the drone and at least one premises device of the plurality of premises devices.

The device data comprises data generated by the plurality of premises devices. The drone data includes at least one of position data and route data of the drone. The drone data includes system data of at least one drone onboard system.

The gateway is configured to process at least a portion of at least one of the drone data, the surveillance data and the device data.

The position and the movement of the drone is controlled automatically by at least one of the gateway and the server.

The user interface is configured to receive control inputs for the drone, wherein the position and the movement of the drone is controlled via the control inputs.

The user interface is configured to receive control inputs for at least one of the drone and the plurality of network devices.

The system comprises a docking station configured to receive the drone.

The gateway includes the docking station.

The docking station includes a charging system configured to charge a power source of the drone.

The plurality of premises devices includes at least one of an Internet Protocol (IP) device, a sensor, a detector, a camera, a controller, an actuator, an automation device, a monitoring device, and a security device.

The system comprises a security system at the premises, wherein the security system comprises a security controller coupled to security system components installed at the premises.

The security system is configured to provide security data of the premises to a central monitoring station remote to the premises.

The plurality of premises devices includes the security system.

The security system is coupled to at least one of the gateway and the drone.

The drone includes the security controller.

The drone includes the security system.

The drone includes the gateway.

The gateway and the security system form a security network that is independent of remaining premises devices of the plurality of premises devices.

The security system components include at least one of sensors, cameras, input/output (I/O) devices, accessory controllers, door sensor, window sensor, enclosure sensor, motion sensor, thermostat, temperature sensor, heat sensor, smoke sensor, carbon monoxide sensor, water sensor, freeze sensor, weather sensor, and remote control.

Embodiments include a method comprising configuring a drone to include a plurality of sensors configured to collect surveillance data at a premises. The drone includes a positioning system and propulsion system configured to control position and movement of the drone. The method includes configuring a gateway to receive drone data and the surveillance data from the drone and device data from a plurality of network devices installed at the premises, and generate control data for the drone and the plurality of network devices. The method includes configuring a remote client device to include a user interface generated by an application of the remote client device and to present via the user interface at least one of the drone data, the surveillance data and the device data.

Embodiments include a method comprising: configuring a drone to include a plurality of sensors configured to collect surveillance data at a premises, wherein the drone includes a positioning system and propulsion system configured to control position and movement of the drone; configuring a gateway to receive drone data and the surveillance data from the drone and device data from a plurality of network devices installed at the premises, and generate control data for the drone and the plurality of network devices; and configuring a remote client device to include a user interface generated by an application of the remote client device and to present via the user interface at least one of the drone data, the surveillance data and the device data.

Embodiments include a system comprising a drone comprising a plurality of sensors configured to collect surveillance data at a premises. The system includes a plurality of network devices installed at the premises. The system includes a gateway coupled to the drone and the plurality of network devices. The gateway is configured to receive drone data and the surveillance data from the drone and device data from the plurality of network devices. The system includes a remote client device coupled to the gateway. The remote client device includes a user interface configured to present at least one of the drone data, the surveillance data and the device data.

Embodiments include a system comprising: a drone comprising a plurality of sensors configured to collect surveillance data at a premises; a plurality of network devices installed at the premises; a gateway coupled to the drone and the plurality of network devices, wherein the gateway is configured to receive drone data and the surveillance data from the drone and device data from the plurality of network devices; and a remote client device coupled to the gateway, wherein the remote client device includes a user interface configured to present at least one of the drone data, the surveillance data and the device data.

Embodiments include a system comprising a drone comprising an unmanned vehicle configured to perform surveillance of a premises. The surveillance includes at least one of autonomous navigation and remote piloting around the premises. The drone includes a security controller coupled to a plurality of sensors configured to collect security data at the premises. The system includes a remote server coupled to the drone. The remote server is configured to receive the security data and drone data. The remote server is configured to generate control data for the drone and the security controller using the security data and the drone data. The system includes a remote device coupled to at least one of the drone and the remote server. The remote device includes a user interface configured to present the security data and the drone data.

Embodiments include a system comprising: a drone comprising an unmanned vehicle configured to perform surveillance of a premises, wherein the surveillance includes at least one of autonomous navigation and remote piloting around the premises, wherein the drone includes a security controller coupled to a plurality of sensors configured to collect security data at the premises; a remote server coupled to the drone, wherein the remote server is configured to receive the security data and drone data, wherein the remote server is configured to generate control data for the drone and the security controller using the security data and the drone data; and a remote device coupled to at least one of the drone and the remote server, wherein the remote device includes a user interface configured to present the security data and the drone data.

Embodiments include a system comprising a drone comprising an unmanned vehicle configured to perform surveillance of a premises. The surveillance includes at least one of autonomous navigation and remote piloting around the premises. The drone includes a controller coupled to a plurality of sensors configured to collect drone data and security data at the premises. The controller is configured to generate control data for the drone and the premises using the drone data and the security data. The system includes a remote device coupled to the drone. The remote device includes a user interface configured to present at least one of the drone data, the security data, and the control data.

Embodiments include a system comprising: a drone comprising an unmanned vehicle configured to perform surveillance of a premises, wherein the surveillance includes at least one of autonomous navigation and remote piloting around the premises, wherein the drone includes a controller coupled to a plurality of sensors configured to collect drone data and security data at the premises, wherein the controller is configured to generate control data for the drone and the premises using the drone data and the security data; and a remote device coupled to the drone, wherein the remote device includes a user interface configured to present at least one of the drone data, the security data, and the control data.

Embodiments include a system comprising a drone comprising an unmanned vehicle configured to patrol a premises. The patrol includes at least one of autonomous navigation and remote piloting around the premises. The drone includes an automation controller coupled to a plurality of sensors configured to collect sensor data. A first set of sensors of the plurality of sensors is onboard the drone and a second set of sensors of the plurality of sensors is installed at the premises. The system includes a remote server coupled to the drone and configured to receive the sensor data. At least one of the remote server and the automation controller is configured to use the sensor data to generate control data for the drone and for premises devices installed at the premises. The system includes a remote device coupled to at least one of the drone and the remote server. The remote device includes a user interface configured to present at least one of the security data and the drone data Embodiments include a system comprising: a drone comprising an unmanned vehicle configured to patrol a premises, wherein the patrol includes at least one of autonomous navigation and remote piloting around the premises, wherein the drone includes an automation controller coupled to a plurality of sensors configured to collect sensor data, wherein a first set of sensors of the plurality of sensors is onboard the drone and a second set of sensors of the plurality of sensors is installed at the premises; a remote server coupled to the drone and configured to receive the sensor data, wherein at least one of the remote server and the automation controller is configured to use the sensor data to generate control data for the drone and for premises devices installed at the premises; and a remote device coupled to at least one of the drone and the remote server, wherein the remote device includes a user interface configured to present at least one of the security data and the drone data As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The system can be a component of a single system, multiple systems, and/or geographically separate systems. The system can also be a subcomponent or subsystem of a single system, multiple systems, and/or geographically separate systems. The system can be coupled to one or more other components (not shown) of a host system or a system coupled to the host system.

One or more components of the system and/or a corresponding system or application to which the system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the system herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

The invention claimed is:

1. A method comprising:
   detecting, by a drone associated with a premises, locations of a plurality of premises devices configured to determine security data at the premises, wherein the drone comprises an unmanned vehicle and one or more sensors configured to determine drone data;
   receiving, by the drone via a first communication protocol and from a first premises device of the plurality of premises devices, a first portion of the security data;
   receiving, by the drone via a second communication protocol and from a second premises device of the plurality of premises devices, a second portion of the security data;
   determining, based on the drone data and the security data, control data associated with controlling the drone; and
   causing output, via a user interface and at a user device, of one or more of the drone data, the security data, the control data, or the locations of the plurality of premises devices.

2. The method of claim 1, wherein the drone is configured to at least one of: access a pre-programmed premises patrol route or determine a premises patrol route for use in a patrol state.

3. The method of claim 1, wherein the user interface is configured to output, based on the locations of the plurality of premises devices, a floor plan, wherein the floor plan comprises one or more of a two-dimensional map or a three-dimensional map of the premises.

4. The method of claim 1, further comprising a remote server located external to the premises and configured to communicate with the drone, wherein the remote server is configured to receive at least a portion of the drone data and the control data.

5. The method of claim 1, wherein the user interface is configured to receive control inputs associated with one or more of the drone or the plurality of premises devices, wherein movement of one or more of the drone or the plurality of premises devices is controlled via the control inputs.

6. The method of claim 1, wherein the plurality of premises devices comprises one or more of an Internet Protocol (IP) device, a sensor, a detector, a camera, a controller, an actuator, an automation device, a monitoring device, or a security device.

7. The method of claim 1, wherein determining the control data comprises determining one or more of an operation for the drone to perform at an associated location or updated route information for causing the drone to move.

8. The method of claim 1, wherein the drone is configured to detect the locations of the plurality of premises devices based on one or more of a premises learning mode, one or more spatial identifiers associated with the plurality of premises device, or one or more signals associated with the plurality of premises devices.

9. A system comprising:
   a drone comprising an unmanned vehicle associated with a premises and configured to determine drone data, wherein the drone comprises one or more sensors and is configured to:
      detect, by the one or more sensors, locations of a plurality of premises devices configured to determine security data at the premises;
      receive, via a first communication protocol and from a first premises device of the plurality of premises device, a first portion of the security data;
      receive, via a second communication protocol and from a second premises device of the plurality of premises device, a second portion of the security data; and
      determine, based on the drone data and the security data, control data associated with controlling the drone; and
   a user device configured to communicate with the drone and to output, via a user interface, one or more of the drone data, the security data, the control data, or the locations of the plurality of premises devices.

10. The system of claim 9, wherein the drone is configured to at least one of: access a pre-programmed premises patrol route or determine a premises patrol route for use in a patrol state.

11. The system of claim 9, wherein the user interface is further configured to output, based on the locations of the plurality of premises devices, a floor plan, wherein the floor plan comprises one or more of a two-dimensional map or a three-dimensional map of the premises.

12. The system of claim 9, further comprising a remote server located external to the premises and configured to communicate with the drone, wherein the remote server is configured to receive at least a portion of the drone data and the control data.

13. The system of claim 9, wherein the user interface is configured to receive control inputs associated with one or more of the drone or the plurality of premises devices, wherein movement of one or more of the drone or the plurality of premises devices is controlled via the control inputs.

14. The system of claim 9, wherein the plurality of premises devices comprises one or more of an Internet Protocol (IP) device, a sensor, a detector, a camera, a controller, an actuator, an automation device, a monitoring device, or a security device.

15. The system of claim 9, wherein determining the control data comprises determining one or more of an operation for the drone to perform at an associated location or updated route information for causing the drone to move.

16. The system of claim 9, wherein the drone is configured to detect the locations of the plurality of premises devices based on one or more of a premises learning mode, one or more spatial identifiers associated with the plurality of premises device, or one or more signals associated with the plurality of premises devices.

17. A drone device comprising:
   an unmanned vehicle and one or more sensors configured to determine drone data;
   one or more processors; and
   memory storing instructions that, when executed by the one or more processors, cause the drone device to:

detect, at a premises, locations of a plurality of premises devices configured to determine security data at the premises;

receive, via a first communication protocol and from a first premises device of the plurality of premises devices, a first portion of the security data, receive, via a second communication protocol and from a second premises device of the plurality of premises devices, a second portion of the security data;

determine, based on the drone data and the security data, control data associated with controlling the drone; and cause output, via a user interface and at a user device, of one or more of the drone data, the security data, the control data, or the locations of the plurality of premises devices.

18. The drone device of claim 17, wherein the drone is configured to at least one of: access a pre-programmed premises patrol route or determine a premises patrol route for use in a patrol state.

19. The drone device of claim 17, wherein the user interface is configured to output, based on the locations of the plurality of premises devices, a floor plan, wherein the floor plan comprises one or more of a two-dimensional map or a three-dimensional map of the premises.

20. The drone device of claim 17, further comprising a remote server located external to the premises and configured to communicate with the drone device, wherein the remote server is configured to receive at least a portion of the drone data and the control data.

21. The drone device of claim 17, wherein the user interface is configured to receive control inputs associated with one or more of the drone device or the plurality of premises devices, wherein movement of one or more of the drone device or the plurality of premises devices is controlled via the control inputs.

22. The drone device of claim 17, wherein the plurality of premises devices comprises one or more of an Internet Protocol (IP) device, a sensor, a detector, a camera, a controller, an actuator, an automation device, a monitoring device, or a security device.

23. The drone device of claim 17, wherein determining the control data comprises determining one or more of an operation for the drone device to perform at an associated location or updated route information for causing the drone device to move.

24. The drone device of claim 17, wherein the drone device is configured to detect the locations of the plurality of premises devices based on one or more of a premises learning mode, one or more spatial identifiers associated with the plurality of premises device, or one or more signals associated with the plurality of premises devices.

25. A non-transitory computer-readable medium storing computer-executable instructions that, when executed, cause:

detecting, by a drone associated with a premises, locations of a plurality of premises devices configured to determine security data at the premises, wherein the drone comprises an unmanned vehicle and one or more sensors configured to determine drone data;

receiving, by the drone via a first communication protocol and from a first premises device of the plurality of premises devices, a first portion of the security data;

receiving, by the drone via a second communication protocol and from a second premises device of the plurality of premises devices, a second portion of the security data;

determining, based on the drone data and the security data, control data associated with controlling the drone; and causing outputting, via a user interface and at a user device, one or more of the drone data, the security data, the control data, or the locations of the plurality of premises devices.

26. The non-transitory computer-readable medium of claim 25, wherein the instructions, when executed, further cause the drone to at least one of: access a pre-programmed premises patrol route or determine a premises patrol route for use in a patrol state.

27. The non-transitory computer-readable medium of claim 25, wherein the instructions, when executed, further cause the user interface to output, based on the locations of the plurality of premises devices, a floor plan, wherein the floor plan comprises one or more of a two-dimensional map or a three-dimensional map of the premises.

28. The non-transitory computer-readable medium of claim 25, further comprising a remote server located external to the premises, wherein the instructions, when executed, further cause sending at least a portion of the drone data and the control data to the remote server.

29. The non-transitory computer-readable medium of claim 25, wherein the instructions, when executed, further cause movement of the one or more of the drone or the plurality of the premises devices based at least in part on receiving control inputs associated with the user interface.

30. The non-transitory computer-readable medium of claim 25, wherein the plurality of premises devices comprises one or more of an Internet Protocol (IP) device, a sensor, a detector, a camera, a controller, an actuator, an automation device, a monitoring device, or a security device.

31. The non-transitory computer-readable medium of claim 25, wherein the instructions, when executed, further cause determining the control data based at least in part on determining one or more of an operation for the drone to perform at an associated location or updated route information for causing the drone to move.

32. The non-transitory computer-readable medium of claim 25, wherein the instructions, when executed, further cause detecting, by the drone, the locations of the plurality of premises devices based on one or more of a premises learning mode, one or more spatial identifiers associated with the plurality of premises device, or one or more signals associated with the plurality of premises devices.

* * * * *